United States Patent
Fujinami et al.

(10) Patent No.: US 8,213,781 B2
(45) Date of Patent: Jul. 3, 2012

(54) DATA PROCESSING DEVICE, DATA PROCESSING METHOD, PROGRAM, PROGRAM RECORDING MEDIUM, DATA RECORDING MEDIUM, AND DATA STRUCTURE

(75) Inventors: Yasushi Fujinami, Tokyo (JP); Tetsuya Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1523 days.

(21) Appl. No.: 11/629,078

(22) PCT Filed: May 24, 2005

(86) PCT No.: PCT/JP2005/009435
§ 371 (c)(1),
(2), (4) Date: Feb. 2, 2007

(87) PCT Pub. No.: WO2005/122570
PCT Pub. Date: Dec. 22, 2005

(65) Prior Publication Data
US 2008/0292285 A1 Nov. 27, 2008

(30) Foreign Application Priority Data
Jun. 11, 2004 (JP) ................................. 2004-174548

(51) Int. Cl.
*H04N 5/917* (2006.01)
*H04N 9/80* (2006.01)
(52) U.S. Cl. .......................... 386/355; 386/329; 386/248
(58) Field of Classification Search .................. 386/216, 386/291, 326, 343, 355, 329, 248
See application file for complete search history.

(56) References Cited

U.S. PATENT DOCUMENTS

| | | | |
|---|---|---|---|
| 6,278,835 B1 * | 8/2001 | Takiguchi | 386/326 |
| 6,594,439 B2 * | 7/2003 | Imahashi et al. | 386/241 |
| 6,674,801 B1 * | 1/2004 | Kim | 375/240.26 |
| 6,717,961 B1 * | 4/2004 | Park | 370/538 |
| 7,209,636 B2 * | 4/2007 | Imahashi et al. | 386/278 |
| 7,561,622 B2 * | 7/2009 | Takizawa et al. | 375/240.27 |
| 7,940,799 B2 * | 5/2011 | Watabe et al. | 370/473 |
| 2002/0118744 A1 | 8/2002 | Park | |
| 2003/0184457 A1 | 10/2003 | Hsiun | |

FOREIGN PATENT DOCUMENTS

| | | |
|---|---|---|
| JP | 9 139915 | 5/1997 |
| JP | 9 200695 | 7/1997 |
| JP | 9-200695 | 7/1997 |
| WO | WO 02/098102 A1 | 12/2002 |
| WO | WO 2004/008747 A2 | 1/2004 |

* cited by examiner

*Primary Examiner* — Helen Shibru
(74) *Attorney, Agent, or Firm* — Oblon, Spivak, McClelland, Maier & Neustadt, L.L.P.

(57) ABSTRACT

The present invention relates to a data processing apparatus, a data processing method, a program, a program recording medium, a data recording medium, and a data structure that enable reading of coded video data in access units without analyzing the coded video data. In step S211, a private_stream_2 packet is searched for, which is used for decoding coded video data, and which is located immediately prior to each of one or more decode startable points in coded video data in the access units. In addition, in step S216, based on an AU_length which is included in the private_stream_2 packet, and which represents the size of each of access units located from the private_stream_2 packet to the next private_stream_2 packet, the coded video data is read in the access units. The present invention can be applied to, for example, game machine using DVDs, etc.

5 Claims, 46 Drawing Sheets

FIG. 5

PlayList.PAT FILE

| Syntax | No. of bits | Mnemonic |
|---|---|---|
| "PLAYLIST.DAT" { | | |
| name_length | 8 | uimsbf |
| name_string | 8x255 | bslbf |
| number_of_PlayLists | 16 | uimsbf |
| for (i=0;i<number_of_PlayLists;i++) { | | |
| PlayList() { // A PlayList() | | |
| PlayList_data_length | 32 | uimsbf |
| // ATTRIBUTE INFORMATION | | |
| reserved_for_word_alignment | 15 | bslbf |
| capture_enable_flag_PlayList | 1 | bslbf |
| PlayList_name_length | 8 | uimsbf |
| PlayList_name_string | 8*255 | bslbf |
| // | | |
| number_of_PlayItems | 16 | uimsbf |
| for (i=0;i<number_of_PlayItems;i++) { | | |
| PlayItem() | | |
| } | | |
| PlayListMark() | | |
| } | | |
| } | | |

FIG. 6

PlayItem()

| Syntax | No.of bits | Mnemonic |
|---|---|---|
| PlayItem() { | | |
|   length | 16 | uimsbf |
|   Clip_Information_file_name_length | 16 | uimsbf |
|   Clip_Information_file_name | 8*Clip_Inform ation_file_ name_length | bslbf |
|   IN_time | 32 | uimsbf |
|   OUT_time | 32 | uimsbf |
| } | | |

FIG. 7

PlayListMark()

| Syntax | No. of bits | Mnemonic |
|---|---|---|
| PlayListMark() { | | |
|   length | 32 | uimsbf |
|   number_of_PlayList_marks | 16 | uimsbf |
|   for (i=0; i < number_of_PlayList_marks; i++) { | | |
|     Mark() { | | |
|       mark_type | 8 | uimsbf |
|       mark_name_length | 8 | uimsbf |
|       ref_to_PlayItem_id | 16 | uimsbf |
|       mark_time_stamp | 32 | uimsbf |
|       entry_ES_stream_id | 8 | uimsbf |
|       entry_ES_private_stream_id | 8 | uimsbf |
|       mark_data | 32 | bslbf |
|       mark_name_string | 8*24 | bslbf |
|     } | | |
|   } | | |
| } | | |

FIG. 8

| mark_type | stream coding |
|---|---|
| 0 | reserved |
| 1 | "Chapter" MARK |
| 2 | "Index" MARK |
| 3 | "Event" MARK |
| 4~255 | reserved |

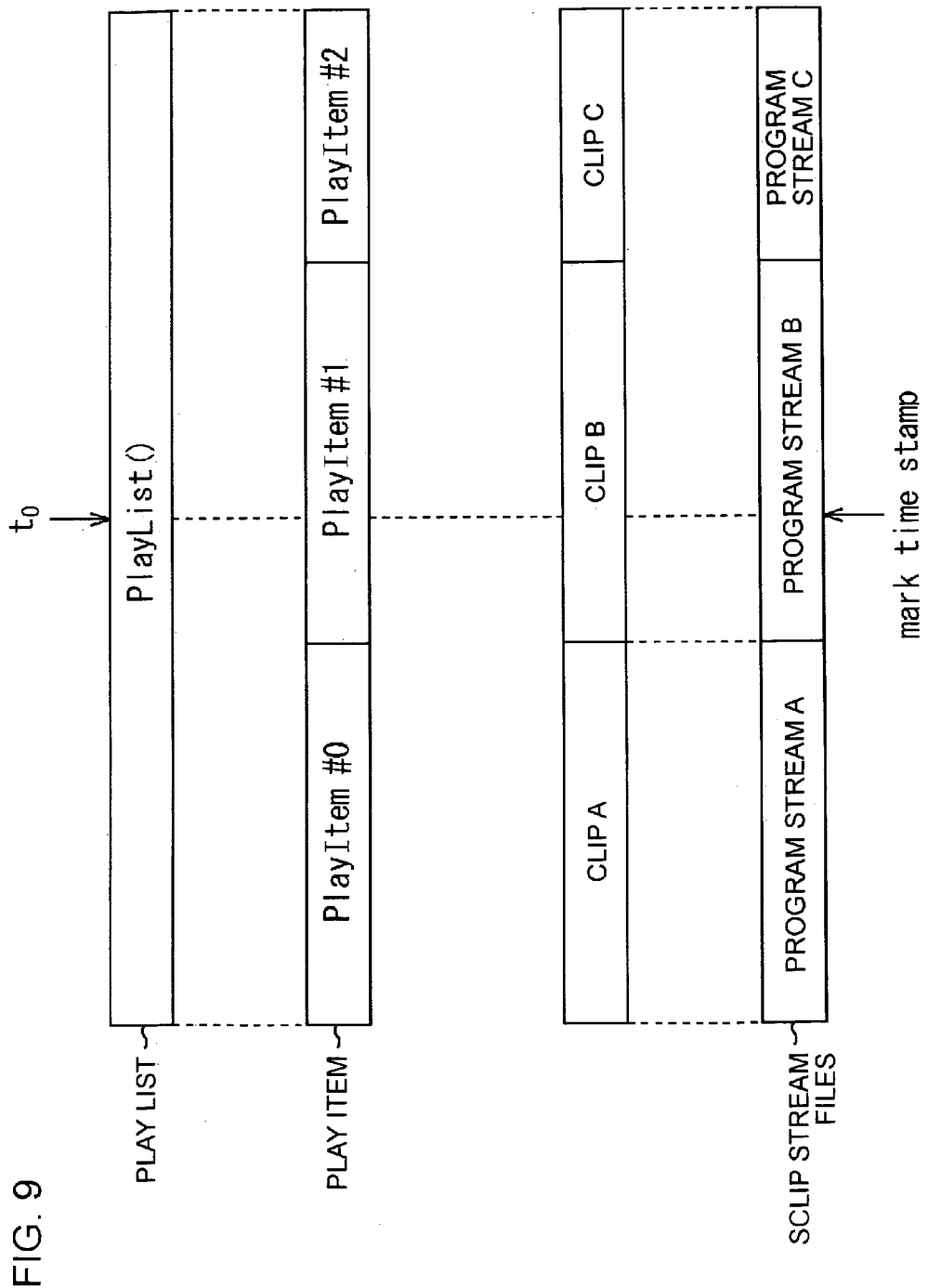

FIG. 10

| clip() "Clip INFORMATION FILE" (.CLP) | | |
|---|---|---|
| Syntax | No. of bits | Mnemonic |
| XXXXX.CLP { | | |
|   presentation_start_time | 32 | uimsbf |
|   presentation_end_time | 32 | uimsbf |
|   reserved_for_word_alignment | 7 | bslbf |
|   capture_enable_flag_Clip | 1 | bslbf |
|   number_of_streams | 8 | uimsbf |
|   for (i=0; i < number_of_streams; i++) { | | |
|     StreamInfo() { | | |
|       length | 16 | uimsbf |
|       stream_id | 8 | uimsbf |
|       private_stream_id | 8 | uimsbf |
|       StaticInfo() | | |
|       reserved_for_word_alignment | 8 | bslbf |
|       number_of_DynamicInfo | 8 | uimsbf |
|       for (j=0; j < number_of_DynamicInfo; j++) { | | |
|         pts_change_point | 32 | uimsbf |
|         DynamicInfo() | | |
|       } | | |
|     } | | |
|   } | | |
|   EP_map() | | |
| } | | |

FIG. 11

| TYPES OF ELEMENTARY STREAMS | stream_id | private_stream_id |
|---|---|---|
| VIDEO | 0xE0 - 0xEF | (NONE) |
| ATRAC AUDIO | 0xBD | 0x00 - 0x0F |
| LPCM AUDIO | 0xBD | 0x10 - 0x1F |
| SUBTITLE | 0xBD | 0x80 - 0x9F |

FIG. 12

| Syntax | No. of bits | Mnemonic |
|---|---|---|
| StaticInfo() { | | |
|   if(stream == VIDEO) { | | |
|     reserved_for_word_alignment | 16 | bslbf |
|     picture_size | 4 | uimsbf |
|     frame_rate | 4 | uimsbf |
|     reserved_for_word_alignment | 7 | bslbf |
|     cc_flag | 1 | bslbf |
|   } else if (stream == AUDIO ) { | | |
|     audio_language_code | 16 | bslbf |
|     channel_configuration | 8 | uimsbf |
|     reserved_for_word_alignment | 3 | bslbf |
|     lfe_existence | 1 | bslbf |
|     sampling_frequency | 4 | uimsbf |
|   } else if (stream == SUBTITLE) { | | |
|     subtitle_language_code | 16 | bslbf |
|     reserved_for_word_alignment | 15 | bslbf |
|     configurable_flag | 1 | uimsbf |
|   } | | |
| } | | |

FIG. 13

DynamicInfo

| Syntax | No. of bits | Mnemonic |
|---|---|---|
| DynamicInfo(i,j) { | | |
|     reserved_for_word_alignment | 8 | bslbf |
|     if(stream == VIDEO ) { | | |
|         reserved_for_word_alignment | 4 | bslbf |
|         display_aspect_ratio | 4 | uimsbf |
|     } else if(stream == AUDIO ) { | | |
|         reserved_for_word_alignment | 4 | bslbf |
|         channel_assignment | 4 | uimsbf |
|     } else if(stream == SUBTITLE ) { | | |
|         reserved_for_word_alignment | 8 | bslbf |
|     } | | |
| } | | |

FIG. 14

EP_map()

| Syntax | No. of bits | Mnemonic |
|---|---|---|
| EP_map() { | | |
|   reserved_for_word_alignment | 8 | bslbf |
|   number_of_stream_id_entries | 8 | uimsbf |
|   for (k=0;k<number_of_stream_id_entries;k++) { | | |
|     stream_id | 8 | bslbf |
|     private_stream_id | 8 | bslbf |
|     number_of_EP_entries | 32 | uimsbf |
|     for (i=0;i<number_of_EP_entries;i++) { | | |
|       PTS_EP_start | 32 | uimsbf |
|       RPN_EP_start | 32 | uimsbf |
|     } | | |
|   } | | |
| } | | |

FIG. 15

Table 2-31—Program Stream

| Syntax | No. of bits | Mnemonic |
|---|---|---|
| MPEG2_program_stream() {<br>    do {<br>        pack()<br>    }while(nextbits()== pack_start_code)<br>    MPEG_program_end_code<br>} | 32 | bslbf |

Table 2-32—Program Stream pack

| Syntax | No. of bits | Mnemonic |
|---|---|---|
| pack() {<br>    pack_header()<br>    while(nextbits()==packet_start_code_prefix) {<br>    PES_packet()<br>    }<br>} | | |

Table 2-33—Program Stream pack header

| Syntax | No. of bits | Mnemonic |
|---|---|---|
| pack_header() { | | |
|     pack_start_code | 32 | bslbf |
|     '01' | 2 | bslbf |
|     system_clock_reference_base[32..30] | 3 | bslbf |
|     marker_bit | 1 | bslbf |
|     system_clock_reference_base[29..15] | 15 | bslbf |
|     marker_bit | 1 | bslbf |
|     system_clock_reference_base[14..0] | 15 | bslbf |
|     marker_bit | 1 | bslbf |
|     system_clock_reference_extension | 9 | uimsbf |
|     marker_bit | 1 | bslbf |
|     program_mux_rate | 22 | uimsbf |
|     marker_bit | 1 | bslbf |
|     marker_bit | 1 | bslbf |
|     reserved | 5 | bslbf |
|     pack_stuffing_length | 3 | uimsbf |
|     for(i=0;i<pack_stuffing_length;i++) {<br>        stuffing_byte | 8 | bslbf |
|     }<br>    if(nextbits()==system_header_start_code) {<br>        system_header()<br>    }<br>} | | |

FIG. 16

Table 2-17—PES packet

| Syntax | No. of bits | Mnemonic |
|---|---|---|
| PES_packet() { | | |
|     packet_start_code_prefix | 24 | bslbf |
|     stream_id | 8 | uimsbf |
|     PES_packet_length | 16 | uimsbf |
|     if(stream_id !=program_stream_map | | |
|     && stream_id !=padding_stream | | |
|     && stream_id !=private_stream_2 | | |
|     && stream_id !=ECM | | |
|     && stream_id !=EMM | | |
|     && stream_id !=program_stream_directory | | |
|     && stream_id !=DSMCC_stream | | |
|     && stream_id !=ITU-T Rec. H.222.1 type E stream) { | | |
|         '10' | 2 | bslbf |
|         PES_scrambling_control | 2 | bslbf |
|         PES_priority | 1 | bslbf |
|         data_alignment_indicator | 1 | bslbf |
|         copyright | 1 | bslbf |
|         original_or_copy | 1 | bslbf |
|         PTS_DTS_flags | 2 | bslbf |
|         ESCR_flag | 1 | bslbf |
|         ES_rate_flag | 1 | bslbf |
|         DSM_trick_mode_flag | 1 | bslbf |
|         additional_copy_info_flag | 1 | bslbf |
|         PES_CRC_flag | 1 | bslbf |
|         PES_extension_flag | 1 | bslbf |
|         PES_header_data_length | 8 | uimsbf |
|         if (PTS_DTS_flags == '10') { | | |
|             '0010' 4 bslbf | 4 | bslbf |
|             PTS [32..30] | 3 | bslbf |
|             marker_bit | 1 | bslbf |
|             PTS [29..15] | 15 | bslbf |
|             marker_bit | 1 | bslbf |
|             PTS [14..0] | 15 | bslbf |
|             marker_bit | 1 | bslbf |
|     } | | |

FIG. 17

Table 2-17—PES packet (continued)

| Syntax | No. of bits | Mnemonic |
|---|---|---|
| if(PTS_DTS_flags=='11') { | | |
|     '0011' | 4 | bslbf |
|     PTS[32..30] | 3 | bslbf |
|     marker_bit | 1 | bslbf |
|     PTS[29..15] | 15 | bslbf |
|     marker_bit | 1 | bslbf |
|     PTS[14..0] | 15 | bslbf |
|     marker_bit | 1 | bslbf |
|     '0001' | 4 | bslbf |
|     DTS[32..30] | 3 | bslbf |
|     marker_bit | 1 | bslbf |
|     DTS[29..15] | 15 | bslbf |
|     marker_bit | 1 | bslbf |
|     DTS[14..0] | 15 | bslbf |
|     marker_bit | 1 | bslbf |
| } | | |
| if (ESCR_flag=='1') { | | |
|     reserved | 2 | bslbf |
|     ESCR_base[32..30] | 3 | bslbf |
|     marker_bit | 1 | bslbf |
|     ESCR_base[29..15] | 15 | bslbf |
|     marker_bit | 1 | bslbf |
|     ESCR_base[14..0] | 15 | bslbf |
|     marker_bit | 1 | bslbf |
|     ESCR_extension | 9 | uimsbf |
|     marker_bit | 1 | bslbf |
| } | | |
| if(ES_rate_flag=='1') { | | |
|     marker_bit | 1 | bslbf |
|     ES_rate | 22 | uimsbf |
|     marker_bit | 1 | bslbf |
| } | | |
| if(DSM_trick_mode_flag=='1') { | | |
|     trick_mode_control | 3 | uimsbf |
|     if(trick_mode_control==fast_forward) { | | |
|         field_id | 2 | bslbf |
|         intra_slice_refresh | 1 | bslbf |
|         frequency_truncation | 2 | bslbf |
|     } | | |
|     else if(trick_mode_control==slow_motion) { | | |
|         rep_cntrl | 5 | uimsbf |
|     } | | |
|     else if(trick_mode_control==freeze_frame) { | | |
|         field_id | 2 | uimsbf |
|         reserved | 3 | bslbf |
|     } | | |
|     else if(trick_mode_control==fast_reverse) { | | |
|         field_id | 2 | bslbf |
|         intra_slice_refresh | 1 | bslbf |
|         frequency_truncation | 2 | bslbf |
|     else if(trick_mode_control==slow_reverse) { | | |
|         rep_cntrl | 5 | uimsbf |
|     } | | |
|     else | | |
|         reserved | 5 | bslbf |
| } | | |
| if( additional_copy_info_flag=='1') { | | |
|     marker_bit | 1 | bslbf |
|     additional_copy_info | 7 | bslbf |
| } | | |
| if( PES_CRC_flag=='1') { | | |
|     previous_PES_packet_CRC | 16 | bslbf |
| } | | |

FIG. 18

Table 2-17—PES packet (concluded)

| Syntax | No. of bits | Mnemonic |
|---|---|---|
| `if(PES_extension_flag=='1') {` | | |
|     PES_private_data_flag | 1 | bslbf |
|     pack_header_field_flag | 1 | bslbf |
|     program_packet_sequence_counter_flag | 1 | bslbf |
|     P-STD_buffer_flag | 1 | bslbf |
|     reserved | 3 | bslbf |
|     PES_extension_flag_2 | 1 | bslbf |
|     `if(PES_private_data_flag=='1') {` | | |
|         PES_private_data | 128 | bslbf |
|     `}` | | |
|     `if (pack_header_field_flag == '1') {` | | |
|         pack_field_length | 8 | uimsbf |
|         pack_header() | | |
|     `}` | | |
|     `if (program_packet_sequence_counter_flag == '1') {` | | |
|         marker_bit | 1 | bslbf |
|         program_packet_sequence_counter | 7 | uimsbf |
|         marker_bit | 1 | bslbf |
|         MPEG1_MPEG2_identifier | 1 | bslbf |
|         original_stuff_length | 6 | uimsbf |
|     `}` | | |
|     `if(P-STD_buffer_flag == '1') {` | | |
|         '01' | 2 | bslbf |
|         P-STD_buffer_scale | 1 | bslbf |
|         P-STD_buffer_size | 13 | uimsbf |
|     `}` | | |
|     `if( PES_extension_flag_2 == '1') {` | | |
|         marker_bit | 1 | bslbf |
|         PES_extension_field_length | 7 | uimsbf |
|         `for (i=0; i<PES_extension_field_length; i++) {` | | |
|             reserved | 8 | bslbf |
|         `}` | | |
|     `}` | | |
| `}` | | |
| `for (i=0; i<N1; i++) {` | | |
|     stuffing_byte | 8 | bslbf |
| `}` | | |
| `for (i=0; i<N2; i++) {` | | |
|     PES_packet_data_byte | 8 | bslbf |
| `}` | | |
| `}` | | |
| `else if(stream_id == program_stream_map` | | |
| `\|\|stream_id == private_stream_2` | | |
| `\|\|stream_id == ECM` | | |
| `\|\|stream_id == EMM` | | |
| `\|\|stream_id == program_stream_directory` | | |
| `\|\|stream_id == DSMCC_stream` | | |
| `\|\|stream_id == ITU-T Rec. H.222.1 type E stream) {` | | |
|     `for (i=0; i<PES_packet_length; i++) {` | | |
|         PES_packet_data_byte | 8 | bslbf |
|     `}` | | |
| `}` | | |
| `else if(stream_id == padding_stream) {` | | |
|     `for (i=0; i<PES_packet_length; i++) {` | | |
|         padding_byte | 8 | bslbf |
|     `}` | | |
| `}` | | |
| `}` | | |

FIG. 19

Table 2-18—Stream_id assignments

| stream_id | Note | stream coding |
|---|---|---|
| 1011 1100 | 1 | program_stream_map |
| 1011 1101 | 2 | private_stream_1 |
| 1011 1110 |  | padding_stream |
| 1011 1111 | 3 | private_stream_2 |
| 110x xxxx |  | ISO/IEC 13818-3 or ISO/IEC 11172-3 or ISO/IEC 13818-7 or ISO/IEC 14496-3 audio stream number x xxxx |
| 1110 xxxx |  | ITU-T Rec. H.262 \| ISO/IEC 13818-2 or ISO/IEC 11172-2 or ISO/IEC 14496-2 video stream number xxxx |
| 1111 0000 | 3 | ECM_stream |
| 1111 0001 | 3 | EMM_stream |
| 1111 0010 | 5 | ITU-T Rec. H.222.0 \| ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 |  | ISO/IEC14496-1_SL-packetized_stream |
| 1111 1011 |  | ISO/IEC14496-1_FlexMux_stream |
| 1111 1100 ... 1111 1110 |  | reserved data stream |
| 1111 1111 | 4 | program_stream_directory |

The notation x means that the values '0' and '1' are both permitted and results in the same stream type. The stream number is given by the values taken by the x's.

NOTE 1—PES packets of type program_stream_map have unique syntax specified in 2.5.4.1.
NOTE 2—PES packets of type private_stream_1 and ISO/IEC_13552_stream follow the same PES packet syntax as those for ITU-T Rec. H.262 \| ISO/IEC 13818-2 video and ISO/IEC 13818-3 audio streams.
NOTE 3—PES packets of type private_stream_2, ECM_stream and EMM_stream are similar to private_stream_1 except no syntax is specified after PES_packet_length field.
NOTE 4—PES packets of type program_stream_directory have a unique syntax specified in 2.5.5.
NOTE 5—PES packets of type DSM-CC_stream have a unique syntax specified in ISO/IEC 13818-6.
NOTE 6—This stream_id is associated with stream_type 0x09 in Table 2-29.
NOTE 7—This stream_id is only used in PES packets, which carry data from a Program Stream or an ISO/IEC 11172-1 System Stream in a Transport Stream (refer to 2.4.3.7).

FIG. 20

| stream_id | stream coding (TYPES OF STREAMS) |
|---|---|
| 1011 1101 | private_stream_1 |
| 1011 1110 | padding_stream |
| 1011 1111 | private_stream_2 |
| 110x xxxx | audio stream number x xxxx |
| 1110 xxxx | video stream number xxxx |

FIG. 21

| Syntax | No. of bits | Mnemonic |
|---|---|---|
| private_stream1_PES_payload ( ) { | | |
|   private_header ( ) { | | |
|     private_stream_id | 8 | uimsbf |
|     if(stream == ATRAC ) { | | |
|       reserved_for_future_use | 8 | bslbf |
|       AU_locator | 16 | uimsbf |
|     if(stream == LPCM ) { | | |
|       fs_flag | 1 | uimsbf |
|       reserved_for_future_use | 3 | bslbf |
|       ch_flag | 4 | uimsbf |
|       AU_locator | 16 | uimsbf |
|     }else if (stream == SUBTITLE ) { | | |
|       reserved_for_future_use | 8 | bslbf |
|       AU_locator | 16 | uimsbf |
|     } | | |
|   } | | |
|   private_payload ( ) | | |
| } | | |

FIG. 22

| private_stream_id | stream coding (TYPES OF STREAMS) |
|---|---|
| 0000 xxxx<br>0001 xxxx<br>100x xxxx | ATRAC Audio stream number xxxx<br>LPCM stream number xxxx<br>Subtitle stream number x xxxx |

FIG. 23

| Syntax | No. of bits | Mnemonic |
|---|---|---|
| private_stream2_PES_payload() { | | |
| reserved_for_future_use | 8 | bslbf |
| video_stream_id | 8 | uimsbf |
| 1stRef_picture | 16 | uimsbf |
| 2ndRef_picture | 16 | uimsbf |
| 3rdRef_picture | 16 | uimsbf |
| 4thRef_picture | 16 | uimsbf |
| au_information() | | |
| VBI() | | |
| for (i=0; i<N1; i++) { | | |
| padding_word | 16 | bslbf |
| } | | |
| } | | |

FIG. 24

| Syntax | No. of bits | Mnemonic |
|---|---|---|
| au_information() { | | |
|   length | 16 | uimsbf |
|   reserved_for_word_alignment | 8 | bslbf |
|   number_of_access_unit | 8 | uimsbf |
|   for (i=0;i<number_of_access_unit;i++) { | | |
|     reserved | 4 | bslbf |
|     pic_struct_copy | 4 | uimsbf |
|     au_ref_flag | 1 | uimsbf |
|     reserved | 2 | bslbf |
|     AU_length | 21 | uimsbf |
|   } | | |
| } | | |

FIG. 25

| // "PLAYLIST.DAT" | | |
|---|---|---|
| number_of_PlayLists | 2 | |
| | | |
| // PlayList() | PlayList #0 | PlayList #1 |
| capture_enable_flag_PlayList | 1 | 0 |
| number_of_PlayItems | 2 | 1 |
| | | |
| // PlayItem #0 | | |
| Clip_Information_file_name | "00001.CLP" | "00003.CLP" |
| IN_time | 180,090 | 90,000 |
| OUT_time | 27,180,090 | 81,090,000 |
| | | |
| // PlayItem #1 | | |
| Clip_Information_file_name | "00002.CLP" | |
| IN_time | 90,000 | |
| OUT_time | 27,090,000 | |

FIG. 26

| | "00001.CLP" | "00002.CLP" | "00003.CLP" |
|---|---|---|---|
| // Clip() | | | |
| presentation_start_time | 90,000 | 90,000 | 90,000 |
| presentation_end_time | 27,990,000 | 27,090,000 | 81,090,000 |
| capture_enable_flag_Clip | 1 | 0 | 1 |
| number_of_streams | 4 | 4 | 3 |
| | | | |
| // stream #0 | StreamInfo() | StreamInfo() | StreamInfo() |
| stream_id | 0xE0(video stream) | 0xE0(video stream) | 0xE0(video stream) |
| private_stream_id | 0x00 | 0x00 | 0x00 |
| | picture_size='720x480' | picture_size='720x480' | picture_size='720x480' |
| | frame_rate='29.97Hz' | frame_rate='29.97Hz' | frame_rate='29.97Hz' |
| | cc_flag='Yes' | cc_flag='Yes' | cc_flag='No' |
| number_of_DynamicInfo | 0 | 0 | 2 |
| | | | |
| // stream #1 | StreamInfo() | StreamInfo() | StreamInfo() |
| stream_id | 0xBD(private_stream_1) | 0xBD(private_stream_1) | 0xE1(video stream) |
| private_stream_id | 0x00(ATRAC) | 0x00(ATRAC) | 0x00 |
| | audio_language_code='JAPANESE' | audio_language_code='JAPANESE' | picture_size='720x480' |
| | channel_configuration='STEREO' | channel_configuration='STEREO' | frame_rate='29.97Hz' |
| | lfe_existence='NO' | lfe_existence='NO' | cc_flag='No' |
| | sampling_frequency='48KHz' | sampling_frequency='48KHz' | |
| number_of_DynamicInfo | 0 | 0 | 0 |
| | | | |
| // stream #2 | StreamInfo() | StreamInfo() | StreamInfo() |
| stream_id | 0xBD(private_stream_1) | 0xBD(private_stream_1) | 0xBD(private_stream_1) |
| private_stream_id | 0x80(Subtitle) | 0x80(Subtitle) | 0x00(ATRAC) |
| | subtitle_language_code='JAPANESE' | subtitle_language_code='JAPANESE' | audio_language_code='JAPANESE' |
| | configurable_flag=0 | configurable_flag=0 | channel_configuration='STEREO' |
| | | | lfe_existence='NO' |
| | | | sampling_frequency='48KHz' |
| number_of_DynamicInfo | 0 | 0 | 3 |
| | | | |
| // stream #3 | StreamInfo() | StreamInfo() | |
| stream_id | 0xBD(private_stream_1) | 0xBD(private_stream_1) | |
| private_stream_id | 0x81(Subtitle) | 0x81(Subtitle) | |
| | subtitle_language_code='JAPANESE' | subtitle_language_code='JAPANESE' | |
| | configurable_flag=1 | configurable_flag=1 | |
| number_of_DynamicInfo | 0 | 0 | |

FIG. 27

| EP_map() for "00001.CLP" | | |
|---|---|---|
| number_of_stream_id_entries | 1 | |
| stream_id | 0xE0(video stream) | |
| private_stream_id | 0x00 | |
| | PTS_EP_start | RPN_EP_start |
| | 90000 | 0 |
| | 135045 | 244 |
| | 180090 | 305 |
| | 225135 | 427 |
| | 270180 | 701 |

FIG. 28

PlayList #0 PlayListMark()
number_of_PlayList_marks=7

| Mark() | mark_type | ref_to_PlayItem_id | mark_time_stamp | entry_ES_stream_id | entry_ES_private_stream_id | mark_data | | |
|---|---|---|---|---|---|---|---|---|
| #0 | Chapter | 0 | 180,090 | 0 | 0 | 1 | BEGINNING | BEGINNING |
| #1 | Index | 0 | 5,580,090 | 0 | 0 | 1 | 1 MIN. | 1 MIN. |
| #2 | Index | 0 | 10,980,090 | 0 | 0 | 2 | 2 MIN. | 2 MIN. |
| #3 | Event | 0 | 16,380,090 | 0 | 0 | 0 | 3 MIN. | 3 MIN. |
| #4 | Chpater | 1 | 90,000 | 0 | 0 | 2 | HEAD | 5 MIN. |
| #5 | Index | 1 | 5,490,000 | 0 | 0 | 1 | 1 MIN. | 6 MIN. |
| #6 | Index | 1 | 10,890,000 | 0 | 0 | 2 | 2 MIN. | 7 MIN. |

PlayList #1 PlayListMark()
number_of_PlayList_marks=3

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 90,000 | 0 | 0 | 0 | HEAD |
| #1 | Event | 0 | 27,090,000 | 0xE0 | 0 | 1 | 5 MIN. |
| #2 | Event | 0 | 27,540,000 | 0xE1 | 0 | 2 | 5 MIN. 5 SEC. (305 MIN.) |

FIG. 42

"00003.CLP"

Stream #0 (video stream)

| stream_id | 0xE0 |
| --- | --- |
| private_stream_id | 0x00 |
| number_of_DynamicInfo | 2 |

| | pts_change_point | DynamicInfo() |
| --- | --- | --- |
| #0 | 90,000 | display_aspect_ratio=='4:3' |
| #1 | 54,090,000 | display_aspect_ratio=='16:9' |

Stream #2 (private_stream_1) (ATRAC)

| stream_id | 0xBD |
| --- | --- |
| private_stream_id | 0x00 |
| number_of_DynamicInfo | 3 |

| | pts_change_point | DynamicInfo() |
| --- | --- | --- |
| #0 | 90,000 | channel_assignment=='Dual' |
| #1 | 27,090,000 | channel_assignment=='Stereo' |
| #2 | 32,490,000 | channel_assignment=='Dual' |

FIG. 45

| Syntax | No. of bits | Mnemonic |
|---|---|---|
| private_stream2_PES_payload() { | | |
| reserved_for_future_use | 7 | bslbf |
| capture_enable_ps2 | 1 | uimsbf |
| video_stream_id | 8 | uimsbf |
| 1stRef_picture | 16 | uimsbf |
| 2ndRef_picture | 16 | uimsbf |
| 3rdRef_picture | 16 | uimsbf |
| 4thRef_picture | 16 | uimsbf |
| au_information() | | |
| grain_variance_information() | | |
| VBI() | | |
| for (i=0;i<N1;i++) { | | |
| padding_word | 16 | bslbf |
| } | | |
| } | | |

FIG. 46

| Syntax | No. of bits | Mnemonic |
|---|---|---|
| au_information() { | | |
|   length | 16 | uimsbf |
|   reserved_for_word_align | 8 | bslbf |
|   number_of_access_unit | 8 | uimsbf |
|   for(i=0;i<number_of_access_unit;i++) { | | |
|     reserved | 3 | bslbf |
|     capture_enable_flag_AU | 1 | uimsbf |
|     pic_struct_copy | 4 | uimsbf |
|     au_ref_flag | 1 | uimsbf |
|     reserved | 2 | bslbf |
|     AU_length | 21 | uimsbf |
|   } | | |
| } | | |

DATA PROCESSING DEVICE, DATA PROCESSING METHOD, PROGRAM, PROGRAM RECORDING MEDIUM, DATA RECORDING MEDIUM, AND DATA STRUCTURE

TECHNICAL FIELD

The present invention relates to data processing apparatuses, data processing methods, programs, program recording media, data recording media, and data structures, and in particular to, for example, a data processing apparatus, a data processing method, a program, a program recording medium, a data recording medium, and a data structure that enable data processing having high convenience, etc.

BACKGROUND ART

In recent years, for example, DVDs (Digital Versatile Discs) have become widespread as recording media having mass storage and capable of random access, and, in addition, DVD devices that use DVDs to perform various types of processing have also become widespread.

DVD devices include, for example, DVD recorders that record and play back television broadcast program data or the like on DVDs, car navigation systems which have map information or the like recorded on DVDs and which display the map information, and game machines which have game programs or the like recorded on DVDs and which execute the programs.

Regarding DVDs, their details are described in, for example, Non-Patent Document 1.

[Non-Patent Document 1] DVD Specifications for Read-Only Disc Part 3; Version 1.1 December 1997

DISCLOSURE OF INVENTION

Problems to be Solved by the Invention

It is required that data processing having high convenience, etc., be performed with recording media, such as DVDs, capable of recording a large volume of data, and DVD devices or the like which use DVDs to perform various types of processing.

The present invention has been made in view of such circumstances and is intended to enable data processing having high convenience, etc.

Means for Solving the Problems

A data processing apparatus of the present invention comprises searching means for, from coded data including coded video data in access units and utilization information which is immediately prior to each of one or more decode startable points in the coded video data in the access units and which is used in decoding the coded video data, searching for the utilization information, and supplying means which, in response to a request from video decoder control means for controlling a video decoder that decodes the coded video data, based on the size information included in the utilization information, reads the coded video data in the access units from the coded data, and supplies the read data to the video decoder.

A data processing method of the present invention includes a searching step which, from coded data including coded video data in access units and utilization information which is immediately prior to each of one or more decode startable points in the coded video data in the access units and which is used in decoding the coded video data, searches the utilization information, and a supplying step which, in response to a request from video decoder control means for controlling a video decoder that decodes the coded video data, based on the size information included in the utilization information, reads the coded video data in the access units from the coded data, and supplies the read data to the video decoder.

A program of the present invention includes a searching step which, from coded data including coded video data in access units and utilization information which is immediately prior to each of one or more decode startable points in the coded video data in the access units and which is used in decoding the coded video data, searches the utilization information, and a supplying step which, in response to a request from video decoder control means for controlling a video decoder that decodes the coded video data, based on the size information included in the utilization information, reads the coded video data in the access units from the coded data, and supplies the read data to the video decoder.

A program recorded on a program recording medium of the present invention includes a searching step which, from coded data including coded video data in access units and utilization information which is immediately prior to each of one or more decode startable points in the coded video data in the access units and which is used in decoding the coded video data, searches the utilization information, and a supplying step which, in response to a request from video decoder control means for controlling a video decoder that decodes the coded video data, based on the size information included in the utilization information, reads the coded video data in the access units from the coded data, and supplies the read data to the video decoder.

In a data recording medium and data structure of the present invention, coded data includes coded video data, in access units, obtained by coding video data in predetermined units, and utilization information which is immediately prior to each of one or more decode startable points in the coded video data in the access units, and which is used in decoding the coded video data, and the utilization information includes size information representing the size of each of the access units, the number of the access units being one or greater, the access units being located between the utilization information and the next utilization information.

In a data processing apparatus and data processing method, program, and program (recorded on a program recording medium) of the present invention, utilization information is searched for from coded data. In addition, in response to a request from video decoder control means for controlling a video decoder that decodes coded video data, based on size information included in the utilization information, the coded video data is read in access units from the coded data and is supplied to the video decoder.

In coded data recorded on a data recording medium of the present invention and in a data structure of the coded data, coded video data, in access units, obtained by coding video data in predetermined units, and utilization information which is immediately prior to each of one or more decode startable points in the coded video data in the access units, and which is used in decoding the coded video data, are included, and the utilization information includes size information representing the size of each of the access units, the number of the access units being one or greater, the access units being located between the utilization information and the next utilization information.

Advantages

According to the present invention, data processing having high convenience, etc., can be performed. In particular, read-

BRIEF DESCRIPTION OF THE DRAWINGS

FIG. 5 is an illustration of syntax of a "PLAYLIST.DAT" file.

FIG. 6 is an illustration of syntax of PlayItem( ).

FIG. 7 is an illustration of syntax of PlayListMark( ).

FIG. 8 is an illustration of a relationship between the value of a mark_type and the type of Mark( ).

FIG. 9 is an illustration of relationships among PlayList( ), PlayItem( ), clips, and program streams stored in a clip stream file.

FIG. 10 is an illustration of syntax of clip information file Clip( ).

FIG. 11 is an illustration of relationships among a stream_id and private_stream_id specifying an elementary stream, and elementary streams.

FIG. 12 is an illustration of syntax of StaticInfo( ).

FIG. 13 is an illustration of syntax of DynamicInfo( ).

FIG. 14 is an illustration of syntax of EP_map( ).

FIG. 15 is an illustration of syntax of a program stream, program stream pack, and program stream pack header in MPEG-2 System.

FIG. 16 is an illustration of syntax of a PES packet in MPEG-2 System.

FIG. 17 is an illustration of syntax of a PES packet.

FIG. 18 is an illustration of syntax of a PES packet in MPEG-2 System.

FIG. 19 is an illustration of relationships between values described in the stream_id of a PES packet in MPEG-2 System and attributes (types) of elementary streams.

FIG. 20 is an illustration of stream_id items employed by the disc device.

FIG. 21 is an illustration of syntax of private_stream1_PES_payloads.

FIG. 22 is an illustration of a relationship between the value of private_stream_id and the attribute of an elementary stream which is stored in private_payload( ).

FIG. 23 is an illustration of syntax of private_stream2_PES_payload( ).

FIG. 24 is an illustration of syntax of au_information( ).

FIG. 25 is an illustration of a specific example of a "PLAYLIST.DAT" file.

FIG. 26 is an illustration of specific examples of clip information files "00001.CLP", "00002.CLP", and "00003.CLP".

FIG. 27 is an illustration of a specific example of EP_map( ) in clip information file "00001.CLP".

FIG. 28 is an illustration of specific examples of PlayListMark( ) items in PlayList #0 and PlayList #1.

FIG. 42 is an illustration of specific examples of sets of pts_change_point and DynamicInfo( ) items described in clip information file "00003.CLP".

FIG. 45 is an illustration of other syntax of private_stream2_PES_payload( ).

FIG. 46 is an illustration of other syntax of au_information( ).

Figure 1:
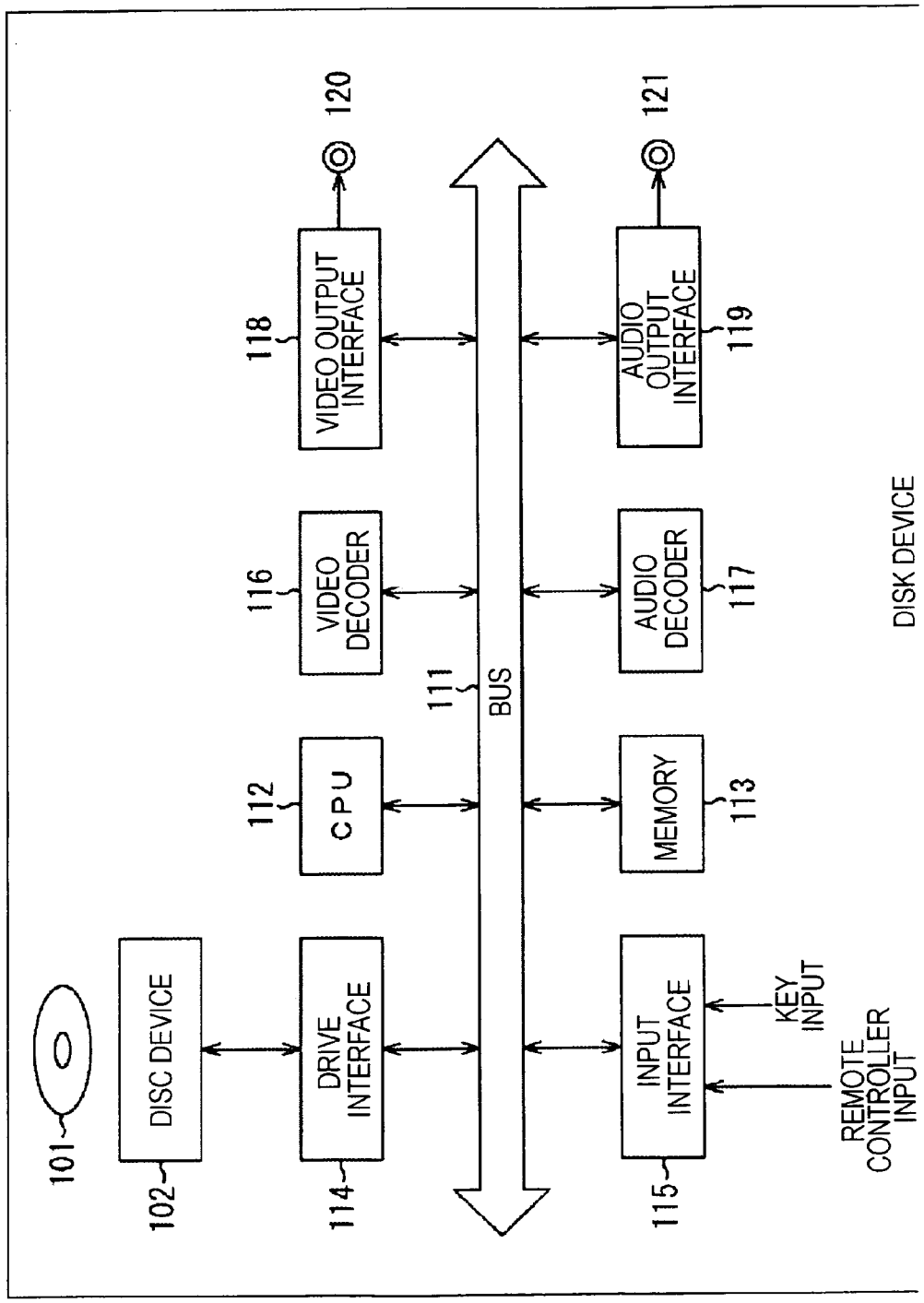
FIG. 1 is a block diagram showing the hardware configuration of an embodiment of a disc device to which the present invention is applied.

REFERENCE NUMERALS 101 disc
102 disc drive
111 bus
112 CPU
113 memory
114 drive interface
115 input interface
116 video decoder
117 audio decoder
118 video output interface
119 audio output interface
120 video output terminal
121 audio output terminal
201 operating system
210 video content playback program
211 script control module
212 player control module
213 content data supplying module
214 decoding control module
214A timer unit
215 buffer control module
215A buffer
216 video decoder control module
217 audio decoder control module
218 subtitle decoder control module
219 graphics processing module
220 video output module
220A FIFO
221 audio output module
221A FIFO
231 data beginning pointer storage unit
232 data writing pointer storing section
233 video reading function unit
234 audio reading function unit
235 subtitle reading function unit 241 video reading pointer storing section
242 stream_id register
243 an_information( ) register
251 audio reading pointer storing section
252 stream_id register
253 private_stream_id register
261 subtitle reading function section
262 subtitle reading pointer storing section
263 stream_id register
264 private_stream_id register An embodiment of the present invention is described below with reference to the drawings.

Hardware Configuration

FIG. 1 is a block diagram showing an example of the hardware of an embodiment of a disc device to which the present invention is applied.

The disc device in FIG. 1 can be applied to, for example, disc players, game machines, car navigation systems, etc.

In the disc device in FIG. 1, a disc 101 is, for example, an optical disc such as DVD, a magneto-optical disc, a magnetic disc, or the like, and contains content data such as video data, audio data, and subtitle data, and, identification, data necessary for playing back the content data.

Data (recorded data) recorded on the disc 101 includes a computer-executable program, if necessary. Also, although, in this embodiment, the disc 101, which is a disc recording medium, is employed as a recording medium, in addition, the recording medium may be, for example, a semiconductor memory, or a tape recording medium. In addition, data transmitted after being read from the disc 101, which is in a remote position, can be input to the disc device in FIG. 1. In other words, reading of data from the disc 101 can be performed by a different device connected to the disc device, and the data read by the different device can be received and processed by the disc device. In addition, the disc device can process data distributed through a network, such as the Internet, by a server or the like including a storage that stores data similar to the data recorded on the disc 101. Moreover, after receiving data from the server or another device, and temporarily recording the data on the disc 101, the disc device can process the data recorded on the disc 101.

In a disc drive 102, the disc 101 can be loaded and unloaded. The disc drive 102 has a built-in interface (not shown), and is connected to a drive interface 114 by the interface. The disc drive 102 drives the disc 101 when it is loaded therein. In accordance with a command, such as reading, from the drive interface 114, the disc drive 102 performs processing such as reading data from the disc 101 and supplying the data to the drive interface 114.

A bus 111 connects to a CPU (Central Processing Unit) 112, a memory 113, the drive interface 114, an input interface 115, a video decoder 116, an audio decoder 117, a video output interface 118, and an audio output interface 119.

The CPU 112 and the memory 113 form a computer system. In other words, the CPU 112 controls the entirety of the disc device by executing software modules that are programs stored in the memory 113, which are described later, and performs various types of processing described later. The memory 113 stores the software modules which are to be executed by the CPU 112. The memory 113 temporarily stores data necessary for operating the CPU 112. The memory 113 can be formed only by a nonvolatile memory or by a combination of a volatile memory and a nonvolatile memory. In addition, when the disc device in FIG. 1 is provided with a hard disk and the software modules to be executed by the CPU 112 are recorded (installed) on the hard disk, the memory 113 can be formed only by a nonvolatile memory.

Here, the programs (software modules) to be executed by the CPU 112 can be recorded beforehand (stored) in the memory 113, which is a built-in recording medium of the disc device.

Alternatively, the programs can be temporarily or eternally stored (recorded) on the disc 101, and, in addition, in removable recording media such as a flexible disc other the disc 101, a CD-ROM (Compact Disc Read Only Memory), an MO (Magneto Optical) disc, a magnetic disc, and a memory card. These removable recording media can be provided as so-called package software.

The programs can be stored in the memory 113 beforehand, or can be installed from a removable recording medium, as described above, to the disc device. In addition, the programs can be wirelessly transferred from a download site to the disc device through a satellite for digital satellite broadcasting, and can be transferred by wire from the download site to the disc device through a network such as the Internet. The disc device can receive the programs by using the input interface 115 and can install the programs in the memory 113.

Moreover, the programs may be processed by a single CPU and may be processed in distributed form by a plurality of CPUs.

The drive interface 114 controls the disc drive 102 under the control of the CPU 112, whereby data read from the disc 101 by the disc drive 102 is supplied to the CPU 112, the memory 113, the video decoder 116, the audio decoder 117, etc., through the bus 111.

The input interface 115 receives signals which are supplied such that a user operates keys (buttons), which are not shown, and a remote controller, and supplies the signals to the CPU 112 through the bus 111. In addition, the input interface 115 also functions as, for example, a modem (including an ADSL (Asymmetric Digital Subscriber Line) modem), and a communication interface such as an NIC (Network Interface Card).

The video decoder 116 decodes coded data (coded video data) of video data which is read from the disc 101 by the disc drive 102 and which is supplied through the drive interface 114 and the bus 111, and supplies the resultant video data to the CPU 112 and the video output interface 118 through the bus 111.

The audio decoder 117 decodes coded data (coded audio data) of audio data which is read from the disc 101 by the disc drive 102 and which is supplied through the drive interface 114 and the bus 111, and supplies the resultant audio data to the CPU 112 and the audio output interface 119 through the bus 111.

The video output interface 118 performs necessary processing on the video data supplied through the bus 111 and outputs the processed data from the video output terminal 120. The audio output interface 119 performs necessary processing on the audio data supplied through the bus 111 and outputs the processed data from the audio output terminal 121.

The video output terminal 120 is connected to a video output device, which is not shown, such as a CRT (Cathode Ray Tube) or a liquid crystal panel. Accordingly, the video data output from the video output terminal 120 is supplied and displayed on the video output device. The audio output terminal 121 is connected to an audio output device, which is not shown, such as a speaker or an amplifier. Accordingly, the audio data output from the audio output terminal 121 is supplied and output by the audio output device.

Supplying of the video data and the audio data to the video output device and the audio output device can be performed either by wire or by wireless.

Configuration of Software Modules

Figure 2:
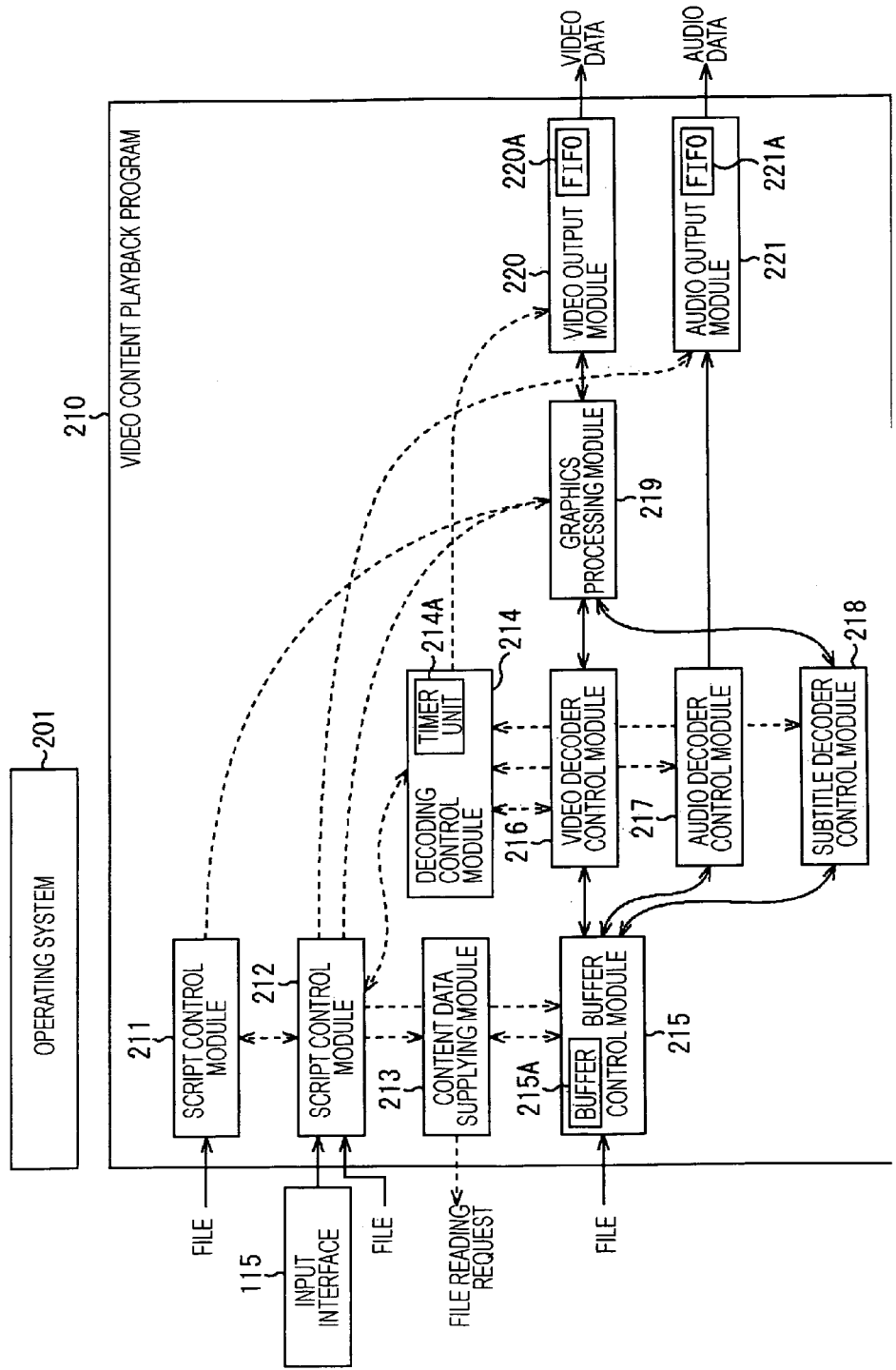
FIG. 2 is a block diagram showing an example of the configuration of software modules that are executed by a CPU 112.

Next, FIG. 2 shows an example of the configuration of the software modules that the CPU 112 in FIG. 1 executes.

The software modules that the CPU 112 executes are broadly divided into an operating system (OS) 201 and a video content playback program 210, which is an application program.

"Operating System 201"

When power is supplied to the disc device, the operating system 201 initially starts (the CPU 112 executes the operating system 201) to perform necessary processing such as initial setting, and calls the video content playback program 210, which is an application program.

The operating system 201 provides the video content playback program 210 with infrastructure service such as file reading. Specifically, regarding, for example, file reading, in response to a file reading request from the video content playback program 210, the operating system 201 provides a service of reading data on the disc 101 by using the drive interface 114 to operate the disc drive 102 and passing the data to the video content playback program 210. The operating system 201 also performs interpretation of a file system, etc.

The operating system 201 has a multitask processing function and enables a plurality of software modules to time-divisionally operate at (apparently) the same time. In other words, the video content playback program 210 includes some software modules, and these software modules can operate in parallel.

"Video Content Playback Program 210"

The video content playback program 210 includes a script control module 211, a player control module 212, a content data supplying module 213, a decoding control module 214, a buffer control module 215, a video decoder control module 216, an audio decoder control module 217, a subtitle decoder control module 218, a graphics processing module 219, a video output module 220, and an audio output module 221.

The video content playback program 210 is software that plays a main role in playing back the disc 101, and, when the disc 101 is loaded (inserted) into the disc drive 102, confirms whether the disc 101 has content recorded in a format, which is described later. After reading a script file, which is described later, from the disc 101, the video content playback program 210 executes the file. In addition, the video content playback program 210 reads, from the disc 101, a file of metadata (database information) necessary for playing back the content recorded on the disc 101, and controls content playback on the basis of the metadata.

The software modules forming the video content playback program 210 in FIG. 2 are described below. In FIG. 2, as a rule, the solid line arrows indicate content data, and the dotted line arrows indicate control data.

"Script Control Module 211"

The script control module 211 interprets and executes script programs (scripts) described in the script file recorded on the disc 101. In the script programs, for example, operations can be described, such as "creating and displaying an image, such as a menu, by operating the graphics processing module 219", "changing a menu display in accordance with a signal from a UI (User Interface) such as a remote controller (e.g., moving a cursor on the menu, etc.)", and "controlling the player control module 212".

"Player Control Module 212"

The player control module 212 performs control concerning content playback by referring to the metadata (database information) recorded on the disc 101, etc. In other words, the player control module 212 analyzes, for example, PlayList( ) and Clip( ) recorded on the disc 101, which are described later, and controls the content data supplying module 213, the decoding control module 214, and the buffer control module 215. In accordance with instructions from the script control module 211 and the input interface 115, the player control module 212 also performs control such as stream switching in which a stream to be played back is switched, which is described later. In addition, the player control module 212 acquires a time from the decoding control module 214, and performs displaying the time, mark (Mark( ) described later) process, etc.

"Content Data Supplying Module 213"

Under the control of the player control module 212 or based on the amount of data stored in the buffer control module 215, the content data supplying module 213 requests the operating system 201 to read the content data, the metadata, etc., from the disc 101.

The metadata, etc., read from the disc 101 by the operating system 201 in response to a request from the content data supplying module 213, are supplied to necessary modules. In addition, the content data, read from the disc 101 by the operating system 201 in response to a request from the content data supplying module 213, is supplied to the buffer control module 215.

"Decoding Control Module 214"

Under the control of the player control module 212, the decoding control module 214 controls operations of the video decoder control module 216, the audio decoder control module 217, and the subtitle decoder control module 218. In addition, the decoding control module 214 has a built-in timer unit 214A for time measurement. The decoding control module 214 manages synchronization between outputting video data which is to be output under the control of the video decoder control module 216, and outputting data (output data) which is to be output in synchronization with the video data, that is, outputting audio data which is to be output under the control of the audio decoder control module 217.

"Buffer Control Module 215"

The buffer control module 215 has a built-in buffer 215A that is part of the storage area of the memory 113 in FIG. 1. By requesting the operating system 201 by the content data supplying module 213, the content data read from the disc 101 is temporarily stored in the buffer 215A.

In addition, in accordance with a request from the video decoder control module 216, the audio decoder control module 217, or the subtitle decoder control module 218, the buffer control module 215 supplies the data stored in the buffer 215A to the video decoder control module 216, the audio decoder control module 217, or the subtitle decoder control module 218.

Specifically, the buffer control module 215 has a built-in video reading function unit 233, audio reading function unit 234, and subtitle reading function unit 235, which are described later with reference to FIG. 3. By using the video reading function unit 233 to process a data request from the video decoder control module 216, the buffer control module 215 supplies the data stored in the buffer 215A to the video decoder control module 216. Similarly, the buffer control module 215 supplies the data stored in the buffer 215A to the audio decoder control module 217 by using the audio reading function unit 234 to process a data request from the audio decoder control module 217, and supplies the data stored in the buffer 215A to the subtitle decoder control module 218 by using the subtitle reading function unit 235 to process a data request from the subtitle decoder control module 218.

"Video Decoder Control Module 216"

By operating the video reading function unit 233 (FIG. 3) in the buffer control module 215, from the buffer 215A in the buffer control module 215, the video decoder control module 216 reads data (coded video data) in which video data is coded, in video access units, and supplies the data to the video decoder 116 in FIG. 1. The video decoder control module 216 also controls the video decoder 116 to decode the data in video access units. In addition, the video decoder control module 216 supplies the graphics processing module 219 with video data obtained by decoding in the video decoder 116.

Here, a video access unit corresponds to, for example, one picture (one frame or one field) of video data.

"Audio Decoder Control Module 217"

By operating the audio reading function unit 234 (FIG. 3) in the buffer control module 215, from the buffer 215A in the buffer control module 215, the audio decoder control module 217 reads data (coded audio data) in which audio data is coded, and supplies the data to the audio decoder 117. The audio decoder control module 217 also controls the audio decoder 117 to decode the data in audio access units. In addition, the audio decoder control module 217 supplies the audio output module 221 with audio data obtained by decoding in the audio decoder 117.

Here, an audio access unit corresponds to a predetermined amount (e.g., an amount that is output in synchronization with one picture) of audio data. In this embodiment, the audio access unit is, for example, a known fixed length.

"Subtitle Decoder Control Module 218"

By operating the subtitle reading function unit 235 (FIG. 3) in the buffer control module 215, from the buffer 215A in the buffer control module 215, the subtitle decoder control module 218 reads, in subtitle access units, data (coded subtitle data) obtained by coding subtitle data. The subtitle decoder control module 218 also includes subtitle decoding software, which is not shown, and decodes the data read from the buffer 215A. In addition, the subtitle decoder control module 218 supplies the graphics processing module 219 with subtitle data (image data of subtitle) obtained by the decoding.

Here, a subtitle access unit corresponds to a predetermined amount (e.g., an amount that is output in synchronization with one picture) of subtitle data. In this embodiment, the size of a subtitle access unit is described, for example, at the beginning of the subtitle access unit.

"Graphics Processing Module 219"

In the graphics processing module 219, in accordance with the control (instructions) of the player control module 212, the subtitle data from the subtitle decoder control module 218 is enlarged and reduced and the obtained data is added to (overlaid with) the video data from the video decoder control module 216. In addition, the graphics processing module 219 performs enlargement, reduction, or the like, in order that the size (image frame) of the video data obtained after being added to the subtitle data may match the display screen on the video output device, and outputs the resultant video data to the video output module 220.

In the graphics processing module 219, in accordance with the control (instructions) of the script control module 211 and the player control module 212, menus, messages, etc., are generated and overlaid with the output video data.

Moreover, based on an aspect ratio of the video output device connected to the video output terminal 120 in FIG. 1, information which is recorded on the disc 101 and which specifies the aspect ratio of video data, the graphics processing module 219 converts the aspect ratio of the video data to be output to the video output module 220.

Specifically, for example, when the aspect ratio of the video output device is 16:9, and the information which specifies the aspect ratio of the video data represents an aspect ratio of 4:3, in the graphics processing module 219, the video data to be output to the video output module 220 is squeezed (reduced) in a lateral direction (horizontal direction), and the obtained data in which right and left portions are darkened is output. In addition, for example, when the aspect ratio of the video output device is 4:3, and the information which specifies the aspect ratio of the video data represents an aspect ratio of 16:9, in the graphics processing module 219, the video data to be output to the video output module 220 is squeezed in a longitudinal direction (vertical direction), and top and bottom portions are darkened, and the processed data is output.

When both the aspect ratio of the video output device and the aspect ratio represented by the information which represents the aspect ratio of video data are the same of 4:3 or 16:9, the graphics processing module 219 directly outputs the video data to be output to the video output module 220 without performing squeeze processing.

In addition, in response to a request from, for example, the player control module 212, the graphics processing module 219 captures video data which is being processed. Furthermore, the graphics processing module 219 stores or supplies the captured video data to the player control module 212.

"Video Output Module 220"

The video output module 220 exclusively occupies a part of the memory 113 in FIG. 1 for use as a FIFO (First In First Out) 220A (buffer), temporarily stores the video data from the graphics processing module 219, and reads video data stored in the FIFO 220A, if necessary, and outputs the read data to the video output terminal 120 (FIG. 1).

"Audio Output Module 221"

The audio output module 221 exclusively occupies a part of the memory 113 in FIG. 1 for use as a FIFO 221A (buffer), temporarily stores the audio data from the audio decoder control module 217 (the audio decoder 117), and reads the audio data stored in the FIFO 221A, if necessary, and outputs the read data to the audio output terminal 121 (FIG. 1).

In addition, when the audio data from the audio decoder control module 217 is audio data of a dual (bilingual) mode in which a left channel represents audio data of "main audio" and a right channel represents audio data of "sub-audio", in accordance with an audio output mode specified beforehand, the audio output module 221 outputs, to the audio output terminal 121, the audio data from the audio decoder control module 217.

Specifically, when, for example, "main audio" is specified as the audio output mode, the audio output module 221 copies, as right channel audio data, left channel audio data in the audio data from the audio decoder control module 217, and outputs audio data (audio data of "main audio") of the left channel and the right channel to the audio output terminal 121. In addition, when "sub-audio" is specified as the audio output mode, the audio output module 221 copies, as left channel audio data, right channel audio data in the audio data from the audio decoder control module 217, and outputs the audio data (audio data of "sub-audio") of the left channel and the right channel to the audio output terminal 121. Furthermore, when "main and sub-audio" is specified as the audio output mode, the audio output module 221 directly outputs the audio data from the audio decoder control module 217 to the audio output terminal 121.

When the audio data from the audio decoder control module 217 is audio data of a stereo mode, the audio output module 221 directly outputs the audio data from the audio decoder control module 217 to the audio output terminal 121 regardless of the specification of the audio output mode.

Here, the specification of the audio output mode can be interactively performed, for example, by the user operating the remote controller or the like on a screen displaying a menu generated by the video content playback program 210.

"Configuration of Buffer Control Module 215"

Figure 3:
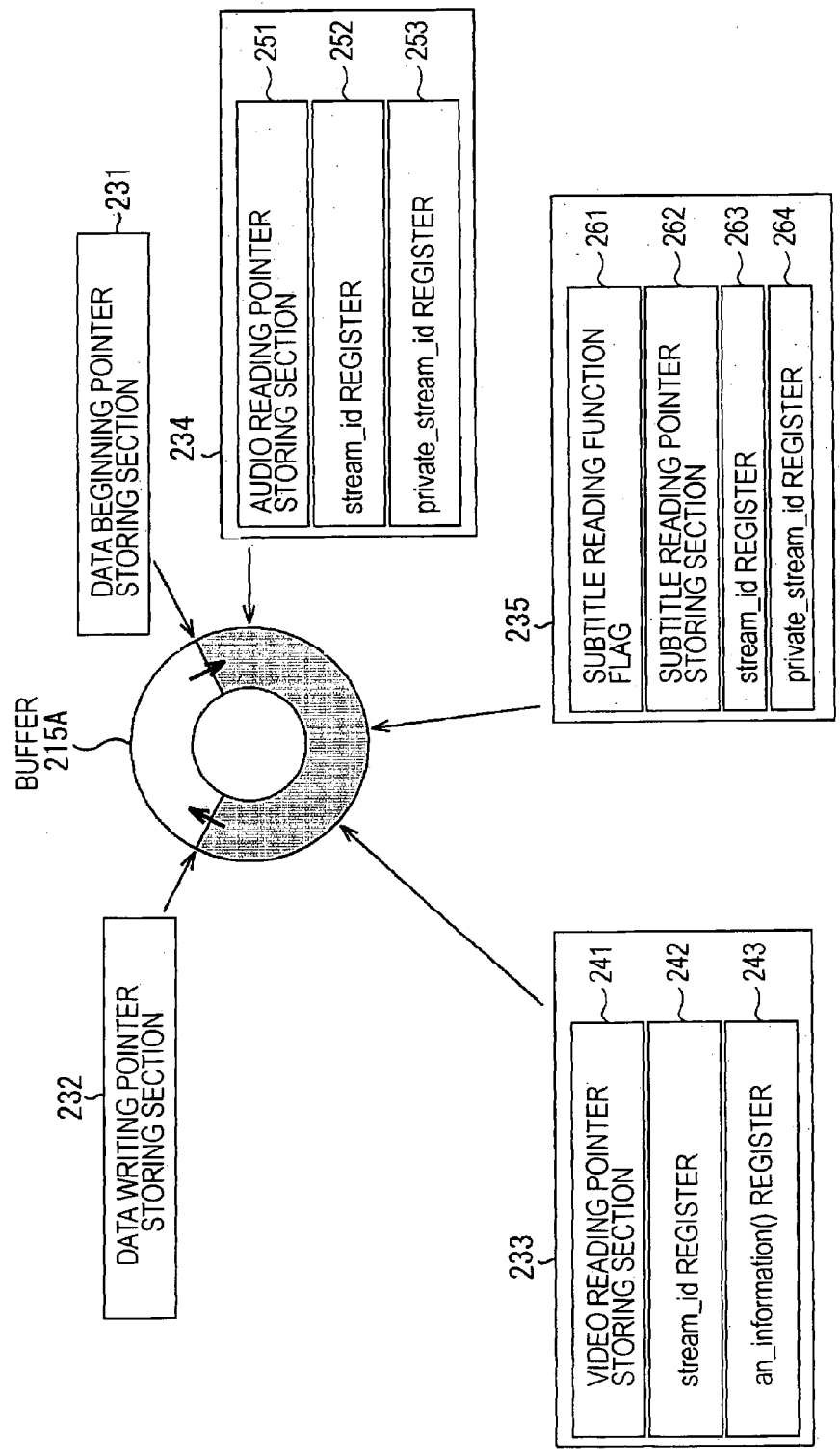
FIG. 3 is a block diagram showing an example of the configuration of a buffer control module 215.

Next, FIG. 3 shows an example of the configuration of the buffer control module 215 in FIG. 2.

The buffer control module 215 exclusively uses a part of the memory 113 in FIG. 1 to temporarily store the data read from the disc 101 in the buffer 215A. The buffer control module 215 reads the data stored in the buffer 215A and supplies the read data to the video decoder control module 216, audio decoder control module 217, or subtitle decoder control module 218 in FIG. 2.

In other words, the buffer control module 215 includes, in addition to the buffer 215A, a data beginning pointer storage unit 231 and data writing pointer storing section 232 which are a part of the memory 113, and has, as internal modules, a video reading function unit 233, an audio reading function unit 234, and a subtitle reading function unit 235.

The buffer 215A is, for example, a ring buffer, and sequentially stores the data read from the disc 101. After it stores the data for its storage capacity, it stores the latest data so as to overwrite the oldest data in the form of a so-called infinite loop.

In the data stored in the buffer 215A, a data beginning pointer indicating a position (address) at which the oldest data has not been read yet from the buffer 215A is stored in the data beginning pointer storage unit 231.

The data writing pointer storing section 232 stores a writing pointer indicating a position (address) in the buffer 215A at which the latest data read from the disc 101 is written.

Here, positions indicated by the data writing pointer are updated right-handed (clockwise) in FIG. 3 whenever data read from the disc 101 is stored in the buffer 215A, and positions indicated by the data beginning pointer are updated right-handed in FIG. 3 in response to reading of data from the buffer 215A. Therefore, in the data stored in the buffer 215A, data that is so-called effective is data stored right-handed from a position indicated by the data beginning pointer to a position indicated by the data writing pointer.

The video reading function unit 233 reads a video stream (elementary stream concerning video data) from the buffer 215A in response to a request from the video decoder control module 216 in FIG. 2, and supplies the read stream to the video decoder control module 216. Also the audio reading function unit 234 reads an audio stream (elementary stream concerning audio data) from the buffer 215A in response to a request from the audio decoder control module 217, and supplies the read stream to the audio decoder control module 217. Also the subtitle reading function unit 235 reads a subtitle stream (elementary stream concerning subtitle data) from the buffer 215A, and supplies the read stream to the subtitle decoder control module 218.

Specifically, on the disc 101, for example, a program stream in accordance with the standard of MPEG (Moving Picture Experts Group)-2 is recorded, and the buffer 215A stores a program stream read from the disc 101. In this program stream, one or more elementary streams, such as a video stream, an audio stream, and a subtitle stream, are time-divisionally multiplexed. The video reading function unit 233 has a function of demultiplexing a program stream, and separately reads the video stream from the program stream stored in the buffer 215A.

Similarly, also the audio reading function unit 234 has a function of demultiplexing a program stream, and separately reads the audio stream from program stream stored in the buffer 215A. Also the subtitle reading function unit 235 has a function of demultiplexing a program stream, and separately reads the subtitle stream from the program stream stored in the buffer 215A.

Here, the video reading function unit 233 includes a video reading pointer storing section 241, a stream_id register 242, and an an_information( ) register 243, which are a part of the memory 113 in FIG. 1.

The video reading pointer storing section 241 stores a video reading pointer indicating a position (address) in the buffer 215A at which a video stream is stored, and the video reading function unit 233 reads, as a video stream, data stored at the position indicated by the video reading pointer. The stream_id register 242 analyzes the program stream stored in the buffer 215A, and stores a stream_id, which is described later, for identifying a video stream that is to be read from the program stream. The an_information( ) register 243 stores later described an au_information( ) which is necessary (utilized for reading the video stream) for reading the video stream from the buffer 215A.

The audio reading function unit 234 includes an audio reading pointer storing section 251, a stream_id register 252, and a private_stream_id register 253, which are a part of the memory 113 in FIG. 1.

The buffer control module 215 stores an audio reading pointer indicating a position (address) in the buffer 215A at which the audio stream is stored, and the audio reading function unit 234 reads, as the audio stream, data stored at the position indicated by the audio reading pointer. The stream_id register 252 and the private_stream_id register 253 analyze the program stream stored in the buffer 215A, and respectively store a later-described stream_id and private_id for identifying an audio stream which is to be read from the program stream.

The subtitle reading function unit 235 includes a subtitle reading function section 261, a subtitle reading pointer storing section 262, a stream_id register 263, and a private_stream_id register 264, which are a part of the memory 113 in FIG. 1.

The subtitle reading function section 261 stores a subtitle reading function flag. When the subtitle reading function flag stored in the subtitle reading function section 261 is, for example, 0, the subtitle reading function unit 235 does not function, and, when the subtitle reading function flag stored in the subtitle reading function section 261 is, for example, 1, the subtitle reading function unit 235 functions.

The subtitle reading function section 261 stores a subtitle reading pointer indicating a position (address) in the buffer 215A at which the subtitle stream is stored, and the subtitle reading function unit 235 reads, as the subtitle stream, data stored at the position indicated by the subtitle reading pointer. The stream_id register 263 and the private_stream_id register 264 analyze the program stream stored in the buffer 215A, and respectively store later described stream_id and private_stream_id for identifying a subtitle stream which is to be read from the program stream.

Description of Data Format of Data Recorded on Disc 101

Next, the data format of data recorded on the disc 101 is described.

Figure 4:
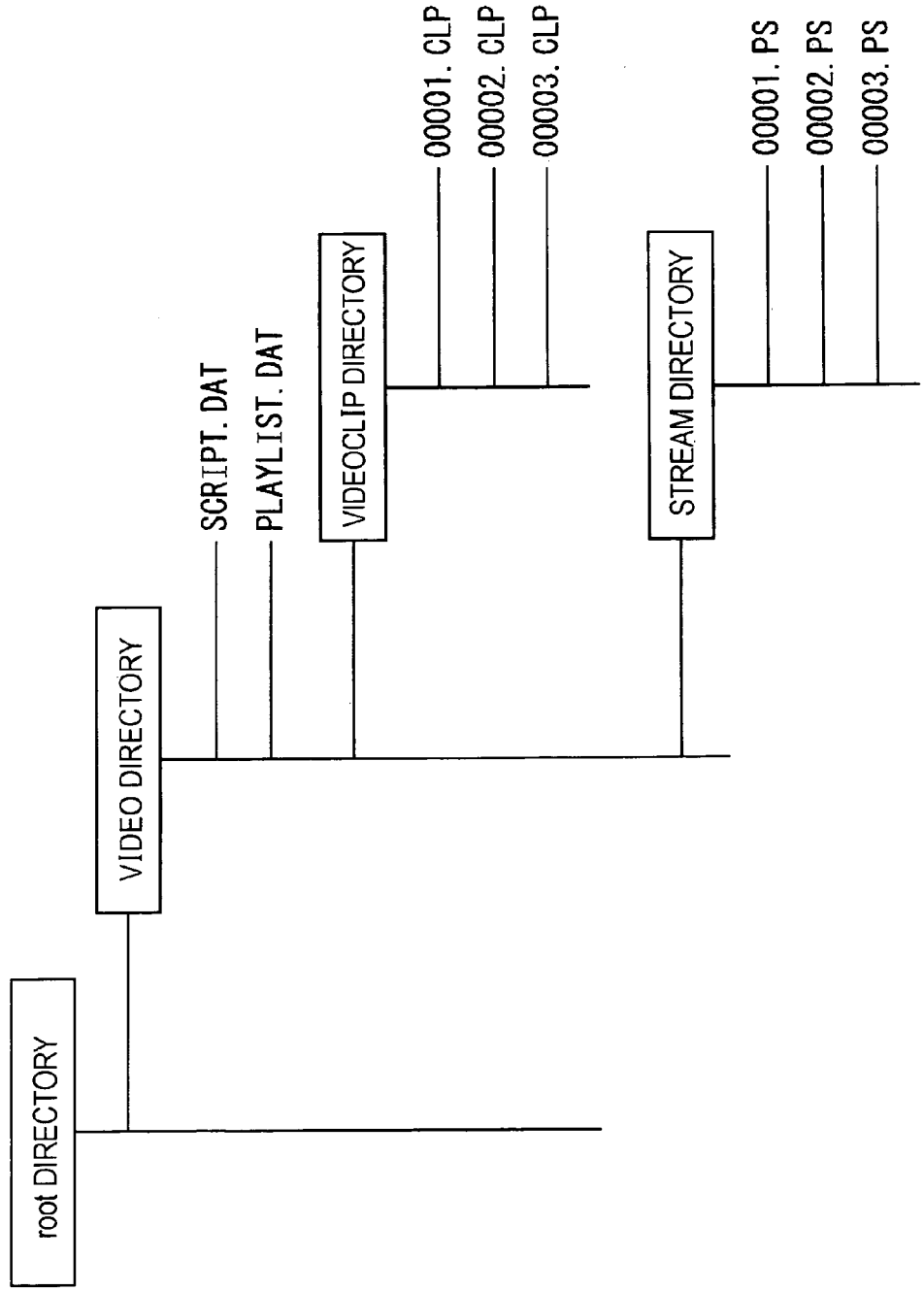
FIG. 4 is an illustration of an example of the configuration of directories on a disc 101.

FIG. 4 shows the directory structure of the disc 101.

For example, a file system provided in ISO (International Organization for Standardization)-9660, UDF (Universal Disk Format: http://www.osta.org/specs/), or the like, is used as the file system of the disc 101, and files of the data recorded on the disc 101 are hierarchically managed in a directory structure. Here, the file system is not limited to the above file systems.

In FIG. 4, in a root directory representing a file system origin, a "VIDEO" directory is located, and, in the "VIDEO" directory, two directories, a "CLIP" directory and a "STREAM" directory, are located.

In the "VIDEO" directory, in addition to the two directories, the "CLIP" directory and the "STREAM" directory, two data files, a "SCRIPT.DAT" file and a "PLAYLIST.DAT" file, are located.

The "SCRIPT.DAT" file is a script file in which a script program is described. Specifically, in the "SCRIPT.DAT" file, the script program, which is used to make a playback form of the disc 101 interactive, is described. The script program described in the "SCRIPT.DAT" file is interpreted and executed by the script control module 211 in FIG. 2.

The "PLAYLIST.DAT" file stores at least one play list (the PlayList( ) in FIG. 5, which is described later) in which a process of playing back content, such as the video data recorded on the disc 101, is described.

In the "CLIP" directory, one or more clip information files are located, and, in the "STREAM" directory, one or more clip stream files are located. In other words, in FIG. 4, in the "CLIP" directory, three clip information files "00001.CLP", "00002.CLP", and "00003.CLP" are located, and, in the "STREAM" directory, three clip stream files "00001.PS", "00002.PS", and "00003.PS" are located.

A clip stream file stores a program stream in which one or more elementary streams, obtained by compressing and coding one or more types of data (stream), such as video data, audio data, and subtitle data, are time-divisionally multiplexed.

In a clip information file, (file) metadata concerning a clip stream, such as the nature of a corresponding clip stream file, is described.

In other words, the clip streams and the clip information files have one-to-one correspondence. In FIG. 4, file names are assigned to the clip stream files in accordance with a naming rule of Five Numerals+Period+"PS", and file names are assigned to the clip information files in accordance with a naming rule of Five numerals identical to those of the corresponding clip stream file+Period+"CLP".

Accordingly, regarding which of a clip stream file and a clip information file a file is, the file can be identified by an extension (the right part from the period) of the file name. In addition, regarding a corresponding clip stream file and clip information file, they can be identified depending on whether or not parts (the left part from the period) other than extensions of the file names match.

Details of the files recorded on the disc 101 are described below.

"PLAYLIST.DAT"

FIG. 5 shows the internal structure (syntax) of the "PLAYLIST.DAT" file in the "VIDEO" directory.

Here, in FIG. 5, the description in the "Syntax" field represents a data structure. The descriptions in the "No. of bits" field represent bit lengths of data in corresponding rows of the "Syntax" field. In addition, "bslbf" (bit string left bit first) in the "Mnemonic" field indicates that data in the "Syntax" field in a corresponding row is fed from the leftmost bit, and "uimsbf" (unsigned integer most significant bit first) indicates that the data in the "Syntax" field in the corresponding row is an unsigned integer value and is fed from the most significant bit. This also applies to figures similar to FIG. 5, which are described below.

In the "PLAYLIST.DAT" file, from the beginning thereof, a name_length (8 bits) and a name_string (255 bytes) for writing information such as its name (file name) are sequentially located.

In other words, the name_length represents the size of the name_string, which follows it, by the number of bytes. The name_string represents the name (file name) of the "PLAYLIST.DAT" file.

Regarding the name_string, a portion from the beginning thereof for the number of bytes represented by the name_length is used as a valid name. For example, when the name_length has a value of 10, a portion of the name_string extending for 10 bytes from the beginning thereof is interpreted as a valid name.

Following the name_string, a number_of_PlayLists (16 bits) is located. The number_of_PlayLists represents the number of the following PlayList( ) items. After the number_of_PlayLists, as many PlayList( ) items as the number in the number_of_PlayLists are located.

The PlayList( ) is a play list in which a process of playing back the clip stream files recorded on the disc 101 is described, and has the following internal structure.

Specifically, at the beginning of PlayList( ), PlayList_data_length (32 bits) is located. The PlayList_data_length represents the size of the PlayList( ).

Following the PlayList_data_length, a reserved_for_word_alignment (15 bits) and a capture_enable_flag_PlayList (1 bit) are sequentially located. The reserved_for_word_alignment of 15 bits is located at the position of a 1-bit capture_enable_flag_PlayList subsequently located in order to establish word alignment (in order to perform alignment at the positions of 16 bits). A capture_enable_flag_PlayList is a 1-bit flag indicating whether to permit secondary use, in the disc device in FIG. 1, in which the disc 101 is played back, of video data (video data belonging to the PlayList( )) corresponding to a video stream played back based on the PlayList( ). When the capture_enable_flag_PlayList has, for example, 1 between 0 and 1, it indicates that the secondary use of the video data belonging to the PlayList( ) is permitted, and, when the capture_enable_flag_PlayList has, for example, 0 between 0 and 1, it indicates that the secondary use of the video data belonging to the PlayList( ) is not permitted (prohibited).

Although, in FIG. 5, the capture_enable_flag_PlayList is formed by one bit, by using a plurality of bits to form the capture_enable_flag_PlayList, the secondary use of the video data belonging to the PlayList( ) can be permitted in so-called stages. Specifically, the capture_enable_flag_PlayList can be formed by, for example, two bits. When the value of the capture_enable_flag_PlayList is 00B (B indicates that numerals prior to it are a binary number), the secondary use of the video data can be prohibited. When the value of the capture_enable_flag_PlayList is 01B, only secondary use can be permitted in which the video data is used in a form reduced to a size equal to or less than 64 by 64 pixels. In addition, when the value of the capture_enable_flag_PlayList is 10B, secondary use of the video data can be permitted without limiting the size.

Furthermore, as described above, in the secondary use of the video data, the use can be limited without limiting the size. Specifically, when the value of the capture_enable_flag_PlayList is 01B, only the video content playback program 210 (FIG. 2) can permit the secondary use.

When the value of the capture_enable_flag_PlayList is 10B, secondary use by an arbitrary application including the video content playback program 210 in the disc device in FIG. 1 can be permitted. Here, applications other than the video content playback program 210 in the disc device in FIG. 1 include, for example, an application for displaying wallpaper (background) and a screen saver.

When, as described above, the capture_enable_flag_PlayList is formed by two bits, the reserved_for_word_alignment located before it has 14 bits for establishing word alignment.

In addition to permission of secondary use of the video data in the disc device, the capture_enable_flag_PlayList can permit secondary use outside the disc device. Here, when the secondary use of the video data outside the disc device is permitted, the video data is recorded in, for example, a recording medium that can be loaded into the disc device and a recording medium that can be loaded into another device connectable to the disc device, or is transmitted (distributed) to another device through a network such as the Internet. In this case, the number of times the video data is recorded on the recording medium and information limiting the number of times the video data is distributed can be added to the video data.

Following the capture_enable_flag_PlayList, a PlayList_name_length (8 bits) and a PlayList_name_string bytes) are sequentially located. The PlayList_name_length uses the number of bytes to represent the size of the PlayList_name_string subsequently located, and the PlayList_name_string represents the name of the PlayList( ).

Following the PlayList_name_string, a number_of_PlayItems (16 bits) is located. The number of pixels represents the number of the following PlayItem( ) items.

Following the number_of_PlayItems, as many structures of the PlayItem( ) items as the number in the number_of_PlayItems are described.

Here, in one PlayList( ) item, a process of playing back content can be described in PlayItem( ) units.

In addition, in the PlayList( ), for each of as many PlayItem( ) items as the number in the number_of_PlayItems, a unique ID (Identification) in the PlayList( ) is assigned. Specifically, 0 is assigned as ID to the first PlayItem( ) in the PlayList( ), and, serial numbers of ID, such as 1, 2, are assigned to the following PlayItem( ) items in order of their appearance.

Following as many PlayItem( ) items as the number in the number_of_PlayItems, one PlayListMark( ) item is located. The PlayListMark( ) is a set of later-described Mark( ) that serves as a mark on a time base of playback performed in accordance with the PlayList( ), and its details are described later with reference to FIG. 7.

"Description of PlayItem( )"

Next, FIG. 6 shows the internal structure of the PlayItem( ) included in the PlayList( ) in FIG. 5.

At the beginning of the PlayItem( ), a length (16 bits) is located, and the length represents the size of the PlayItem( ) including it.

Following the length, a Clip_Information_file_name_length (16 bits) and a Clip_Information_file_name (variable length) are sequentially located. The Clip_Information_file_name_length uses the number of bytes to represent the size of the Clip_Information_file_name subsequently located. The Clip_Information_file_name represents a file name of a clip information file (files in FIG. 4 whose extensions are CLP) corresponding to a clip stream file (file in FIG. 4 whose extension is PS) which is to be played back by the PlayList( ). Based on the above-described naming rule for file names of the clip stream file and the clip information files, the file name of a clip information file to be played back by the PlayItem( ) can be recognized and the clip stream file can be specified.

Following the Clip_Information_file_name, an IN_time (32 bits) and an OUT_time (32 bits) are sequentially located. The IN_time and the OUT_time are respectively time information designating a playback start position and time information designating a playback end position in a clip stream file specified by the Clip_Information_file_name.

According to the IN_time, a position in the middle of the clip stream file (including the beginning thereof) can be designated as a playback start position, and, according to the OUT_time, a position in the middle of the clip stream file (including its end) can be designated as a playback end position.

Here, according to the PlayItem( ), content between the IN_time and the OUT_time of the clip stream file specified by the Clip_Information_file_name is played back. Content played back by the PlayItem( ) is hereinafter referred to as a clip, if necessary.

"Description of PlayListMark( )"

Next, FIG. 7 shows the internal structure of the PlayListMark( ) included in the PlayList( ) in FIG. 5.

As described above, PlayListMark( ) is a set of zero or more Mark( ) items which each serve as a mark on a time base of playback performed in accordance with the PlayList( ) (FIG. 5) including the PlayListMark( ). One Mark( ) item includes at least time information representing a time on the time base of playback performed in accordance with the PlayList( ), type information representing the type of Mark( ), and argument information in which, when the type information represents a type of creating an event, the argument information serves as an argument for the event.

Specifically, at the beginning of the PlayListMark( ), a length (32 bits) is located. The length represents the size of the PlayListMark( ) including it.

Following the length, a number_of_PlayList_marks (16 bits) is located, and the number_of_PlayList_marks represents the number of marks (Mark( )) subsequently located.

Following the number_of_PlayList_marks, as many structures of marks as the number in the number_of_PlayList_marks are described.

At the beginning of the Mark( ), a mark_type (8 bits) is located. The mark_type is the above type information and represents the type of Mark( ) including the mark_type.

In this embodiment, the types of Mark( ) include, for example, three types, Chapter, Index, and Event.

Mark( ) (hereinafter referred to as a chapter mark, if necessary) whose type is Chapter is a mark of a beginning position in a chapter which is a cue unit of dividing the PlayList( ). In addition, Mark( ) (hereinafter referred to as an index mark) whose type is Index is a mark of a beginning position in an index which is a unit of further dividing the chapter. Mark( ) (hereinafter referred to as an event mark, if necessary) whose type is Event is a mark of a position at which an event is created during playing back content in accordance with the PlayList( ). Creation of the event by the event mark is reported to the script control module 211, as described later.

Here, a relationship between the value of the mark_type and the type of Mark( ) is shown in FIG. 8. According to FIG. 8, 1 is set in the mark_type in the chapter mark. In addition, 2 is set in the mark_type in the index mark, and 3 is set in the mark_type in the event mark. In FIG. 8, among 8-bit values represented by the mark_type, 0, and 4 to 255 are reserved for extension in the future.

Referring back to FIG. 7, following the mark_type, a mark_name_length (8 bits) is located. In addition, at the end of the Mark( ), a mark_name_string (24 bytes) is located. The mark_name_length and the mark_name_string are used to describe the name of Mark( ). The mark_name_length and the mark_name_string respectively represent an effective size of the mark_name_string and the name of the mark_name_string. Accordingly, the number of bytes represented by the mark_name_length from the beginning of the mark_name_string represent an effective name of Mark( ).

Following the mark_name_length, four elements that associate the Mark( ) defined on the PlayList( ) with the clip stream file, a ref_to_PlayItem_id (16 bits), a mark_time_stamp (32 bits), an entry_ES_stream_id (8 bits), and an entry_ES_private_stream-id (8 bits) are sequentially located.

In the ref_to_PlayItem_id, ID in the form of a seral-number is described for PlayItem( ) to which the Mark( ) belongs. The ref_to_PlayItem_id specifies PlayItem( ) (FIG. 6) to which Mark( ) belongs, and, in addition, as described in FIG. 6, the clip information file and the clip stream file are specified.

The mark_time_stamp represents the position (time) represented by Mark( ) in the clip stream file specified by the ref_to_PlayItem_id.

Here, FIG. 9 shows relationships among PlayList( ), PlayItem( ), clips, and program streams stored in a clip stream file.

In FIG. 9, the PlayList( ) consists of three PlayItem( ) items, and serial number ID #0, #1, and #2 are assigned to the three PlayItem( ) items, respectively. Here, PlayItem( ) to which ID #i is assigned is hereinafter described to as PlayItem #i, if necessary.

In addition, in FIG. 9, clips that are pieces of content to be played back based on PlayItem#0, PlayItem#1, PlayItem#2 are respectively shown as Clip A, Clip B, and Clip C.

Substance of a clip is a program stream, from the IN_time to the OUT_time, among program streams stored in a clip stream file (further specified by a clip information file) specified by the Clip_Information_file_name in the PlayItem( ) in FIG. 6. In FIG. 9, program streams, which are substance of Clip A, Clip B, and Clip C, are respectively shown as Program Stream A, Program Stream B, and Program Stream C.

For example, in FIG. 9, in Mark( ) that serves as the mark of position (time) on the time base of playback performed in accordance with the PlayList( ), its ref_to_PlayItem_id and mark_time_stamp are described in the following manner.

In other words, since time t0 is a time at which playback of PlayItem#1 is performed, 1 as the ID of the PlayItem#1 is described. In addition, since, at time T0, Program Stream B, which is substance of Clip B, is played back based on PlayItem#1, a time corresponding to time t0 of a clip stream file in which Program Stream B is stored is described.

Referring back to FIG. 7 again, when Mark( ) is associated with a particular elementary stream, the entry_ES_stream_id and the entry_ES_private_stream_id are used to specify the elementary stream. Specifically, in the entry_ES_stream_id, a stream_id, which is later described, of (the PES_packet( ) shown in FIGS. 16 to 18, which is described later, in which) an elementary stream that associates Mark( ) (is located) is described. In addition, in the entry_ES_private_stream_id, a private_stream_id, which is described later, in (a private_header( ) in the private_stream1_PES_payload( ), which is later described and which is shown in FIG. 21, in which) the elementary stream that associates Mark( ) (is located), is described.

For example, when, in a clip in which Video Stream #1 and Video Stream #2 are multiplexed, a time of generating Chapter needs to be changed between the case of playing back Video Stream #1 and the case of playing back Video Stream #2, in the entry_ES_stream_id and entry_ES_private_strea- m_id of Mark( ) at a chapter mark generating time in a mode of playing back Video Stream #1, the stream_id and private_stream_id of Video Stream #1 are described. In addition, in the entry_ES_stream_id and entry_ES_private_stream_id of Mark( ) at a chapter mark generating time in a mode of playing back Video Stream #2, the stream_id and private_stream_id of Video Stream #2 are described.

In each of the entry_ES_stream_id and entry_ES_private_stream_id of Mark( ) that is not associated with a particular elementary stream, for example, 0 is described.

Following the entry_ES_private_stream_id, a mark_data bits) is located. The mark_data is argument information in which, when Mark( ) is an event mark, the argument information serves as an argument for an event created by the event mark. When the Mark( ) is a chapter mark or an index mark, the mark_data can be used as the chapter or index number represented by the chapter mark or index mark.

"Description of Clip( )"

Next, the internal structure of the clip information file whose extension is CLP and which is located in the "CLIP" directory is described.

In FIG. 4, in the "CLIP" directory, three clip information files "00001.CLP", "00002.CLP", and "00003.CLP" are located. They respectively store metadata representing the natures, or the like, of clip stream files "00001.PS", "00002.PS", and "00003.PS" located in the "STREAM" directory.

FIG. 10 shows the internal structure of the above clip information file Clip( ).

At the beginning of clip information file Clip( ), a presentation_start_time and a presentation_end_time (32 bits each) are sequentially located. The presentation_start_time and the presentation_end_time respectively represent start and end times in a clip stream file corresponding to clip information file Clip( ). The time in the clip stream file is described by a multiple of 90 kHz in time of MPEG2-System.

Following the presentation_end_time, a reserved_for_word_alignment (7 bits) and a capture_enable_flag_Clip (1 bit) are sequentially located. The 7-bit reserved_for_word_alignment is used to establish word alignment, and, similarly to the above capture_enable_flag_PlayList shown in FIG. 5, the capture_enable_flag_Clip is a flag indicating whether to permit secondary use of video data.

However, the capture_enable_flag_PlayList in FIG. 5 indicates whether to permit secondary use of video data (video data belonging to PlayList( )) corresponding to a video stream which is played back by PlayList( ), while the capture_enable_flag_PlayList in FIG. 10 indicates whether to permit secondary use of video data corresponding to a video stream (elementary stream of video) stored in a clip stream file corresponding to clip information file Clip( ). Therefore, the capture_enable_flag_PlayList in FIG. 5 and the capture_enable_flag_PlayList in FIG. 10 have different units (ranges) of video data whose secondary use is to be permitted.

As described concerning the capture_enable_flag_PlayList in FIG. 5, the capture_enable_flag_PlayList in FIG. 10 can be formed not by one bit but by a plurality of bits.

Following the capture_enable_flag_Clip, a number_of_streams (8 bits) is located, and, in the number_of_streams, the number of following StreamInfo( ) structures is described. Accordingly, following the number_of_streams, as many StreamInfo( ) structures as the number in the number_of_streams are described.

At the beginning of StreamInfo( ), a length (16 bits) is located, and this length represents the size of the StreamInfo( ) including it. Following the length, a stream_id (8 bits) and a private_stream_id (8 bits) are located, and the stream_id and the private_stream_id specify (identify) an elementary stream that is to be associated with the StreamInfo( ).

Here, FIG. 11 shows relationships among the stream_id and the private_stream_id that specify an elementary stream and elementary streams.

The stream_id is identical to that provided in the MPEG2-System specifications, and its value is determined beforehand for each attribute (type) of an elementary stream (data). Therefore, an elementary stream having an attribute defined in the MPEG2-System specifications can be specified only by the stream_id.

In this embodiment, an elementary stream whose attribute is not provided in the MPEG2-System specifications can be also used. The private_stream_id is information identifying an elementary stream whose attribute is not provided in the MPEG2-System specifications.

In FIG. 11, regarding elementary streams of four attributes, or an elementary stream of video encoded by the coding (decoding) defined in MPEG, an elementary stream (hereinafter referred to as an ATRAC audio stream, if necessary) of audio encoded in ATRAC (Adaptive Transform Acoustic Coding), an elementary stream (hereinafter referred to as an LPCM audio stream, if necessary) of audio encoded in LPCM (Linear Pulse Code Modulation), and an elementary stream (hereinafter referred to as a subtitle stream, if necessary) of subtitle, a relationship between the stream_id and the private_stream_id.

In the MPEG2-System standard, it is provided that elementary streams of video encoded by the coding in MPEG are multiplexed by using, as a stream_id identifying an elementary stream, a value in the range of 0xE0 to 0xEF (0x indicates that the following character string is hexadecimal. Accordingly, regarding elementary streams of video encoded in the coding in MPEG, sixteen elementary streams of video that can be identified by the stream_id having the value in the range of 0xE0 to 0xEF can be multiplexed into a program stream.

Since identification of elementary streams of video encoded in the coding defined in MPEG can be performed by the stream_id having the value of 0xE0 to 0xEF, the private_stream_id is not required (can be ignored).

In addition, in the MPEG2-System, regarding the ATRAC audio stream, the LPCM audio stream, and the subtitle audio stream, the stream_id is not defined.

Accordingly, in this embodiment, regarding an elementary stream in which no stream_id is defined in the MPEG2-System, 0xBD that is a value representing an attribute of private_stream_1 in the MPEG2-System is employed as the stream_id, and, in addition, as shown in FIG. 11, the private_stream_id is used to perform identification (specification).

Specifically, in identifying an ATRAC audio stream, a private_stream_id having a value in the range of 0x00 to 0x0F is used. Therefore, sixteen ATRAC audio streams can be multiplexed into a program stream. In addition, in identifying an LPCM audio stream, a private_stream_id having a value in the range of 0x10 to 0x1F is used. Accordingly, sixteen audio streams can be multiplexed into a program stream. In addition, in identifying a subtitle stream, a private_stream_id having a value in the range of 0x80 to 0x9F can be multiplexed into a program stream.

The stream_id and the private_stream_id are further described later.

Referring back to FIG. 10, following the private_stream_id, StaticInfo( ), and reserved_for_word_alignment (8 bits) are sequentially located. In the StaticInfo( ), information that does not change during playback of an elementary stream specified by a stream_id and private_stream_id (described in the StreamInfo( ) including the StaticInfo( )). Details of the StaticInfo( ) are described later with reference to FIG. 12.

The reserved_for_word_alignment is used to establish word alignment.

Following the reserved_for_word_alignment, a number_of_DynamicInfo (8 bits) is located and the number_of_DynamicInfo represents the number of sets of pts_change_point (32 bits) and DynamicInfo( ) which are subsequently located.

Therefore, following the number_of_DynamicInfo, as many structures of the pts_change_point and the DynamicInfo( ) as the number in the number_of_DynamicInfo are described.

The pts_change_point represents a time that information of the DynamicInfo( ) becomes effective, which forms a set with the pts_change_point. Here, the pts_change_point, which represents the time of the head of the elementary stream is equal to a presentation_start_time which is described at the beginning of clip information file Clip( ) corresponding to a clip stream file in which the elementary stream is stored.

In the DynamicInfo( ), so-called dynamic information is described which changes during playback of an elementary stream specified by the stream_id and the private_stream_id. The information described in the DynamicInfo( ) becomes effective at a playback time represented by the pts_change_point, which forms a set with the DynamicInfo( ). Details of the DynamicInfo( ) are described later with reference to FIG. 13.

Following as many sets of pts_change_point and DynamicInfo( ) items as the number in the number_of_DynamicInfo, EP_map( ) is located. The EP_map( ) is described later with reference to FIG. 14.

Next, details of the StaticInfo( ) in FIG. 10 are described with reference to FIG. 12.

FIG. 12 shows syntax of the StaticInfo( ).

The StaticInfo( ) differs in content depending on the attribute (type) of a corresponding elementary stream. The attribute of the elementary stream corresponding to the StaticInfo( ) is identified by the stream_id and private_stream_id included in the StreamInfo( ) in FIG. 10, which includes the StaticInfo( ).

When the elementary stream corresponding to the StaticInfo( ) is a video stream (stream==video), the StaticInfo( ) includes a picture_size (4 bits), a frame_rate bits), and a cc_flag (1 bit), and a reserved_for_word_alignment for establishing word alignment.

The picture_size represents the size of (a picture displayed based on) video data corresponding to the video stream. The frame_rate represents a frame frequency of the video data corresponding to the video stream. The cc_flag indicates whether closed caption data is included in the video stream. In other words, for example, when the closed caption data is included in the video stream, the cc_flag is set to 1, and, when the closed caption data is not included, the cc_flag is set to 0.

When the elementary stream corresponding to the StaticInfo( ) is an audio stream (stream==AUDIO), the StaticInfo( ) includes an audio_language_code (16 bits), a channel_configuration (8 bits), a lfe_existence (1 bit), a sampling_frequency (4 bits), and a reserved_for_word_alignment for establishing word alignment.

In the audio_language_code, a code which represents the language of the audio data included in the audio stream is described. The channel_configuration represents the attribute, such as monaural, stereo, or multichannel, of the audio data included in the audio stream. The lfe_existence indicates whether a low emphasis channel is included in the audio stream. The lfe_existence has 1 when the channel is included, and has 0 when the channel is not included. The sampling_frequency is information representing a sampling frequency of the audio data included in the audio stream.

When the elementary stream corresponding to the StaticInfo( ) is a subtitle stream (stream==SUBTITLE), the StaticInfo( ) includes a subtitle_language_code (16 bits), a configurable_flag (1 bit), and a reserved_for_word_alignment for establishing word alignment.

In the subtitle_language_code, a code is described which represents the language of subtitle data included in the subtitle stream. The configurable_flag is information indicating whether to permit changing display of the subtitle data included in the subtitle stream from a default display form. For example, when changing the display form is permitted, 1 is described, and, when it is not permitted, 0 is described. Subtitle data display includes a display size of subtitle data, display position, display color, a display pattern (e.g., flashing or the like), and a display direction (e.g., a vertical direction and a horizontal direction).

"Description of DynamicInfo( )"

Next, details of the DynamicInfo( ) in FIG. 10 are described with reference to FIG. 13.

FIG. 13 shows syntax of the DynamicInfo( ).

At the beginning of the DynamicInfo( ), a reserved_for_word_alignment for establishing word alignment is located, and the following elements differ in content depending on the attribute of the elementary stream corresponding to the DynamicInfo( ). Similarly to the case of the StaticInfo( ) described in FIG. 12, the attribute of the elementary stream corresponding to the DynamicInfo( ) is identified based on the stream_id and private_stream_id included in the StreamInfo( ), in FIG. 10, including the DynamicInfo( ).

In the DynamicInfo( ), as described in FIG. 10, dynamic information that changes during playback of the elementary stream is described. Although this dynamic information is not particularly limited, in the embodiment in FIG. 13, data corresponding to the elementary stream corresponding to the DynamicInfo( ), that is, an output attribute (output attribute of data obtained from the elementary stream) of data that is output by processing the elementary stream, is described in the DynamicInfo( ).

Specifically, when the elementary stream corresponding to the DynamicInfo( ) is a video stream (stream==VIDEO), the DynamicInfo( ) includes a display aspect_ratio (4 bits) and a reserved_for_word_alignment for word alignment. In the display_aspect_ratio, for example, an aspect ratio of video data is described as an output attribute (display form) of the video data, which corresponds to the video stream. In other words, in the display_aspect_ratio, information which indicates the aspect ratio is, for example, one of 16:9 and 4:3 is described. In the DynamicInfo( ) of the video stream, in addition to the aspect ratio, for example, the size (X pixels by Y pixels) of a picture based on video data, or the like, can be described.

When the elementary stream corresponding to the DynamicInfo( ) is an audio stream (stream==AUDIO), the DynamicInfo( ) includes a channel_assignment (4 bits) and a reserved_for_word_alignment for establishing word alignment. In the channel_assignment, when the audio stream includes two-channel audio data, an output attribute (output form) of the two channels is described. Specifically, in the channel_assignment, information is described which indicates that which of channels, stereo and dual (bilingual), is assigned for the audio data.

When the elementary stream corresponding to the DynamicInfo( ) is a subtitle stream (stream==SUBTITLE), the DynamicInfo( ) is formed by a reserved_for_word_alignment for establishing word alignment. In other words, in the embodiment in FIG. 13, regarding the subtitle stream, an output attribute as dynamic information is not defined.

"Description of EP_map( )"

Next, details of the EP_map( ) in FIG. 10 are described with reference to FIG. 14.

FIG. 14 shows syntax of the EP_map( ).

In the EP_map( ), for each of elementary streams stored in the clip stream file corresponding to the clip information file Clip( ) in FIG. 10, which includes the EP_map( ), information of each elementary stream concerning a decode startable point (entry point) at which decoding can be started.

Here, regarding a fixed rate stream, the decode startable point can be found by calculation. However, regarding a stream, having a different size for each video access unit, such as a variable rate stream or a video stream encoded in accordance with the MPEG standard, the decode startable point cannot be found by calculation, and cannot be found unless the stream is analyzed. Rapid recognition of the decode startable point is important for performing random access, and, according to the EP_map( ), the decode startable point can be rapidly recognized.

In MPEG2-Video, the beginning of an intra-picture including a Sequence_header( ) (sequence header), etc., is a decode startable point.

At the beginning of the EP_map( ), a reserved_for_word_alignment (8 bits) for word alignment is located, and a number_of_stream_id_entries (8 bits) is subsequently located. The number_of_stream_id_entries represents the number of elementary streams in which the EP_map( ) describes information of a decode startable point.

Following the number_of_stream_id_entries, information identifying an elementary stream, and information of a decode startable point of the elementary stream are repeatedly located for as many times as the number represented by the number_of_stream_id_entries.

Specifically, immediately after the number_of_stream_id_entries, a stream_id (8 bits) and a private_stream_id (8 bits), which are information identifying the elementary stream, are located, and a number_of_EP_entries (32 bits) is subsequently located. The number_of_EP_entries represents the number of dode_startable points in an elementary stream identified (specified) by the stream_id and private_stream_id immediately prior to the number_of_EP_entries.

Following the number_of_EP_entries, a set of a PTS_EP-start (32 bits) and a RPN_EP-start (32 bits), which are information of decode startable points in the elementary stream specified by the adjacent stream_id and private_stream_id, is repeatedly located for as many times as the number in the number_of_EP_entries.

The PTS_EP_start, which is one piece of information of decode startable point, represents a time of a decode startable point (playback time) in a clip stream file storing a program stream in which an elementary stream specified as described above by the stream_id and the private_stream_id is multiplexed.

In the RPN_EP_start, which is another piece of the information of decode startable point, a value is described which is obtained in the case of counting, in units of pack( ) items in program stream, the positions of decode startable points in the clip stream file storing a program stream in which elementary streams specified as described above by the stream_id and the private_stream_id are multiplexed. In this embodiment, the size of the pack( ) has a fixed value of 2048 bytes. Also, in this embodiment, one sector of the disc 101 (FIG. 1) is 2048 bytes.

Here, regarding the video stream, immediately prior to its decode startable point (entry point), a private_stream_2 packet (PES_packet( ) having the attribute of the private_stream_2), which is described later, is located. The private_stream_2 packet stores information that is utilized to decode a video stream located from the private_stream_2 packet to the next private_stream_2 packet. Accordingly, regarding the video stream, in the RPN_EP_start, which is information of decode startable point, not the actual decode startable point itself, but the position of the beginning of a private_stream_2 located immediately prior to the actual decode startable point is described.

In addition, in the EP_map( ), sets of PTS_EP_start and RPN_EP_start items, which are information of decode startable points, are sorted in ascending order beforehand for each elementary stream specified by the stream_id and the private_stream_id. This enables a binary search for the sets of the PTS_EP start and RPN_EP start items, which are information of decode startable points.

A method for random access on variable rate streams and streams having different sizes for video access units is described in, for example, Japanese Unexamined Patent Application Publication No. 2000-341640 (Japanese Patent Application No. 11-317738).

"Description of Clip Stream File"

Next, each internal structure of the clip stream files (the "00001.PS", "00002.PS", and "00003.PS" in FIG. 4) whose extensions are PSs and which are located in the "STREAM" directory in FIG. 4 is described.

The clip stream file is formed based on MPEG2_Program_Stream( ) defined in the MPEG-2 System (ISO/IEC 13818-1).

In other words, FIG. 15 shows Table 2-31, Table 2-32, and Table 2-33 described in the MPEG-2 System (ISO/IEC 13818-1:2000) standard.

A program stream stored in a clip stream file is MPEG2_Program_Stream( ) defined in Table 2-31 in the MPEG-2 System standard, and includes at least one pack( ) item and one MPEG-program_end_code. A description of the MPEG2_Program_Stream( ) is described in Japanese Patent No. 2785220, etc.

One pack( ) item includes one PACK HEADER and an arbitrary number of PES packets (PES_packet( )), as defined in Table 2-32 in the MPEG-2 System standard. Details of the Pack_header( ) are defined in Table 2-33 in the MPEG-2 System standard.

Although, in the MPEG-2 System standard, the size of the pack( ) is defined as a variable length, here it is fixed to 2048 bytes, as described in FIG. 14. Furthermore, here, the number of PES_packet( ) items in one pack( ) has 1, two, or three. When the pack( ) begins with a private_stream_2 packet, which is described later, PES_packet( ) of a corresponding video stream necessarily exits following the packet (in the same pack( )). In addition thereto, a padding_packet can be located as the third PES_packet( ).

The private_stream_2 packet is necessarily located at the beginning of the pack( ).

When the pack( ) does not begins with the private_stream_2 packet, at the beginning of the pack( ), PES_packet( ) which stores content data, such as video, audio, and subtitles, is located. In addition thereto, a padding_packet can be located as the second PES_packet( ).

FIGS. 16 to 18 show the PES_packet( ) defined in Table 2-17 in the MPEG-2 System standard.

The PES_packet( ) can be broadly divided into a packet_start_code_prefix, a stream_id, and a PES_packet_length (FIG. 16); a header portion (including a stuffing_byte) whose structure changes depending on the stream_id or the like (FIGS. 16 to 18); and a PES_packet_data_byte (FIG. 18).

When the PES_packet( ) is a padding_packet (stream_id==padding_stream), a padding_byte (0xFF) (FIG. 18) is repeatedly located for as many times as the required number in stead of a PES_packet_data_byte.

In the header portion of the PES_packet( ), as shown in FIGS. 16 and 17, information which is called PTS (Presentation Time Stamp) and which represents display timing, and information which is called DTS (Decoding Time Stamp) and which represents decoding timing can be located. In this embodiment, PTS items are added to all access units (decoding units, forming the elementary stream, defined in the MPEG-2 System), and DTS items are added when defined in MPEG-2 System.

Elementary streams which are multiplexed in a program stream are stored in the PES_packet_data_byte (FIG. 18) of the PES_packet( ). In the stream_id in the PES_packet( ), in order to identify the elementary streams stored in the PES_packet_data_byte, a value in accordance with the attribute of the elementary stream is described.

A relationship between values described in the PES_packet( ) and the attributes (types) of elementary streams are defined in Table 2-18 in the MPEG-2 System standard. Here, in FIG. 19, Table 2-18 in the MPEG-2 System standard is shown.

In this embodiment, among stream_id values defined in the MPEG-2 System shown in FIG. 19, for example, the values shown in FIG. 20 are employed.

In other words, in this embodiment, five patterns, 10111101B, 10111110B, 10111111B, 110xxxxxB, and 1110xxxxB, are employed as stream_id values. "x" represents an arbitrary value of 0 or 1.

The stream_id of the PES_packet( ) of an elementary stream having an attribute called private_stream_1 is set to 10111101101B in accordance with FIG. 20. In addition, the stream_id of the pack( ) of the padding_packet is set to 10111110B in accordance with FIG. 20. Furthermore, the stream_id of the PES_packet( ) in an elementary stream having an attribute called private_stream_2 is set to 10111111B in accordance with FIG. 20.

In addition, the stream_id of the PES_packet( ) of the audio stream defined in MPEG is set to 110xxxxxB. Low five bits of 110xxxxxB represent an audio stream number identifying audio streams. In the program stream (MPEG2_Program_Stream( )), 32 ($=2^5$) audio streams (audio streams defined in MPEG), which can be identified by the audio stream number, can be multiplexed.

The stream_id of the PES_packet( ) of a video stream as defined in MPEG is set to 1110xxxxB. Lower four bits xxxx of 1110xxxxB represent a video stream number identifying video streams. In the program stream, 16 ($=2^4$) video streams (video streams defined in MPEG), which can be identified by the video stream number, can be multiplexed.

The PES_packet( ) having a stream_id of 1110xxxxB is used to store video streams as defined in MPEG, and the PES_packet( ) having a stream_id of 110xxxxxB is used to store audio streams as defined in MPEG. In addition, the stream_id of a PES_packet, used to store elementary streams in accordance with coding (e.g., ATRAC coding) which is not defined in MPEG, is not defined in MPEG. Therefore, the elementary streams in accordance with the coding which is not defined in MPEG cannot be stored in the PES_packet( ) by simply specifying a stream_id similarly to video streams and audio streams as defined in MPEG.

Accordingly, in this embodiment, the PES_packet_data_byte in the PES_packet( ) of the private_stream_1 is extended to store the elementary streams in accordance with the coding which is not defined in MPEG.

Here, the extended PES_packet_data_byte in the PES_packet( ) of the private_stream_1 is described as private_stream1_PES_payload( ).

"Description of Private_Stream1_PES_Payload( )"

FIG. 21 shows syntax of the private_stream1_PES_payload( ).

The private_stream1_PES_payload( ) includes a Pack_header( ) and a private_payload( ). In the private_payload( ), elementary streams, such as ATRAC audio streams, LPCM audio streams, and subtitle streams, in accordance with coding which is not defined in MPEG, are stored.

At the beginning of the private_header( ), a private_stream_id (8 bits) is located. The private_stream_id is identification information identifying elementary streams which are stored in the private_payload( ), and is set to, for example, the following values in accordance with their attributes (types).

In other words, FIG. 22 shows a relationship between private_stream_id values and the attributes of elementary streams which are stored in the private_payload( ).

In FIG. 22, three patterns, 0000xxxxB, 0001xxxxB, and 100xxxxxB, are employed as the values of the private_stream_id. "x" represents an arbitrary value between 1 and 1 similarly to the case in FIG. 20.

According to FIG. 22, the private_stream_id of the private_stream1_PES_payload( ) in which an ATRAC audio stream is in the private_payload( ) is set to 0000xxxxB. Lower four bits xxxx of 0000xxxxB represent an audio stream number identifying ATRAC audio streams. In the program stream (MPEG2_Program_Stream( )), 16 (=$2^4$) ATRAC audio streams, which can be identified by the audio stream number, can be multiplexed.

Moreover, according to FIG. 22, the private_stream_id of the private_stream1_PES_payload( ) in which LPCM audio streams are stored in the private_payload( ) is set to 0001xxxxB. Lower four bits of 0001xxxxB represent an audio stream number identifying LPCM audio streams. In the program stream, 16 (=$2^4$) LPCM audio streams, which can be identified by the audio stream number, can be multiplexed.

In addition, according to FIG. 22, the private_stream_id of the private_stream1_PES_payload( ) in which subtitle streams are stored in the private_payload( ) is set to 100xxxxxB. Low five bits xxxxx of 100xxxxxB represent a subtitle stream number identifying subtitle streams. In the program stream, 32 (=$2^5$) subtitle streams, which can be identified by the subtitle stream number, can be multiplexed.

Here, compilation of the relationship between FIG. 20 and FIG. 22 is the above-described FIG. 11.

Referring back to FIG. 21, in the private_stream1_PES_payloads, elements following the private_stream_id change in content depending on the attribute of the elementary stream stored in the private_payload( ). The attribute of the elementary stream stored in the private_payload( ) is determined by the private_stream_id at the beginning of the private_header( ).

When the elementary stream stored in the private_payload( ) is an ATRAC audio stream (private_stream_id==ATRAC), a reserved_for_future_use (8 bits) for extension in the future is located and an AU_locator (16 bits) is subsequently located. By using, as a reference, a position just after the AU_locator, the AU_locator represents the beginning position of audio access units (ATRAC audio access units) (audio frames) of the ATRAC audio stream stored in the private_payload( ). When the audio access units do not exit in the private_payload( ), for example, 0xFFFF is described in the AU_locator.

When the elementary stream stored in the private_payload( ) is an LPCM audio stream (private_stream_id==LPCM), an fs_flag (1 bit), a reserved_for_future_use (3 bits), a ch_flag (4 bits), and an AU_locator (16 bits) are sequentially located.

The fs_flag represents a sampling frequency of the LPCM audio stream stored in the private_payload( ). Specifically, when the sampling frequency is, for example, 48 kHz, the fs_flag is set to 0, and, when the sampling frequency is 44.1 kHz, the fs_flag is set to 1.

The ch_flag represents the number of channels of the LPCM audio stream stored in the private_payload( ). When the LPCM audio stream is, for example, monaural, the ch_flag is set to 1, and, when the LPCM audio stream is stereo, the ch_flag is set to 2.

By using, as a reference, a position just after the AU_locator, the AU_locator represents the beginning position of audio access units (LPCM audio access units) (audio frames) of the LPCM audio stream stored in the private_payload( ). When the audio access units do not exist in the private_payload( ), for example, 0xFFFF is described in the AU_locator.

When the elementary stream stored in the private_payload( ) is a subtitle stream (private_stream_id==SUBTITLE), a reserved_for_future_use (8 bits) is located for extension in the future, and an AU_locator (16 bits) is subsequently located. By using, as a reference, a position just after the AU_locator, the AU_locator represents the beginning position of subtitle access units of the subtitle stream stored in the private_payload( ). When the subtitle access units do not exist in the private_payload( ), for example, 0xFFFF is described in the AU_locator.

"Description of private_stream2_PES_payload( )"

Next, FIG. 23 syntax of the private_stream2_PES_payload( ).

The private_stream2_PES_payload( ) is an extension of the PES_packet_data_byte (FIG. 18) of the PES_packet( ) in the private_stream_2, that is, it is an extended PES_packet_data_byte in the PES_packet( ) of the private_stream_2. In the private_stream2_PES_payload( ), information to be utilized in video stream decoding is described.

In this embodiment, the private_stream2_PES_payload( ) is located immediately prior to a decode startable position in the video stream. Accordingly, in this embodiment, by finding a PES_packet( ) of the private_stream_2 from the presentation_start_time, decoding can be started from a video stream following the PES_packet( ).

Here, the above RPN_EP_start of the EP_map( ) in FIG. 14 represents the beginning position of the PES_packet( ) in the private_stream_2.

At the beginning of the private_stream2_PES_payload( ), a reserved_for_future_use (8 bits) for extension in the future is located. Following it, a video-stream_id (8 bits), a 1st_Ref_picture (16 bits), a 2ndRef_picture (16 bits), a 3rdRef_picture (16 bits), a 4thRef_picture (16 bits), au_information( ), and VBI( ) are sequentially located.

In the video_stream_id, (a value equal to) the stream_id of the PES_packet( ) (in the video stream) located following the PES_packet( ) in the private_stream_2 is described. Based on the video_stream_id, by using information stored in (the private_stream2_PES_payload( ) of) the PES_packet( ) in the private_stream_2, (the PES_packet( ) storing) a video stream to be decoded is specified.

By using relative values, the 1stRef_picture, the 2ndRef_picture, the 3rdRef_picture, and the 4thRef_picture respectively represent the positions of the last packs (pack( )) including the first, second, third, and fourth reference pictures between a PES_packet( ) of a private_stream_2 and the next PES_packet( ) of the next private_stream_2 in a video stream specified by the video_stream_id. Regarding the 1stRef_picture, the 2ndRef_picture, the 3rdRef_-picture, and the 4thRef_picture, their details are disclosed as bytes_to_first_P_pic bytes_to_second_P_pic in, for example, Japanese Unexamined Patent Application Publication No. 09-46712 (Japanese Patent Application No. 07-211420).

In the au_information( ), information concerning video access units in the video stream from the PES_packet( ) of a private_stream_2 to a PES_packet( ) of the next private_stream 2 is described. Details of the au_information( ) are described later with reference to FIG. 24.

The VBI( ) is used to describe closed caption information.

The PES_packet( ) of the private_stream_2 having the above-described private_stream2_PES_payload( ) is located at each decode startable point in each video stream.

Next, FIG. 24 shows syntax of the au_information( ) in FIG. 23.

At the beginning of an au_information( ), a length (16 bits) is located. The length represents the size of the au_information( ) including the length. Following the length, a reserved_for_word_alignment (8 bits) and a number_of_access_units (8 bits) are sequentially located. The reserved_for_word_alignment is used to establish word alignment.

The number_of_access_units represents the number of video access units (pictures) included between a PES_packet( ) in a private_stream_2 including the number_of_access_units and a PES_packet( ) in the next private_stream_2.

Specifically, in a PES_packet( ) of a private_stream_2 in which the private_stream2_PES_payload( ) in FIG. 23 has an identical video_stream_id, from its au_information( ) to a position adjacent to the next au_information( ) (if this au_information( ) is the last au_information( ) in a clip stream file, to the end of the clip stream file), the number_of_access_units represents the number of access units (pictures) included in a video stream represented by the video_stream_id.

Following the number_of_access_units, as many for-loop contents as the number in the number_of_access_units are located. Specifically, information concerning each of one or more video access units included between a PES_packet( ) of a private_stream_2 including the number_of_access_units and a PES_packet( ) of the next private_stream_2 is located.

The information (video access unit information) located in the for-loop is as described below.

Specifically, in the for-loop, a pic_struct_copy (4 bits), an au_ref_flag (1 bit), an AU_length (21 bits), and a reserved are located.

In the pic_struct_copy, a copy of the pic_struct( ) is described which is as defined in ISO/IEC 14496-10, D.2.2, and which is set, when the video stream is based on MPEG4-AVCv (ISO/IEC 14496-10), for corresponding video access units. The pic_struct( ) is information such as displaying pictures as frames, or displaying a picture's top field and subsequently displaying a bottom field.

The au_ref_flag indicates whether the corresponding access units represent a reference picture to be referred to when (a picture of) other access units are decoded. It is set to 1 when the reference picture is represented, and is set to 0 when the reference picture is not represented.

The AU_length represents the size of the corresponding access units in units of bytes.

Specific Example of Data Recorded on Disc 101

Next, FIGS. 25 to 28 show specific examples of data recorded in the above-described format on the disc 101 in FIG. 1.

In FIGS. 25 to 28, MPEG2-Video is employed for video streams, and ATRAC audio streams are employed as audio streams. However, the video streams and the audio streams are not limited to the above. In other words, for example, MPEG4-Visual, MPEG4-AVC, etc., can be employed for the video streams, and, in addition, for example, MPEG1/2/4 audio, LPCM audio streams, etc., can be employed.

Differently from the video stream and the audio stream, regarding the subtitle stream, sequential decoding and display (output) at equal intervals of the subtitle stream is not always performed. In other words, the subtitle stream is occasionally supplied from the buffer control module 215 and is decoded in the subtitle decoder control module 218.

FIGS. 25 to 28 show that, as shown in FIG. 4, three clip information files "00001.CLP", "00002.CLP", and "00003.CLP" are recorded in the "CLIP" directory on the disc 101, and show specific examples, such as the clip information files "00001.CLP", "00002.CLP", and "00003.CLP", when, in the "STREAM" directory, three clip stream files "00001.PS", "00002.PS", and "00003.PS" respectively corresponding to the three clip information files "00001.CLP", "00002.CLP", and "00003.CLP" are recorded. However, in FIGS. 25 to 28, part of data in the "PLAYLIST.DAT" file, etc., is omitted.

In other words, FIG. 25 shows a specific example of the "PLAYLIST.DAT" file described in FIG. 5.

In FIG. 25, the number_of_PlayLists is 2. Thus, the number of PlayList( ) items included in the "PLAYLIST.DAT" file is 2. In FIG. 25, between the two PlayList( ) items, the first one and the second one are described as PlayList( ) #0 and PlayList( ) #1, respectively.

In the PlayList( ) #0 as the first PlayList( ), the capture_enable_flag_PlayList is 1. Thus, secondary use of video data played back in accordance with PlayList( ) #0 is permitted. In addition, in PlayList( ) #0, the number_of PlayItems is 2. Thus, the number of PlayItem( ) items included in PlayList( ) #0 is 2. In FIG. 25, the specific examples of PlayItem( ) #0 and PlayItem( ) #1 as the two PlayItem( ) items are described in a lower part of the "PlayList( ) #0" column.

In the PlayItem( ) #0 as the first PlayItem( ) included in PlayList( ) #0, the Clip_Information-file_name described in FIG. 6 is "00001.CLP", an In_time is 180,090, and an OUT_time is 27,180,090. Thus, a clip that is played back based on PlayItem( ) #0 in the PlayList( ) #0 ranges from time 180,090 to time 27,180,090 in clip stream file "00001.PS" corresponding to clip information file "00001.CLP".

In PlayItem( ) #1 as the second PlayItem( ) included in PlayList( ) #0, the Clip_Information_file_name described in FIG. 6 is "00002.CLP", and In_time is 90,000, and an OUT_time is 27,090,000. Thus, a clip that is played back based on PlayItem( ) #1 in PlayList( ) #0 ranges from time 90,000 to 27,090,000 in clip stream file "00002.PS" corresponding to clip information file "00002.CLP".

In addition, in FIG. 25, in PlayList( ) #1 as the second PlayList( ), the capture_enable_flag_PlayList has 0. Thus, secondary use of video data played back in accordance with PlayList( ) #1 is not permitted (prohibited). Also, in PlayList( ) #1, the number_of_PlayItems is 1. Thus, the number of PlayItem( ) items included in PlayList( ) #1 has 1. In FIG. 25, a specific example of PlayItem( ) #0 as one play item PlayItem( ) is described in a lower part of the "PlayList #1" column.

In PlayItem( ) #0 as one PlayItem( ) item included in PlayList( ) #1, the Clip_Information_file_name described in FIG. 6 is "00003.CLP", an In_time is 81,090,000. Thus, a clip that is played back based on PlayItem( ) #0 in PlayList( ) #1 ranges from time 90,000 to time 81,090,000 in clip stream file "00003.PS" corresponding to clip information file "00003.CLP".

Next, FIG. 26 shows specific examples of the clip information file Clip( ) described in FIG. 10. In other words, FIG.

26 shows specific examples of the clip information files "00001.CLP", "00002.CLP", and "00003.CLP" in FIG. 4.

In clip information file "00001.CLP", the presentation_start_time is 90,000, and the presentation_end_time is 27,990,000. Thus, according to a program stream stored in clip stream file "00001.PS" corresponding to clip information file "00001.CLP", content for 310 ((27,990,000−90,000)/90 kHz) seconds can be used.

In addition, in clip information file "00001.CLP", the capture_enable_flag_Clip is 1. Thus, secondary use of (video data corresponding to) a video stream multiplexed in the program stream stored in clip stream file "00001.PS" corresponding to clip information file "00001.CLP" is permitted.

Furthermore, in FIG. 26, the number_of_streams in clip information file "00001.CLP" is 4. Thus, in the program stream stored in corresponding clip stream file "00001.PS", four elementary streams are multiplexed.

When representing the four elementary streams as stream #0, stream #1, stream #2, and stream #3, in FIG. 26, specific examples of StreamInfo( ) of the four elementary streams, stream #0, stream #1, stream #2, and stream #3, are described in a lower part of the "00001.CLP" column.

In the first elementary stream, stream #0, in clip stream file "00001.PS", the stream_id is 0xE0. Thus, this elementary stream, stream #0, is a video stream as described in FIGS. 20 and 22 (or FIG. 11). Although, in this embodiment, as described above, the private_stream_id has no relationship with the video stream, it is 0x00 in FIG. 26.

In addition, regarding video stream, stream #0, as the first elementary stream in clip stream file "00001.PS", the picture_ size of the StaticInfo( ) (FIG. 12) included in the StreamInfo( ) is '720×480', the frame_rate is '29.97 Hz', and the cc_flag is 'Yes'. Thus, this video stream, stream #0, is video data having 720×480 pixels and a frame period of 29.97 Hz, and, in addition, includes closed caption data.

Furthermore, regarding video stream, stream #0, as the first elementary stream in clip stream file "00001.PS", the number_of_DynamicInfo of the StreamInfo( ) (FIG. 10) is 0. Thus, a set of the pts_change_point and DynamicInfo( ) does not exist.

Next, regarding the second elementary stream, stream #1, in clip stream file "00001.PS", the stream_id is 0xBD, and the private_stream_id is 0x00. Therefore, this elementary stream, stream #1, is an ATRAC audio stream, as described in FIGS. 20 and 22.

In addition, regarding ATRAC audio stream, stream #1, as the second elementary stream in clip stream file "000001.PS", in the StaticInfo( ) (FIG. 12) included in the StreamInfo( ), the audio_language_code is 'JAPANESE', the channel_configuration is 'STEREO', the lfe_existence is 'NO', and the sampling_frequency is '48 kHz'. Therefore this ATRAC audio stream, stream #1, is Japanese and stereo audio data. In addition, a low-emphasis channel is not included and the sampling frequency is 48 kHz.

Furthermore, regarding ATRAC audio stream, stream #1, as the second elementary stream in clip stream file "00001.PS", the number_of_DynamicInfo of the StreamInfo( ) (FIG. 10) is 0. Thus, a set of the pts_change_point and the DynamicInfo( ) does not exist.

Next, regarding the third elementary stream, stream #2, in the clip stream file "00001.PS", the stream_id is 0xBD, and the private_stream_id is 0x80. Therefore, this elementary stream, stream #2, is a subtitle stream, as described in FIGS. 20 and 22.

In addition, regarding the subtitle stream, stream #2, as the third elementary stream in clip stream file "00001.PS", the subtitle_language_code of the StaticInfo( ) (FIG. 12) included in the StreamInfo( ) is 'JAPANESE' and the configurable_flag is 0. Therefore, this subtitle stream, stream #2, is a Japanese subtitle data, and changing its display form is not permitted (prohibited).

Furthermore, regarding subtitle stream, stream #2, as the third elementary stream in clip stream file "00001.PS", the number_of_DynamicInfo of the StreamInfo( ) (FIG. 10) is 0. Thus, a set of the pts_change_point and the DynamicInfo( ) does not exist.

Next, regarding the fourth elementary stream, stream #3, in clip stream file "00001.PS", the stream_id is 0xBD and the private_stream_id is 0x81. Therefore, this elementary stream, stream #3, is a subtitle stream, as described in FIGS. 20 and 22.

In order to distinguish between subtitle stream, stream #2, as the third elementary stream in clip stream file "00001.PS", and subtitle stream, stream #3, as the fourth elementary stream, their private_stream_id items are 0x80 and 0x81, respectively.

In addition, regarding subtitle stream, stream #2, as the fourth elementary stream in clip stream file "00001.PS", the subtitle_language_code of the StaticInfo( ) (FIG. 12) included in the StreamInfo( ) is 'JAPANESE' and the configurable_flag is 1. Therefore, this subtitle stream, stream #3, is a Japanese subtitle data, and changing its display form is permitted.

Furthermore, regarding the program stream, stream #3, as the fourth elementary stream in clip stream file "00001.PS", the number_of_DynamicInfo of the StreamInfo( ) (FIG. 10) is 0. Thus, a set of the pts_change_point and the DynamicInfo( ) does not exist.

Next, in FIG. 26, regarding clip information file "00002.CLP", the presentation_start time is 90,000 and the presentation_end_time is 27,090,000. Therefore, according to the program stream stored in clip stream file "00002.PS" corresponding to clip information file "00002.CLP", content for 300 seconds ((27,090,000−90,000)/90 kHz) can be used.

In addition, in clip information file "00002.CLP", the capture_enable_flag_Clip is 0. Therefore, secondary use of a video stream multiplexed in the program stream stored in clip stream file "00002.PS" corresponding to clip information file "00002.CLP" is not permitted (prohibited).

Furthermore, in FIG. 26, the number_of_streams in clip information file "00002.CLP" is 4. Therefore, in the program stream stored in corresponding clip stream file "00002.PS", four elementary streams are multiplexed similarly to the case in the above-described clip stream file "00001.PS".

When representing the four elementary streams as stream #0, stream# 1, stream #2, and stream #3, in FIG. 26, specific examples of StreamInfo( ) (FIG. 10) of the four elementary streams as stream #0, stream# 1, stream #2, and stream #3 are described in a lower part of the "00002.CLP" column.

Here, in FIG. 26, the contents of the StreamInfo( ) of each of the first to fourth elementary streams, streams #0 to #3, in clip stream file "00002.PS", are identical to those of the StreamInfo( ) of each of the first to fourth elementary streams, streams #0 to #3, in the above-described clip stream file "00001.PS". Accordingly, their description is omitted.

As described above, since the contents of the StreamInfo( ) of each of the first to fourth elementary streams, streams #0 to #3, in clip stream file "00002.PS", are identical to those of the StreamInfo( ) of each of the first to fourth elementary streams, streams #0 to #3, in the above-described clip stream file "00001.PS", the first elementary stream, stream #0, in clip stream file "00002.PS" is a video stream, and the second elementary stream, stream #1, is an ATRAC audio stream. In addition, both the third elementary stream, stream #2, and the fourth elementary stream, stream #3, are subtitle streams.

Next, in FIG. 26, regarding clip information file "00003.CLP", the presentation_start_time is 90,000, and the presentation_end_time is 81,090,000. Therefore, according to the program stream stored in clip stream file "00003.PS" corresponding to clip information file "00003.CLP", content for 900 seconds ((81,090,000−90,000)/90 kHz) can be used.

In addition, in clip information file "00003.CLP", the capture_enable_flag_Clip is 1. Therefore, secondary use of video streams multiplexed with the program stream stored in clip stream file "00003.PS" corresponding to clip information file "00003.CLP" is permitted.

Furthermore, in FIG. 26, the number_of_streams in clip information file "00003.CLP" is 3. Thus, in the program stream stored in corresponding clip stream file "00003.PS", three elementary streams are multiplexed.

When representing the three elementary streams as stream #0, stream #1, and stream #2, in FIG. 26, specific examples of StreamInfo( ) (FIG. 10) of the three elementary streams, stream #0, stream #1, and stream #2, are described in a lower part in the "00003.CLP" column.

Regarding the first elementary stream, stream #0, in clip stream file "00003.PS", the stream_id is 0xE0. Thus, this elementary stream, stream #0, is a video stream, as described in FIGS. 20 and 22 (or FIG. 11). Similarly to the first elementary stream, stream #0, in clip stream file "00001.PS", the private_stream_id is 0x00.

In addition, regarding video stream, stream #0, as the first elementary stream in clip stream file "00003.PS", in the StaticInfo( ) (FIG. 12) included in the StreamInfo( ), the picture_size is '720×480', the frame_rate is 29.97 Hz, and the cc_flag is 'NO'. Therefore, this video stream, stream #0, is video data having 720×489 pixels and a frame period of 29.97 Hz, and does not include any closed caption data.

Furthermore, regarding video stream #0 as the first elementary stream in clip stream file the number_of_DynamicInfo of "00003.PS", StreamInfo( ) (FIG. 10) is 2. Thus, in the StreamInfo( ), two sets of pts_change points and DynamicInfo( ) items are described.

Next, regarding the second elementary stream, stream #1, in clip stream file "00003.PS", is 0xE1. Thus, this elementary stream, stream #1, is a video stream, as described in FIGS. 20 and 22 (or FIG. 11). In order to distinguish between video stream, stream #0, as the first elementary stream in clip stream file "00003.PS", and video signal, stream #1, as the second elementary stream, their stream_id items are 0xE0 and 0xE1, respectively. In addition, similarly to elementary stream, stream #0, as the first elementary stream in clip stream file "00001.PS", the private_stream_id is 0x00.

In addition, video stream, stream #1, as the second elementary stream in clip stream file "00003.PS", the picture_size, frame_rate, and cc_flag of the StreamInfo( ) (FIG. 12) included in the StreamInfo( ) are identical to those concerning video stream, stream #0, as the first elementary stream. Therefore, video stream, stream #1, as the second elementary stream in clip stream file "00003.PS", is video data having 720×480 pixels and a frame period of 29.97 Hz, and does not include closed caption data.

Furthermore, regarding video stream, stream #1, as the second elementary stream in clip stream file "00003.PS", the number_of_DynamicInfo of StreamInfo( ) (FIG. 10) is 0. Thus, a set of the pts_change_points and the DynamicInfo( ) does not exist.

Next, regarding stream #2 as the third elementary stream in clip stream file "00003.PS", the stream_id is 0xBD and the private_stream_id is 0x00. Thus, this elementary stream, stream #2, is an ATRAC audio stream, as described in FIGS. 20 and 22.

In addition, regarding ATRAC audio stream, stream #2, as the third elementary stream in clip stream file "00003.PS", the audio_language_code, channel_configuration, lfe_existence, and sampling_frequency of the StreamInfo( ) (FIG. 12) included in the StreamInfo( ) are identical to those in ATRAC audio stream, stream #1, as the second elementary stream in clip stream file "00001.PS". Therefore, ATRAC audio stream, stream #2, as the third elementary stream in clip stream file "00003.PS", is Japanese and stereo audio data. In addition, a low-emphasis channel is not included and the sampling frequency is 48 kHz.

Furthermore, regarding ATRAC audio stream, stream #2, as the third elementary stream in clip stream file "00003.PS", the number_of_DynamicInfo of the StreamInfo( ) (FIG. 10) is 3. Thus, in the StreamInfo( ), three sets of pts_change_points and DynamicInfo( ) items are described.

Next, FIG. 27 shows a specific example of the EP_map( ) in the clip information file Clip( ) described in to FIG. 10. In other words, FIG. 27 shows a specific example of the EP_map( ) in FIG. 14 in the clip information file "00001.CLP" in FIG. 4.

In FIG. 27, the number_of_stream_id_entries in the EP_map( ) is 1. Thus, in this EP_map( ), decode startable point information concerning one elementary stream is described.

In addition, in the EP_map( ) in FIG. 27, the stream_id is 0xE0. Therefore, as described in FIGS. 20 and 22, in the EP_map( ), decode startable point information (PTS_EP_start and RPN_EP_start (FIG. 14)) concerning the video stream specified by the stream_id, which is 0xE0, is described. In other words, FIG. 27 shows the EP_map( ) for clip information file "00001.CLP", and, in clip stream file "00001.CLP" corresponding to clip information file "00001.CLP", the elementary stream in which the stream_id is 0xE0 is the first video stream, stream #0, of clip stream file "00001.CLP", as described in FIG. 26. Thus, the information described in the EP_map( ) is the PTS_EP_start and RPN_EP start of the decode startable point of the video stream, stream #0.

In FIG. 27, decode startable points of the first video stream, stream #0, of clip stream file "00001.CLP", five PTS_EP-start and RPN_EP-start points from the beginning are described and a description of the sixth and other PTS_EP_start and RPN_EP_start points is omitted.

Although, in the EP_map( ) in FIG. 27, the private_stream_id is 0x00, when the stream_id represents a video stream, the private_stream_id has no relationship (is ignored), as described above.

Next, FIG. 28 shows specific examples of PlayListMark( ) in the PlayList( ) #0 and PlayList( ) #1 (the PlayList( ) in FIG. 5) described in FIG. 25.

The upper side of FIG. 28 shows the PlayListMark( ) (FIG. 7) of PlayList( ) #0.

In the upper side of FIG. 28, the number_of_PlayList_marks in the PlayListMark( ) in PlayList( ) #0 is 7. Thus, the number of Mark( ) items included in (the PlayListMark( ) of) PlayList( ) #0 is 7.

In addition, on the upper side of FIG. 28, among seven Mark( ) items included in PlayList( ) #0, the first Mark( ) or Mark( ) #0 is a chapter mark since the mark_type (FIG. 7) is 'Chapter'. In addition, since the ref_to_PlayItem_id (FIG. 7) is 0, Mark( ) #0 belongs to PlayItem( ) #0 between the two PlayItems #0 and #1 in FIG. 25 which are included in PlayList( ) #0. Since the mark_time_stamp is 180,090, Mark #0 is a mark on time (playback time) 180,090 in a clip stream file which is played back based on PlayItem( ) #0 included in PlayList( ) #0. Furthermore, since the entry_ES_stream_id and the entry_ES_private_stream_id are both 0's, Mark( ) #0 is not associated with either elementary stream. In addition, Mark( ) #0 represents a chapter whose number is 1 since the mark_data is 1.

Here, the clip stream file that is played back based on PlayItem #0 included in PlayList #0 is clip stream file "00001.PS" specified by "00001.CLP", which is described in FIG. 25 and which is described in the Clip_Information_file_name of PlayItem #0. Therefore, the above time 180,090 represented by the mark_time_stamp of Mark( ) #0 is a time of clip stream file "00001.PS".

On the upper side in FIG. 28, among the seven Mark( ) items included in PlayList( ) #0, the fifth Mark( ) or Mark #4 is a chapter mark similarly to the first Mark #0.

In other words, the fifth Mark( ) or Mark #4 is a chapter mark since the mark_type (FIG. 7) is 'Chapter'. In addition, Mark #4 belongs to PlayItem( ) #1 between the two PlayItems #0 and #1 in FIG. 25 which are included in PlayList #0. Mark #4 is a mark on time 90,000 of a clip stream file that is played back based on PlayItem #1 included in PlayList #0 since the mark_time_stamp is 90,000. Furthermore, since the entry_ES_stream_id and the entry_ES_private_stream_id are both 0's, Mark #4 is not associated with either elementary stream. Mark #4 represents a chapter whose number is 2 since the mark_data is 2.

Here, the clip stream file that is played back based on PlayItem #1 included in PlayList #0 is clip stream file "00002.PS" specified by "00002.CLP" which is described in FIG. 25 and which is described in the Clip_Information_file_name of PlayItem #1. Thus, the above time 90,000 represented by the mark_time_stamp of Mark #4 is a time of clip stream file "00002.PS".

In addition, on the upper side in FIG. 28, among the seven Mark( ) items included in PlayList #0, the second Mark( ) or Mark #1 is an index mark since the mark_type (FIG. 7) is 'Index'. In addition, since the ref_to_PlayItem_id (FIG. 7) is 0, Mark #1 belongs to PlayItem #0 between the two PlayItems #0 and #1 in FIG. 25 which are included in PlayList #0. Since the mark_time_stamp is 5,580,090, Mark #1 is a mark at time 5,580,090 of a clip stream file that is played back based on PlayItem #0 included in PlayList #0. Furthermore, since the entry_ES_stream_id and the entry_ES_private_stream_id are both 0's, Mark #1 is not associated with either elementary stream. Mark #1 represents an index whose number is 1 since the mark_data is 1.

Here, the clip stream file that is played back based on PlayItem #0 included in PlayList #0 is clip stream file "00001.PS", as described above. Thus, the above time 5,580,090 represented by the mark_time_stamp of Mark #1 is a time in clip stream file "00001.PS".

On the upper side in FIG. 28, among the seven Mark( ) items included in PlayList #0, Mark #2, Mark #5, and Mark #6 which are the third Mark( ), the sixth Mark( ), and the seventh Mark( ) are index marks similar to the second Mark #1.

In addition, on the upper side in FIG. 28, among the seven Mark( ) items included in PlayList #0, the fourth Mark( ) or Mark #3 is an event mark since the mark_type (FIG. 7) is 'Event'. Since the ref_to_PlayItem_id (FIG. 7) is 0, Mark #3 belongs to PlayItem #0 between the two PlayItems #0 and #1 in FIG. 25 which are included in PlayList #0. In addition, since the mark_time_stamp is 16,380,090, Mark #3 is a mark at time 16,380,090 of the clip stream file that is played back based on PlayItem #0 included in PlayList #0. Furthermore, since the entry_ES_stream_id and the entry_ES_private_e_stream_id are both 0's, Mark #3 is not associated with either elementary stream. Mark #3 generates an event having 0 as an argument since the mark_type is 0.

Here, the clip stream file that is played back based on PlayItem #0 included in PlayList #0 is clip stream file "00001.PS", as described above. Thus, the above time 16,380,090 represented by the mark_time_stamp of Mark #3 is a time in clip stream file "00001.PS".

On the upper side in FIG. 28, on the right outside a PlayListMark( ) list of PlayList #0, each time from the beginning of PlayItem( ), which belongs to Mark( ) is shown, and, on the further right side, each time from the beginning of PlayList #0 is shown. Next, on the lower side in FIG. 28, the PlayListMark( ) (FIG. 7) of PlayList #1 is shown.

On the lower side in FIG. 28, the number_of_PlayList_marks in the PlayListMark( ) of PlayList #1 is 3. Thus, the number of Mark( ) items included in (the PlayListMark( ) of) the PlayList #1 is 3.

In addition, on the lower side in FIG. 28, among three Mark( ) items included in PlayList #1, the first Mark( ) or Mark #0 is a chapter mark since the mark_type (FIG. 7) is 'Chapter'. In addition, Mark #0 belongs to one PlayItem #0 in FIG. 25 which is included in PlayList #1 since the ref_to_PlayItem_id (FIG. 7) is 0. Since the mark_time_stamp is 90,000, Mark #0 is a mark at time 90,000 in a clip stream file that is played back based on PlayItem #0 included in PlayList #1. Furthermore, since entry_ES_stream_id and the entry_ES_private_stream_id are both 0's, Mark #0 is not associated with either elementary stream. Since the mark_type is 0, the number of Mark #0 represents a chapter number.

Here, the clip stream file that is played back based on PlayItem #0 included in PlayList #1 is clip stream file "00003.PS" specified by "00003.CLP" described in the Clip_Information_file_name of PlayItem #0. Therefore, the above 90,000 represented by the mark_time_stamp of Mark #0 is a time in clip stream file "00003.PS".

On the lower side in FIG. 28, among three Mark( ) items included in PlayList #1, the second Mark( ) or Mark #1 is an event mark since the mark_type (FIG. 7) is 'Event'. In addition, Mark #1 belongs to one PlayItem #0 in FIG. 25 which is included in PlayList #1 since the ref_to_PlayItem_id (FIG. 7) is 0. Also, since the mark_time_stamp is 27,090,000, Mark #1 is a mark at time 27,090,000 in the clip stream file that is played back based on the PlayItem #0 included in PlayList #1. Furthermore, since the entry_ES_stream_id is 0xE0 and the entry_ES_private_stream_id is 0, Mark #1 is associated with an elementary stream which is specified (identified) when the stream_id is 0xE0, that is, it is associated with the video stream, as described in FIGS. 20 and 22. Since the mark_data is 1, Mark #1 generates an event having 1 as an argument.

Here, the clip stream file that is played back based on PlayItem #0 included in PlayList #1 is clip stream file "00003.PS", as described above. Thus, the above time 27,090,000 represented by the mark_time_stamp of Mark #1 is a time in clip stream file "00003.PS".

In addition, the video stream in which the stream_id is 0xE0 and with which Mark #1 is associated is the video stream to which Mark #1 belongs and in which the stream_id described in the "00003.CLP" described in the Clip_Information_file_name of PlayItem #0 included in PlayList #1 in FIG. 25 is 0xE0. In other words, it is the first elementary stream (video stream), stream #0, among the three elementary streams, streams #0 to #2, which are multiplexed in clip stream file "00003.PS".

Next, on the lower side in FIG. 28, among the three Mark( ) items included in PlayList #1, the third Mark( ) or Mark #2 is an event mark since the mark_type (FIG. 7) is "Event". In addition, Mark #2 belongs to one PlayItem #0 in FIG. 25 which is included in PlayList #1 since the ref_to_PlayItem_id (FIG. 7) is 0. Also, Mark #1 is a mark at time 27,540,000 in the clip stream file that is played back based on the PlayItem #0 included in PlayList #1 since the mark_time_stamp is 27,540,000. Since the entry_ES_stream_id is 0xE1 and the entry_ES_private_stream_id is 0, Mark #2 is associated with an elementary stream which is specified (identified) when the stream_id is 0xE1, that is, it is associated with the video stream, as described in FIGS. 20 and 22. In addition, since the mark_data is 2, Mark #2 generates an event having 2 as an argument.

Here, the clip stream file that is played back based on PlayItem #0 included in PlayList #1 is clip stream file "00003.PS". Thus, the above time 27,540,000 represented by Mark #2 is a time in clip stream file "00003.PS".

In addition, the video stream in which the stream_id is 0xE1 and with which the Mark #2 is associated is the video stream to which Mark #2 belongs and in which the stream_id described in "00003.CLP" described in the Clip_Information_file_name of PlayItem #0 included in PlayList #1 in FIG. 25 is 0xE1. In other words, it is the second elementary stream (video stream), stream #1, among the three elementary streams, streams #0 to #2, which are recognized by clip information file "00003.CLP" and which are multiplexed in clip stream file "00003.PS".

Here, on the lower side in FIG. 28, on the right side outside the list of PlayListMark( ) in PlayList #1, each time from the beginning of PlayItem( ) to which Mark( ) belongs is shown.

In FIG. 28, chapter and index numbers represented by the chapter and index marks are described in the mark_data. However, the chapter and index numbers represented by the chapter and index marks can be recognized by, for example, counting the numbers of chapter marks and index marks in PlayListMark( ) although they are not described in the mark_data.

Description of Disc Device Operation

Next, assuming that the data (files) as described in FIGS. 25 to 28 is recorded, the operation of the disc device in FIG. 1 is described.

After the disc 101 is loaded into the disc drive 102, a message representing the loading is reported to the video content playback program 210 through the drive interface 114, and, in addition, the operating system 201 in FIG. 2. When receiving, from the operating system 201, the message indicating that the disc 101 has been loaded into the disc drive 102, the video content playback program 210 starts the pre-playback process in FIG. 29.

"Pre-Playback Process"

Figure 29:
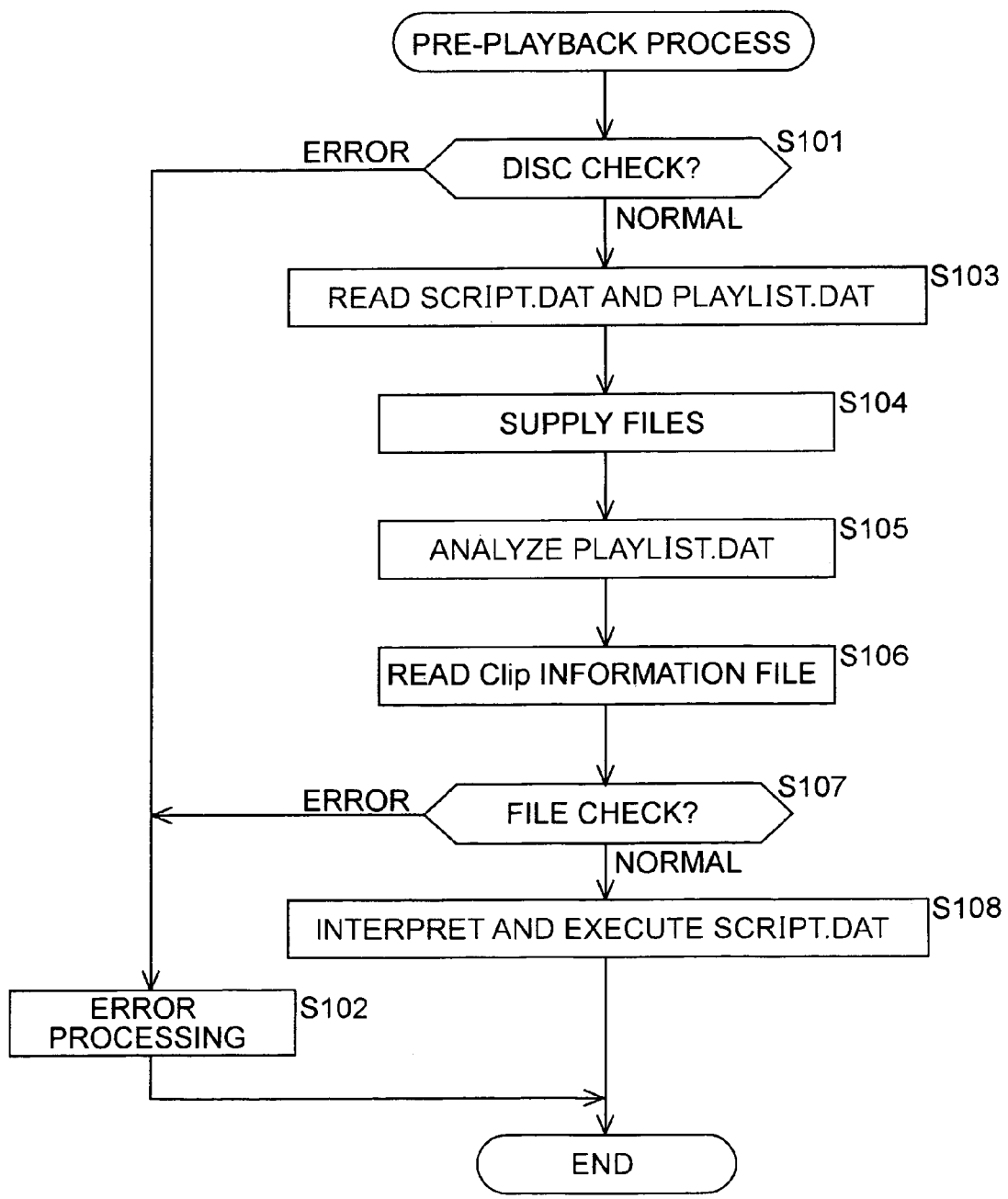
FIG. 29 is a flowchart illustrating a pre-playback process.

Specifically, FIG. 29 is a flowchart illustrating a pre-playback process performed by the video content playback program 210.

Here, the following disc-drive operation or process described by the flowchart does not always need to be time-serially performed in the order described in flowchart form, and may be performed in parallel or separately. However, in this specification, for convenience, the disc-drive operation or process is described in accordance with the flowchart.

In the pre-playback process, in step S101, the video content playback program 210 uses a file system function of the operating system 201 to check the disc 101 about whether or not the disc 101 is normal for the video content playback program 210.

As described above, accessing (file reading) of the disc 101 is performed by using the file system function of the video content playback program 210. Its description is omitted below, if necessary.

If, in step S101, it is determined that the disc 101 is not normal, that is, for example, if a file system employed by the disc 101 is of a type that does not match the operating system 201, and, if the "VIDEO" directory is not located in the root directory, the video content playback program 210 determines that the file system does not match the disc 101, the process proceeds to S102, and the graphics processing module 219 performs error processing before finishing the pre-playback process.

In other words, in the error processing, the graphics processing module 219 generates (video data of) an error message indicating that the disc 101 is not normal, and outputs the message from the video output module 220, whereby an error message is displayed. In addition, in other error processing, for example, a warning beep can be output from the audio output module 221, the disc 101 can be unloaded from the disc drive 102, etc.

Alternatively, if, in step S101, it is determined that the disc 101 is normal, the process proceeds to step S103. The video content playback program 210 uses the content data supplying module 213 to request and read two data files, the "SCRIPT.DAT" file and "PLAYLIST.DAT" file located in the "VIDEO" directory in the disc 101 (FIG. 4), from the operating system 201, and proceeds to step S104. In step S104, the "SCRIPT.DAT" file is supplied to the script control module 211 and the "PLAYLIST.DAT" file is supplied to the player control module 212.

After that, the process proceeds from step S104 to steps S105 through S107, and the player control module 212 performs initialization. The script control module 211 waits for the script control module 211 to finish the initialization.

"Initialization of Player Control Module 212"

In the initialization, in step S105, by analyzing the "PLAYLIST.DAT" file, the player control module 212 finds the number of clip information files used in the "PLAYLIST.DAT" file and their file names.

Specifically, since, in the present case, the "PLAYLIST.DAT" file is as shown in FIG. 25 and the number_of_PlayLists in the "PLAYLIST.DAT" file in FIG. 25 is 2, the player control module 212 recognizes that two PlayList( ) items or the first PlayList #0 and the second PlayList #1 exist. In addition, since, regarding the first PlayList #0 in the "PLAYLIST.DAT" file in FIG. 25, the number_of_PlayLists is 2, the player control module 212 recognizes that, in PlayList #0, two PlayItem( ) items or the first PlayItem #0 and the second PlayItem #1 exist. By referring to the Clip_Information_file_ name of each of the first PlayItem #0 and second PlayItem #1 included in PlayList #0 in the "PLAYLIST.DAT" file in FIG. 25, the player control module 212 recognizes that the clip information file of the first PlayItem #0 included in PlayList #0 is "00001.CLP" and the clip information file of the second PlayItem #1 is "00002.CLP".

Since the number_of_PlayLists is 1, in a similar manner for the second PlayList #1, the player control module 212 recognizes that one PlayItem( ) (PlayItem #0) exists, and recognizes, from the Clip_Information_file_name in the PlayItem #0, that the clip information file of the PlayItem #0 is "00003.CLP".

After that, proceeding from step S105 to S106, the player control module 212 reads, from the disc 101, the clip information files recognized in step S105. Specifically, it reads three clip information files "00001.CLP", "00002.CLP", and "00003.CLP" from the "CLIP" directory in the "VIDEO" directory of the disc 101.

Although, in reading of the clip information files in step S106, it is sufficient to read only a clip information file of PlayItem of initially generated PlayList( ), in this embodiment, as described above, the clip information files of PlayItem( ) items of all PlayList( ) items are read beforehand.

Proceeding to step S107 after processing in step S106, the player control module 212 determines whether the process has succeeded in reading the clip information files recognized in step S105, and further (checks about) determines whether clip stream files corresponding to the read clip information files exist on the disc 101. Specifically, in step S107, it is determined whether or not the process has succeeded in reading clip information files "00001.CLP", "00002.CLP", and "00003.CLP", and it is further determined whether or not the clip information files "00001.CLP", "00002.CLP", and "00003.CLP", and clip stream files "00001.PS", "00002.PS", and "00003.PS", in which only the extensions of file names differ, exist in the "STREAM" directory below the "VIDEO" directory on the disc 101.

In step S107, if it is determined that the reading of the clip information files recognized in step S105 has failed, or it is determined that the clip stream files corresponding to the clip information files do not exist on the disc 101, that is, for example, if clip information files and clip stream files necessary for playback in accordance with the "PLAYLIST.DAT" file are not recorded on the disc 101, the video content playback program 210 determines that it does not match the disc 101, and proceeds to step S102. The above-described error processing is performed and the pre-playback process is finished.

Alternatively, if, in step S107, it is determined that the process has succeeded in reading the clip information files recognized in step S105 and it is determined that the clip stream files corresponding to the clip information files exist on the disc 101, the player control module 212 finishes the initialization and proceeds to step S108.

In step S108, the script control module 211 initiates interpreting and executing the "SCRIPT.DAT" file.

Figure 30:
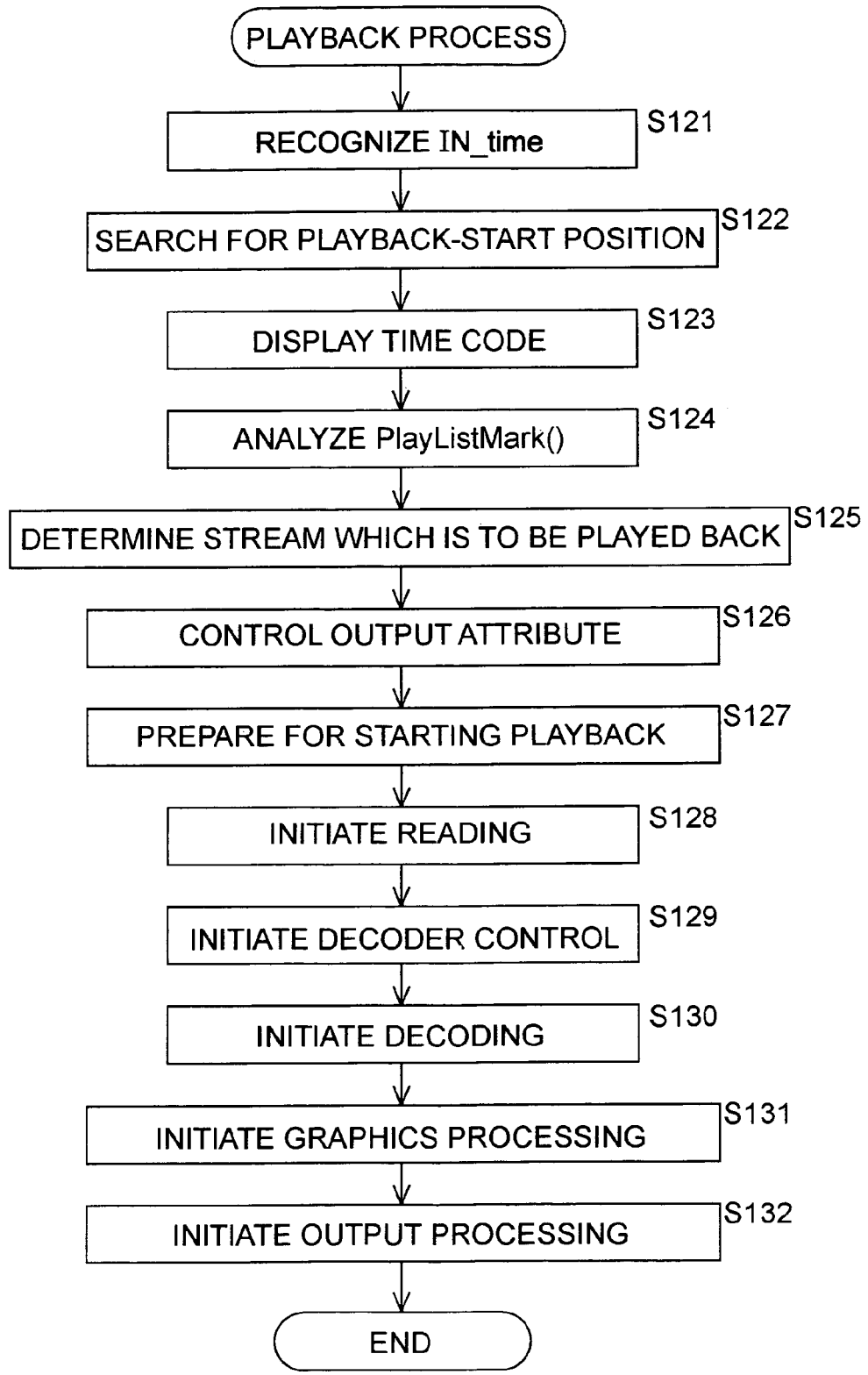
FIG. 30 is a flowchart illustrating a playback process.

By way of example, the script control module 211 executes the "SCRIPT.DAT" file, whereby, when the player control module 212 is instructed to play back the first PlayList( ) (PlayList #0), the playback process in FIG. 30 is performed.

"Playback Process"

Specifically, FIG. 30 is a flowchart illustrating the playback process performed by the video content playback program 210.

"Playback Preparing Processing"

In the playback process, at first, in steps S121 and S122, the player control module 212 performs playback preparing processing for PlayList( ), whose playback is requested by the script control module 211, that is, the first PlayList( ) (PlayList #0).

In other words, in step S121, the player control module 212 recognizes the IN_time (FIG. 6) of the first PlayItem #0 included in the first PlayList #0, and proceeds to step S122. The player control module 212 checks, in clip stream file "00001.PS" which is played back based on the first PlayItem #0 included in the first PlayList #0, a playback starting position in which playback is to be started and which corresponds to the IN_time of PlayItem #0.

Here, when the IN_time (FIG. 6) of PlayItem( ) represents the beginning of the clip stream file, a program stream may be read from the beginning of the clip stream file. When the IN_time represents a position other the beginning of the clip stream file, it is necessary to perform finding (checking) a position corresponding to the IN_time and reading the program stream therefrom.

Specifically, as is shown in FIG. 25, the IN_time of the first PlayItem #0 included in the first PlayItem #0 is 180,090. The player control module 212 finds a playback starting position adapted for 180,090, which is the IN_time of PlayItem #0, from the EP_map( ) in FIG. 27 of clip stream file "00001.CLP" which is played back based on the first PlayItem #0 included in the first PlayList #0.

In other words, by using a binary search or the like, the player control module 212 searches for the maximum PTS_EP_start which satisfies the expression PTS_EP_start≦IN_time from among the PTS_EP-start items which are described in the EP_map( ) and which represent decode startable positions. The reason that the PTS_EP_start not greater than the IN_time is searched for is that the position represented by the IN_time is not always a decode startable position.

In this case, the IN_time is 180,090, as described above. In addition, in the EP_map( ) shown in FIG. 27 of clip stream file "00001.CLP" which is played back based on the first PlayItem #0 included in the first PlayList #0, 180,090 is described as the maximum PTS_EP_start satisfying the expression PTS_EP_start≦IN_time. Therefore, in the player control module 212, from the EP_map( ) shown in FIG. 27, a PTS_EP_start of 180,090 is searched for.

In addition, in the player control module 212, (sector) 305, which is the RPN_EP_start corresponding to the found RPN_EP_start is read, and a position in clip stream file "00001.PS" which is represented by the RPN_EP_start of 305 is determined as a playback starting position.

After the player control module 212 determines the playback starting position, as described above, it proceeds from step S122 to S123 and controls the graphics processing module 219 to display a time code. In accordance with the control of the player control module 212, the graphics processing module 219 generates and outputs (video data of) the time code to the video output module 220. This initiates display of the time code.

Here, the time code whose display is initiated in step S123 is, for example, a value obtained by converting the beginning of PlayList( ) into 00:00:00 (hours:minutes:seconds). In addition, chapter and index numbers may be displayed with the time code or without the time code.

"Analyzing PlayListMark( )"

After display of the time code is initiated in step S123, the process proceeds to step S124. The player control module 212 performs analyzing processing in which the PlayList( ) whose playback is requested by the script control module 211, that is, the PlayListMark( ) (FIG. 7) described in the first PlayList( ) (PlayList #0) is analyzed.

Specifically, since, in the PlayListMark( ) shown on the upper side in FIG. 28 of the first PlayList #0 in the already read "PLAYLIST.DAT" file, the number_of_PlayList_marks is 7, the player control module 212 recognizes that the Mark( ) items included in PlayList #0 is 7.

In addition, by analyzing seven Mark( ) items on the upper side in FIG. 28 which are included in PlayList #0, based on the ref_to_PlayItem_id, the player control module 212 recognizes that four Mark( ) items from the first to fourth ones among the seven Mark( ) items belong to the first PlayItem( ) (PlayItem #0) in the PlayList #0.

After that, the player control module 212 extracts the mark_ time_stamp items of the four Mark( ) items which belong to the first PlayItem #0 of PlayList #0, and passes the extracted items, as an arrangement in which the number of elements is 4, to the decoding control module 214. In other words, in the above manner, four time points, {180,090}, {5,580,090}, {10,980,090}, and {16,380,090}, which are the mark_time_stamp items of four Mark( ) items from the first to fourth ones among the seven Mark( ) items on the upper side in FIG. 28, are passed from the player control module 212 to the decoding control module 214. At this time, the player control module 212 also informs the decoding control module 214 that the attributes of these times are "Mark Process". When the time measured by the timer unit 214A coincides with the time of the "Mark Process" attribute, the decoding control module 214 informs the player control module 212 of a message representing the coincidence, the time that coincides with the time of the "Mark Process" attribute, and the "Mark Process" attribute.

"Determining Elementary Streams to be Played Back"

Next, proceeding from step S124 to S125, the player control module 212 determines elementary streams to be played back.

In other words, since, in the clip information file "00001.CLP" in FIG. 26, whose file name is described in the Clip_Information_file_name of the first PlayItem #0 (FIG. 25) of the first PlayList #0, which is PlayList( ) whose playback is requested by the script control module 211, the number_of_streams is 4, the player control module 212 recognizes that four elementary streams are multiplexed in corresponding clip stream file "00001.PS". In addition, by sequentially checking the stream_id of StaticInfo( ) of the clip information file "00001.CLP" and necessary private_stream_id in FIG. 26, the player control module 212 recognizes that the four elementary streams are one video stream, one ATRAC audio stream, and two subtitle streams. In other words, the number of elementary streams which have attributes and which are multiplexed in clip stream file "00001.PS" is recognized.

Information of the number of elementary streams which have attributes and which are multiplexed in the clip stream file is used in switching an elementary stream being played back (audio switching, subtitle switching, etc.). In addition, the subtitle stream may not exist in the clip stream file (no subtitles are included in content), and, in determining whether or not the subtitle stream exists, the information of the number of elementary streams having "Subtitle Stream" attributes.

Based on the result of checking StaticInfo( ), as described above, the player control module 212 selects and determines elementary streams to be played back. However, since, in this case, the four elementary streams multiplexed in clip stream file "00001.PS" only contain only one "Video Stream" attribute elementary stream and only one "Audio Stream" attribute elementary stream, "Video Stream" attribute elementary streams and "Audio Stream" attribute elementary streams are not selectable, so that the one video stream and the one audio stream (ATRAC audio stream) are determined as elementary streams to be played back.

In addition, regarding "Subtitle Stream" attribute elementary streams, two streams exist among the four elementary streams multiplexed in clip stream file "00001.PS". Thus, one of the two subtitle streams is selected and determined as an elementary stream to be played back. Here, between the two subtitle streams, for example, the first subtitle stream in order of appearance in clip information file "00001.CLP" is selected.

As described above, in the case of recognizing the attributes and number of the four elementary streams multiplexed in clip stream file "00001.PS", the four elementary streams need to be respectively specified. Accordingly, the player control module 212 uses the stream_id and necessary private_stream_id to specify the four elementary streams multiplexed in clip stream file "00001.PS".

Specifically, as described concerning clip information file "00001.CLP" with reference to FIG. 26, by using the stream_id of 0xE0, the player control module 212 specifies the video stream, which is the "Video Stream" attribute elementary stream among the four elementary streams multiplexed in clip stream file "00001.PS".

In addition, as described concerning clip information file "00001.CLP" with reference to FIG. 26, by using the stream_id of 0xBD and the private_stream_id of 0x00, the player control module 212 specifies the ATRAC audio stream, which is the "Audio Stream" attribute elementary stream among the four elementary streams multiplexed in clip stream file "00001.PS".

Furthermore, as described concerning clip information file "00001.CLP" with reference to FIG. 26, by using the stream_id of 0xBD, the private_stream_id of 0x80, the stream_id of 0xBD, and the private_stream_id of 0x81, the player control module 212 specifies the two subtitle streams, which are the "Subtitle Stream" attribute elementary streams among the four elementary streams multiplexed in clip stream file "00001.PS".

As described above, based on a combination of the stream_id and private_stream_id which are described as metadata of a clip information file corresponding to a clip stream file, elementary streams which are multiplexed in the clip stream file can be specified.

Here, the combination of the stream_id and the private_stream_id is a mechanism provided for extending multiplexing of the MPEG-2 System. By using, in metadata, the combination of the stream_id and the private_stream_id, to specify an elementary stream, it is ensured that the elementary stream can be specified. In addition, even if, in the future, the meaning of the private_stream_id is extended to increase the number of types (attributes) of corresponding elementary streams, the present mechanism can be used without being changed. Thus, the combination excels at extensibility.

In other words, for example, in the BD (Blue ray Disc) standard, the PID (Packet ID) of a Transport Stream in accordance with the MPEG-2 standard is used to specify data. Thus, the specification is bound by the MPEG-2 standard. Also, although, for example, in the DVD-Video standard, sub_stream_id similar to the private_stream_id is defined, the sub_stream_id is not formed so as to be described in a database for specifying streams, and it is only formed so as to be described in a fixed region describing information of 8 or 32 streams (see, for example, VI4-49, Table 4.2.1-2 (VTS-AST_ATRT) and VI4-52, Table 4.2.1-3 (VTS_SPST_ATRT), etc.), so that it has low extensibility.

Differently from that, the combination of the stream_id and the private_stream_id can be described for as many times as the number that can be represented by the number_of_streams in, for example, the clip information file Clip( ) in FIG. 10, in which metadata is described. Thus, the elementary streams that are multiplexed in the clip stream file can be specified based on the combination of the stream_id and the private_stream_id as the metadata described in clip information file Clip( ) regardless of (in the range of the number that can be represented by the number_of_streams) the number of the elementary streams.

In this embodiment, the combination of the stream_id and the private_stream_id is used, in the clip information file in FIG. 10, to specify the elementary streams multiplexed in a corresponding clip stream file, and, in addition, it is used, for example, as a combination of the entry_ES_stream_id and the entry_ES_private_stream_id in the PlayListMark( ) in FIG. 7, to specify an elementary stream for associating Mark( ). Furthermore, the combination of the stream_id and the private_stream_id is used, for example, in the EP_map( ) in FIG. 14, specify an elementary stream describing information of a decode startable point.

"Controlling Output Attribute"

After that, proceeding from step S125 to S126, the player control module 212 performs controlling the elementary streams to be played back, that is, the output attribute of the elementary stream that is determined in step S125 to be played back.

Specifically, regarding the elementary streams to be played back, that is, each of the video stream, ATRAC audio stream, and subtitle stream that is determined in step S125 to be played back, the player control module 212 checks the number_of_DynamicInfo (FIG. 10) which represents the number of DynamicInfo( ) (FIG. 13) items in which output attributes are described.

Here, in this case, the video stream, ATRAC audio stream, and subtitle stream to be played back are the elementary streams multiplexed in clip stream file "00001.PS", and their number_of_DynamicInfo items are 0's, as described concerning "00001.CLP" with reference to FIG. 26. In such a case where the number_of_DynamicInfo items are 0's concerning all the elementary streams to be played back, the player control module 212 does not particularly perform processing for processing of controlling the output attributes of the elementary streams to be played back.

Processing is described later that is performed when the number_of_DynamicInfo is not 0 concerning elementary streams to be played back, for controlling the output attribute of the elementary stream.

"Preparing for Starting Playback"

After processing in step S126, proceeding to step S127, the player control module 212 performs preparing for starting playback of the elementary streams to be played back.

In other words, the player control module 212 supplies the content data supplying module 213 with the file name of clip stream file "00001.PS" in which the elementary streams to be played back are multiplexed, and the RPN_EP_start (=305) described in the EP_map( ) determined as a playback starting position in step S122.

In addition, the player control module 212 initializes the buffer control module 215 before starting supply to the buffer control module 215 of the program stream stored in clip stream file "00001.PS" in which the elementary streams to be played back are multiplexed.

Specifically, in the buffer control module 215 (FIG. 3), equal values are assigned to a data beginning pointer stored in the data beginning pointer storage unit 231, a data writing pointer stored in the data writing pointer storing section 232, a video reading pointer stored in the video reading pointer storing section 241, an audio reading pointer stored in the audio reading pointer storing section 51, and a subtitle reading pointer stored in the subtitle reading pointer storing section 262.

Accordingly, the data beginning pointer stored in the data beginning pointer storage unit 231 and the data writing pointer stored in the data writing pointer storing section 232 represent the same position in the buffer 215A of the buffer control module 215. This indicates a state in which effective data is not stored in the buffer 215A.

Furthermore, the player control module 212 supplies the buffer control module 215 with the stream_id as identification information identifying (specifying) the elementary streams to be played back, and, in addition, the private_stream_id, if necessary.

In other words, as described above, among the elementary streams to be played back, a video stream having the "Video Stream" attribute is specified by a stream_id of 0xE0, the ATRAC audio stream having the "Audio Stream" attribute is specified by a stream_id of 0xBD and a private_stream_id of 0x00, and a subtitle stream having the "Subtitle Stream" attribute is specified by a stream_id of 0xBD and a private_stream_id of 0x80. The player control module 212 supplies the stream_id and private_stream_id to the buffer control module 215.

In the buffer control module 215 (FIG. 3), the video reading function unit 233 stores, in the stream_id register 242, the stream_id of 0xE0 concerning the video stream from the player control module 212. In addition, the audio reading function unit 234 stores the stream_id of 0xBD and private_stream_id of 0x00 from the player control module 212 in the stream_id register 252 and the private_stream_id register 253, respectively. Furthermore, the private_stream_id register 253 stores the stream_id of 0xBD and private_stream_id of 0x80 from the player control module 212 in the stream_id register 263 and the private_stream_id register 264, respectively.

For further processing, the player control module 212 stores the stream_id and private_stream_id of the elementary streams to be played back which are supplied to the buffer control module 215. The player control module 212 uses the stream_id and private_stream_id to specify streams being presently played back in a case in which a message requesting stream switching, which is described later, and in Mark Process, which is described later.

For initializing the buffer control module 215 (FIG. 3), the player control module 212 also sets, in the subtitle reading function section 261, a subtitle reading flag having value in accordance with the clip stream file in which the elementary streams to be played back are multiplexed.

In other words, in this case, since the subtitle stream is included in clip stream file "00001.PS" in which the elementary streams to be played back are multiplexed, a subtitle reading function flag having a value of 1 is set in the subtitle reading function section 261 in order for the subtitle reading function unit 235 to function. When no subtitle stream is included in the clip stream file in which elementary streams to be played back are multiplexed, a subtitle reading function flag having a value of 0 is set in the subtitle reading function section 261. In this case, the subtitle reading function unit 235 does not function (does not particularly processing).

In addition, the player control module 212 supplies the decoding control module 214 with 180,090 as the IN_time and 27,180,090 as the OUT_time of the first PlayItem #0 (FIG. 25) included in the first PlayList #0 whose playback is requested by the script control module 211. In the decoding control module 214, the IN_time is used to control starting decoding of a clip which is played back based on PlayItem( ), and the OUT_time is used to finish decoding of the clip, and, in addition, to control PlayItem switching, which is described later.

In addition, the player control module 212 initializes directing of the subtitle display form for the graphics processing module 219. In other words, the player control module 212 controls the graphics processing module 219 so that the subtitle stream display form is changed to, for example, a default display form.

"Starting Data Reading"

After that, proceeding from step S127 to S128, the player control module 212 controls the content data supplying module 213, whereby, by a function of the operating system 201, the content data supplying module 213 reads a clip stream file storing the program stream in which the elementary streams to be played back are multiplexed. In other words, by designating clip stream file "00001.PS" in the "STREAM" directory located in the "VIDEO" directory on the disc 101 (FIG. 4), and further designating sector 305 as the playback starting position determined in step S122, the content data supplying module 213 requests the operating system 201 to perform file reading. In addition, the content data supplying module 213 directs supply of data read from the disc 101 to the buffer control module 215.

In the above manner, the reading of the program stream stored in clip stream file "00001.PS" from the disc 101 is started and the program stream is supplied to the buffer control module 215.

The buffer control module 215 (FIG. 3) writes the program stream supplied after being read from the disc 101 in a position represented by the data writing pointer of the data writing pointer storing section 232, and the data writing pointer is incremented by the size of the written data.

Here, in the following, unless otherwise stated, the content data supplying module 213 reads data from the disc 101 if the buffer 215A in the buffer control module 215 has free space, and supplies and stores the data in the buffer 215A in the buffer control module 215. Therefore, it is assumed that the buffer 215A constantly stores enough data.

"Initiate Decoder Control"

After, as described above, the reading of data from the disc 101 is initiated and the data begins to be stored in the buffer 215A in the buffer control module 215, the process proceeds from step S128 to S129. By controlling the video decoder control module 216, the audio decoder control module 217, and the subtitle decoder control module 218, the decoding control module 214 initiates reading of data from the buffer 215A in a stage prior to a decoding operation.

In other words, this allows the video decoder control module 216 to obtain one video access unit stored in the buffer 215A, PTS and DTS (hereinafter referred to as a time stamp, if necessary) added to the video access unit, and a pic_struct_copy, au_ref_flag, and AU_length serving as information (hereinafter referred to as additional information, if necessary) described in the PES_packet( ) of the private_stream_2 located immediately prior to the decode startable point, etc., which are passed from the buffer control module 215 in response to a data request after the data request is issued to the video reading function unit 233 in the buffer control module 215 (FIG. 3). The time stamp is passed from the video decoder control module 216 to the decoding control module 214 whenever the video decoder control module 216 obtains a video access unit.

In addition, also the audio decoder control module 217 obtains one (ATRAC) audio access unit stored in the buffer 215A and time stamps (PTS, DTS) added to the audio access unit which are passed from the buffer control module 215 in response to a data request after the data request is issued to the audio reading function unit 234 in the buffer control module 215 (FIG. 3). The time stamps are passed from the audio decoder control module 217 to the decoding control module 214 whenever the audio decoder control module 217 obtains an audio access unit.

Furthermore, the subtitle decoder control module 218 obtains one subtitle access unit stored in the buffer 215A and a time stamp added to the subtitle access unit which are passed from the buffer control module 215 in response to a data request after the data request is issued to the subtitle reading function unit 235 in the buffer control module 215 (FIG. 3). The time stamp is passed from the subtitle decoder control module 218 to the decoding control module 214 whenever the subtitle decoder control module 218 obtains a subtitle access unit. In addition, when no subtitle stream exists in the elementary streams to be played back, and when no subtitle access unit is stored in the buffer 215A, data is not passed from the buffer control module 215 to the subtitle decoder control module 218.

Here, whenever data is requested from the buffer control module 215, the video decoder control module 216, the audio decoder control module 217, and the subtitle decoder control module 218 each pass, to the decoding control module 214, a result in response to the data request.

In addition, details of reading of data from the buffer 215A in the case of passing the data from the buffer control module 215 to the video decoder control module 216, the audio decoder control module 217, and the subtitle decoder control module 218 are described later.

"Initiate Decoding"

As described above, when the video decoder control module 216, the audio decoder control module 217, or the subtitle decoder control module 218 initiates reading data from the buffer 215A in the buffer control module 215, the process proceeds from step S129 to S130, and decoding of the data is initiated.

In other words, based on 180,090 which is the IN_time of the first PlayItem #0 included in PlayList #0 and which is supplied from the player control module 212 in step S127, and, in addition, the time stamps passed as described in step S129 from the video decoder control module 216, the audio decoder control module 217, and the subtitle decoder control module 218, the video decoder control module 216, the audio decoder control module 217, and the subtitle decoder control module 218 are ordered to initiate decoding, with timing shifted if it is necessary to establish synchronization.

A method for ordering initiation of decoding with timing shifted for establishing synchronization is described in, for example, Japanese Patent No. 3496725. For brevity of description, there is a method in which, among the time stamps passed from the video decoder control module 216, the audio decoder control module 217, and the subtitle decoder control module 218, the minimum value is set as an initial value of the time measured by the timer unit 214A, time measurement is initiated, and, at the time the time measured by the timer unit 214A coincides with the time stamp, initiation of decoding is ordered.

The video decoder control module 216 receives a decoding initiating instruction from the decoding control module 214, passes, to the video decoder 116 (FIG. 1), one video access unit obtained from the video reading function unit 233 in the buffer control module 215 (FIG. 3) in response to the instruction, and controls the video decoder 116 to perform decoding. In addition, the video decoder control module 216 supplies the graphics processing module 219 with video data obtained as the result of decoding by the video decoder 116.

Subsequently, the video decoder control module 216 uses the video decoder 116 to sequentially decode each video access unit obtained from the video reading function unit 233 in the buffer control module 215, and supplies the graphics processing module 219 with video data obtained as the result of the decoding.

In addition, also the audio decoder control module 217 receives a decoding initiating instruction from the decoding control module 214. In response to the instruction, the audio decoder control module 217 passes, to the audio decoder 117 (FIG. 1), one audio access unit obtained from the audio reading function unit 234 in the buffer control module 215 (FIG. 3), and controls the audio decoder 117 to perform decoding. Furthermore, the audio decoder control module 217 supplies the audio output module 221 with audio data obtained as the result of decoding by the audio decoder 117.

Subsequently, the audio decoder control module 217 uses the audio decoder 117 to sequentially decode each audio access unit obtained from the audio reading function unit 234 in the buffer control module 215, and supplies the audio output module 221 with audio data obtained as the result of the decoding.

Also the subtitle decoder control module 218 receives a decoding initiating instruction from the decoding control module 214. In response to the instruction, the subtitle decoder control module 218 uses its internal subtitle decoding software to decode one subtitle access unit obtained from the subtitle reading function unit 235 in the buffer control module 215 (FIG. 3), and supplies the graphics processing module 219 with subtitle data (subtitle image data) obtained as the result of the decoding.

Subsequently, the subtitle decoder control module 218 uses its internal subtitle decoding software to sequentially decode each subtitle access unit obtained from the subtitle reading function unit 235 in the buffer control module 215, and supplies the graphics processing module 219 with subtitle data obtained as the result of the decoding.

"Graphics Processing"

After that, the process proceeds from step S130 to S131, and the video content playback program 210 performs graphics processing on the video data supplied as described above from the video decoder control module 216, and, in addition, the subtitle data supplied from the subtitle decoder control module 218, if necessary.

In other words, in accordance with a display form instruction from the player control module 212, at first, the graphics processing module 219 performs subtitle processing, such as enlargement and reduction, on the subtitle data from the subtitle decoder control module 218. When receiving no display form instruction from the player control module 212, or when receiving a default display form instruction, the graphics processing module 219 directly stores the subtitle data from the graphics processing module 219.

In addition, by adding the video data from the video decoder control module 216, and the subtitle data from the subtitle decoder control module 218 or subtitle data obtained after the subtitle processing, the graphics processing module 219 obtains output video data in which the subtitle data is overlaid on the video data from the video decoder control module 216, and supplies the data to the video output module 220.

When being instructed by the player control module 212 to display information such as, for example, a menu, a message, a time code, a chapter, or an index, the graphics processing module 219 generates and supplies the information to the video output module 220 in a form overlaid on the output video data.

"Output Processing"

After processing in step S131, the process proceeds to step S132. the video output module 220 sequentially stores, in the FIFO 220A, the output video data supplied from the graphics processing module 219, as described in step S131, and sequentially outputs the output video data stored in the FIFO 220A at a predetermined output rate.

Although video output module 220 receives the output video data from the graphics processing module 219 as long as the storage capacity (remaining amount) of the FIFO 220A is enough, if the storage capacity is not enough, it requests the graphics processing module 219 to stop receiving the output video data. This causes the graphics processing module 219 to stop processing, and requests the video decoder control module 216 and the subtitle decoder control module 218 to stop processing. This stops the processing of the video decoder control module 216 and the subtitle decoder control module 218.

After requesting the graphics processing module 219 to stop receiving the output video data, the video output module 220 requests the graphics processing module 219 to receive the output video data at the time the output of the output video data from the FIFO 220A is advanced and the FIFO 220A comes to have enough space. Similarly to the request to stop receiving the output video data, this request is reported from the graphics processing module 219 to the video decoder control module 216 and the subtitle decoder control module 218. This causes the graphics processing module 219, and, in addition, the video decoder control module 216 and the subtitle decoder control module 218 to restart the stopped processing.

In addition, also the audio output module 221 sequentially stores, in the FIFO 221A, the audio data supplied from the audio decoder control module 217 as described above, and sequentially outputs the audio data stored in the FIFO 221A at a predetermined output rate (sampling frequency).

Although the audio output module 221 receives the audio data from the audio decoder control module 217 as long as the storage capacity (remaining amount) of the FIFO 221A is enough, if the storage capacity is not enough, the audio output module 221 requests the audio decoder control module 217 to stop receiving the audio data. This causes the audio decoder control module 217 to stop processing.

After requesting the audio decoder control module 217 to stop receiving the audio data, the audio output module 221 requests the audio decoder control module 217 to receive the audio data at the time the output of the audio data from the FIFO 221A is advanced and the FIFO 221A comes to have enough space. This causes the audio decoder control module 217 to restart the stopped processing.

As described above, decoding of the elementary streams is performed as the data is output from the video output module 220 and the video output module 220.

The flow of the entire processing or operation when the disc device in FIG. 1 plays back the disc 101 is as described in FIGS. 29 and 30. Other processing or operation while the disc 101 is being played back by the disc device is described below.

"PlayItem Changing"

As described in FIGS. 29 and 30, the first PlayItem #0 in the first PlayList #1 in FIG. 25 is started. According to PlayItem #0, after playback of the first PlayItem #0 finishes, the second PlayItem #1 begins. In other words, PlayItem changing in which PlayItems are changed from PlayItem #0 to PlayItem #1 is performed.

Accordingly, a process of the PlayItem changing is described with reference to the flowchart in FIG. 31.

After playback of (a clip of) the first PlayItem #0 in the PlayList #0 in FIG. 25 is started as described in FIGS. 29 and 30, the decoding control module 214 (FIG. 2) continuously confirms the time measured by the built-in timer unit 214A while the first PlayItem #0 is being played back.

"End of Playback of PlayItem #0"

When the time measured by the timer unit 214A is equal to 27,180,090 (FIG. 25) which is the OUT_time of the first PlayItem #0 and which is supplied from the player control module 212 in step S127 in FIG. 30, in step S151, the decoding control module 214 perform decoding interrupting control to end the playback of PlayItem #0.

In other words, the decoding control module 214 stops a decoding operation by operating the video decoder control module 216, the audio decoder control module 217, and the subtitle decoder control module 218. In addition, the decoding control module 214 controls the video output module 220 to continuously output video data being presently output.

In addition, the decoding control module 214 informs the player control module 212 of a message indicating that playback of the first PlayItem #0 has ended.

"Initiate Playback of PlayItem #1"

As described above, in step S105 in FIG. 29, the player control module 212 recognizes that, in the first PlayList #0, the first PlayItem #0 and the second PlayItem #1 exist. Accordingly, when being informed, by the decoding control module 214, of the message indicating that playback of the first PlayItem #0 has ended, the player control module 212 proceeds from step S151 to S152, and initiates playback of the second PlayItem #1 similarly to the above-described case for the first PlayItem #0.

In other words, in an overview of a process for playing back PlayItem #1, similarly to the case in step S122 in FIG. 30, at first, the player control module 212 determines, as a playback starting position, one of the RPN_EP_start items described in the EP_map( ).

In addition, the player control module 212 performs recognition of Mark( ) belonging to the second PlayItem #1, as described in step S124 in FIG. 30, recognition of the number of elementary streams which have attributes and which are multiplexed in clip stream file "00002.PS" to be played back based on PlayItem #1, as described in step S125 in FIG. 30, and, in addition, determination of elementary streams to be played back.

The player control module 212 performs processing similar to that in the case of step S127 in FIG. 30.

In other words, the player control module 212 supplies the content data supplying module 213 with the RPN_EP_start of the EP_map( ) which is determined as the playback starting position, and the file name of a clip stream file in which the elementary streams to be played back are multiplexed, that is, in this case, the file name of clip stream file "00002.PS" corresponding to "00002.CLP" described in the Clip_Information_file_name of the second PlayItem #1 (FIG. 25).

Furthermore, before the supply to the buffer control module 215 of the program stream stored in clip stream file "00002.PS" in which the elementary streams to be played back are multiplexed is initiated, the player control module 212 initializes the buffer control module 215.

Specifically, this assigns, in the buffer control module 215 (FIG. 3), equal values to the data beginning pointer stored in the data beginning pointer storage unit 231, the data writing pointer stored in the data writing pointer storing section 232, the video reading pointer stored in the video reading pointer storing section 241, the audio reading pointer stored in the audio reading pointer storing section 251, and the subtitle reading pointer stored in the subtitle reading pointer storing section 262.

Furthermore, the player control module 212 supplies the buffer control module 215 with the stream_id as identification information identifying the elementary streams to be played back, and, in addition, the private_stream_id, if necessary.

In the buffer control module 215 (FIG. 3), the video reading function unit 233 stores, in the stream_id register 242, the stream_id from the player control module 212 concerning the video stream among the elementary streams to be played back. Also, the audio reading function unit 234 respectively stores, in the stream_id register 252 and the private_stream_id register 253, the stream_id and private_stream_id, from the player control module 212, of the audio stream among the elementary streams to be played back.

Since the subtitle stream is included in clip stream file "00002.PS" in which the elementary streams to be presently played back are multiplexed, the stream_id and private_stream_id of the subtitle stream among the elementary streams to be played back are supplied from the player control module 212 to the subtitle reading function unit 235, and the subtitle reading function unit 235 stores the stream_id and private_stream_id in the stream_id register 263 and the private_stream_id register 264, respectively.

In initialization of the buffer control module 215 (FIG. 3), the player control module 212 sets, in the subtitle reading function section 261, a subtitle reading function flag having a value in accordance with the clip stream file in which the elementary streams to be played back are multiplexed.

In other words, in this case, since the subtitle stream is included in clip stream file "00002.PS" in which the elementary streams to be played back are multiplexed, a subtitle reading function flag whose value is 1 is set in the subtitle reading function section 261 in order for the subtitle reading function unit 235 to function.

In addition, the player control module 212 supplies the decoding control module 214 with the IN_time 90,000 and OUT_time 27,090,000 of the second PlayItem #1 (FIG. 25) which is to be played back.

Furthermore, the player control module 212 initializes the subtitle display form instruction to the graphics processing module 219. In other words, the player control module 212 controls the graphics processing module 219 so that the subtitle stream display form is changed to a default display form.

When, regarding the elementary streams to be played back, the configurable_flag (FIG. 12) is 1, which represents permission to change the display form, the subtitle stream display form instruction from the player control module 212 to the graphics processing module 219 may be unchanged from the present display form.

Subsequently, playback of the second PlayItem #1 is performed similarly to the playback of the first PlayItem #0. The decoding control module 214 continuously confirms the time measured by the built-in timer unit 214A while the second PlayItem #1 is being played back, and, when the time measured by the timer unit 214A is equal to the OUT_time 27,090,000 (FIG. 25) of the second PlayItem #1 supplied from the player control module 212, ends the playback of PlayItem #1 by performing decoding interrupting control similarly to the case in step S151.

"Display of Time Code"

Next, as described above, in step S123 in FIG. 30, display of the time code is initiated and the display of the time is sequentially updated.

Figure 32:
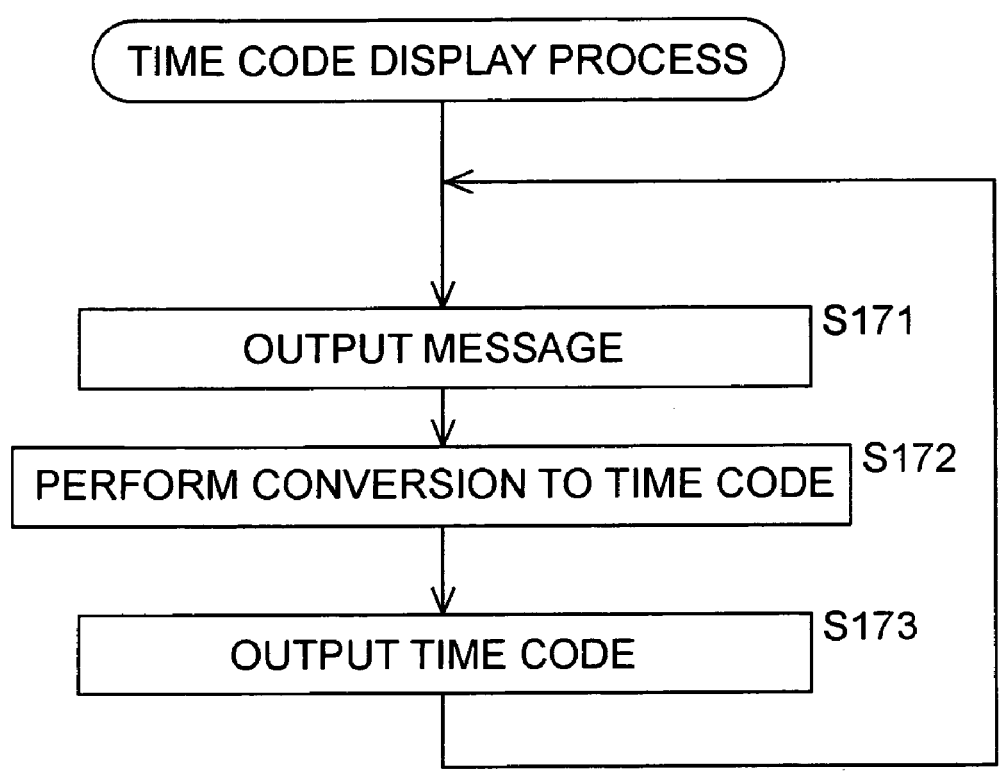
FIG. 32 is a flowchart illustrating a time code display process.

Accordingly, a process for displaying the time code is described with reference to the flowchart in FIG. 32.

When the built-in timer unit 214A measures one second, in step S171, the decoding control module 214 (FIG. 2) supplies the player control module 212 with a message indicating that one second has passed and the present time measured by the timer unit 214A, and proceeds to step S172. In step S173, the player control module 212 receives the message and present time from the decoding control module 214, converts the present time to a time code, and proceeds to step S173.

In step S173, the player control module 212 controls the graphics processing module 219 to display the time code obtained in step S172, and returns to step S171.

This updates the time code in each second. The interval of updating the time code is not limited to one second.

"Stream Switching"

Next, as described in FIG. 26, two subtitle streams are multiplexed in clip stream file "00001.PS" that is played back based on the first PlayItem #0 included in the first PlayList #0 described in FIG. 1 and clip stream file "00002.PS" that is played back based on the second PlayItem #1.

In such a case in which a plurality of elementary streams having the same attribute are multiplexed in a clip stream file, regarding the elementary streams to be played back, stream switching can be performed in which, among the elementary streams having the same attribute, one is switched to another.

Figure 33:
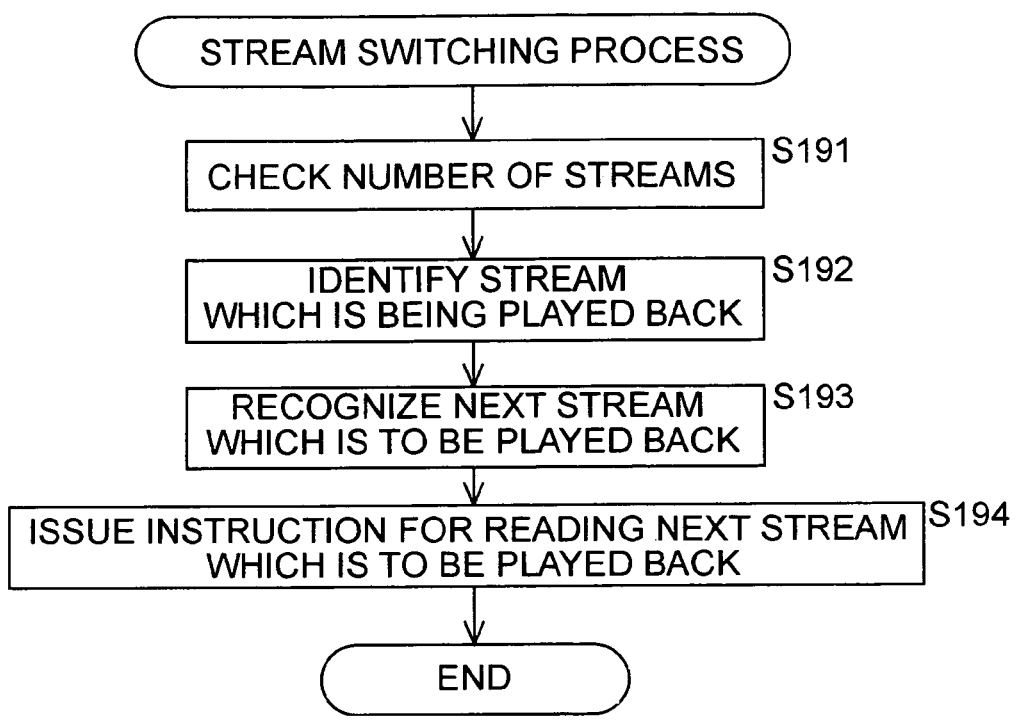
FIG. 33 is a flowchart illustrating a stream switching process.

Accordingly, a process for stream switching is described with reference to the flowchart in FIG. 33.

A stream switching request is supplied such that, for example, when a stream switching instruction is described as a script program in the "SCRIPT.DAT" file (FIG. 4), the script control module 211 executes the script program, or the user operates the remote controller.

In other words, when executing the script program in which the stream switching instruction is described, the script control module 211 supplies the player control module 212 with a message requesting stream switching. In addition, when receiving a stream switching instruction signal from the remote controller by the user operating the remote controller, the input interface 115 supplies the player control module 212 with a stream switching requesting message.

By way of example, at present, if the player control module 212 is supplied with a subtitle switching message requesting switching of the subtitle stream, in step S191, the player control module 212 checks the number of subtitle streams which is recognized in the determination of the elementary streams to be played back which is performed in step S125 in FIG. 30.

When the result of checking the number of subtitle streams indicates one or less, the player control module 212 ignores the subtitle stream switching message. Thus, processing in subsequent steps S192 to S194 is not performed.

In addition, when the number of subtitle streams is two or greater, the process sequentially proceeds to steps S192 through S194, the subtitle stream to be played back is switched from the subtitle stream being presently played back to another subtitle stream.

In other words, in step S192, the player control module 212 specifies, in the clip information file, the subtitle stream being presently played back. Specifically, for example, assuming that, based on the second PlayItem #1 included in the first PlayList #0 described in FIG. 25, the subtitle stream which has a stream_id of 0xBD and a private_stream_id of 0x80 and which is multiplexed in clip stream file "00002.PS" is played back, in step S192, the subtitle stream being presently played back is specified as, between the two subtitle streams multiplexed in clip stream file "00002.PS", the third subtitle stream or stream #2 in the clip information file "00002.CLP" in FIG. 26.

Proceeding to step S193, the player control module 212 identifies (specifies), in the clip information file, as the next subtitle stream to be played back, the subtitle stream following the subtitle stream specified in step S192. Since, in FIG. 26, in clip information file "00002.CLP", the subtitle stream following the third subtitle stream or stream #2 is the fourth subtitle stream or stream #3, in step S193, the fourth subtitle stream or stream #3 is recognized as the next subtitle stream to be played back.

When the subtitle stream being presently played back is specified as, between the two subtitle streams multiplexed in clip stream file "00002.PS", the fourth subtitle stream or stream #3 in the clip information file "00002.CLP" in FIG. 26, for example, the third subtitle or stream #2 is recognized as the next subtitle stream to be played back.

After that, proceeding to step S194, the player control module 212 supplies the subtitle reading function unit 235 in the buffer control module 215 (FIG. 3) with the stream_id and private_stream_id of the next subtitle stream to be played back which is recognized in step S193, and instructs the subtitle reading function unit 235 to use the stream_id and private_stream_id from the next reading from the buffer 215A in the subtitle access unit.

In the subtitle reading function unit 235 in the buffer control module 215 (FIG. 3), new stream_id and private_stream_id supplied from the player control module 212 in step S194 are set in the stream_id register 263 and the private_stream_id register 264, respectively, and the next and subsequent reading from the buffer 215A is performed for a subtitle access unit specified by the new stream_id and private_stream_id respectively set in the stream_id register 263 and the private_stream_id register 264.

As described above, the subtitle stream to be played back is switched from the subtitle stream being presently played back to another subtitle stream.

Processing of Buffer Control Module 215

Next, processing of the buffer control module 215 (FIG. 3), that is, writing data to the buffer 215A and reading of data from the buffer 215A are described with reference to FIGS. 34 to 38.

As described in FIG. 3, the buffer control module 215 has five pointers for reading and writing data in the buffer 215A.

Figure 34:
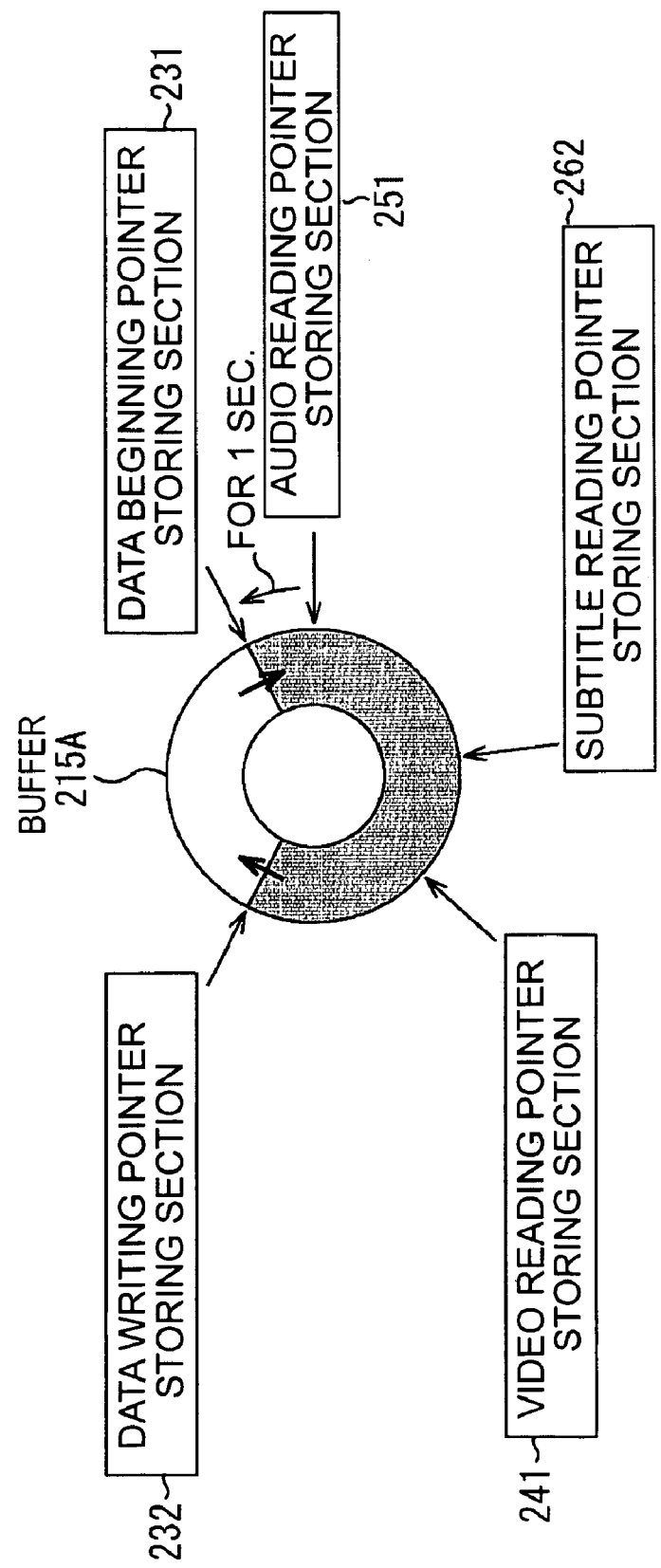
FIG. 34 is a flowchart illustrating processing of a buffer control module 215.
Figure 35:
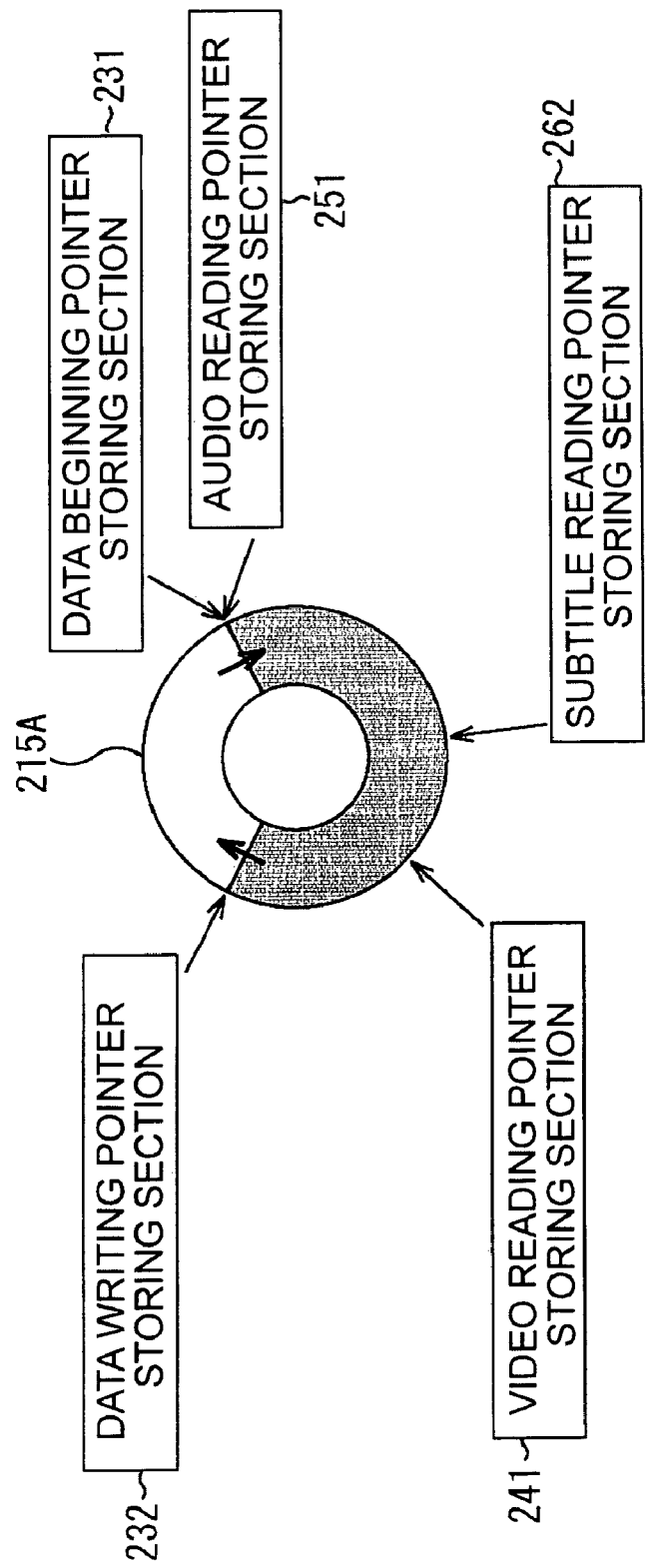
FIG. 35 is a flowchart illustrating processing of the buffer control module 215.

Specifically, as shown in FIGS. 34 and 35, the buffer control module 215 has the data beginning pointer stored in the data beginning pointer storage unit 231, the data writing pointer stored in the data writing pointer storing section 232, the video reading pointer stored in the video reading pointer storing section 241, the audio reading pointer stored in the audio reading pointer storing section 251, and the subtitle reading pointer stored in the subtitle reading pointer storing section 262.

FIGS. 34 and 35 omit illustrations of, in FIG. 3, the stream_id register 242 and an_information( ) register 243 of the video reading function unit 233, the stream_id register 252 and private_stream_id register 253 of the audio reading function unit 234, the subtitle reading function section 261, stream_id register 263, and private_stream_id register 264 of the subtitle reading function unit 235.

The data beginning pointer stored in the data beginning pointer storage unit 231 represents the position of the oldest data (data which needs to be read and which is the oldest data in data that has not been read yet) remaining in the buffer 215A. The data writing pointer stored in the data writing pointer storing section 232 represents a position at which data is written in the buffer 215A, and this position is a position at which the newest data is written in the buffer 215A.

The video reading pointer stored in the video reading pointer storing section 241 represents the position of a video stream which is read from the buffer 215A. In addition the audio reading pointer stored in the audio reading pointer storing section 251 represents the position of an audio stream which is read from the buffer 215A, and the subtitle reading pointer stored in the subtitle reading pointer storing section 262 represents the position of a subtitle stream which is read from the buffer 215A.

As described in FIG. 3, any of the data beginning pointer, the data writing pointer, the video reading pointer, the audio reading pointer, and the subtitle reading pointer moves clockwise in the buffer 215A.

Furthermore, in this embodiment, the data beginning pointer is constantly updated so as to represent the same position as represented by a pointer representing the oldest data among the video reading pointer, the audio reading pointer, and the subtitle reading pointer. Here, in FIG. 35, among the video reading pointer, the audio reading pointer, and the subtitle reading pointer, the audio reading pointer represents the oldest data, and the data beginning pointer coincides with the audio reading pointer.

In the buffer control module 215 having the above data beginning pointer, video reading pointer, audio reading pointer, and subtitle reading pointer, when new data is written in the buffer 215A after being read from the disc 101, the data writing pointer is updated clockwise so as to represent a position just after the new data written.

Furthermore, when the video stream, the audio stream, or the subtitle stream, is read from the buffer 215A, the video reading pointer, the audio reading pointer, or the subtitle reading pointer is updated clockwise by a value in accordance with the amount of reading. Here, the value in accordance with the amount of reading is included between a part corresponding to the actually read video, audio, and subtitle data and the read data, and is one including a data part of another stream which is skipped in reading.

In addition, when the video reading pointer, the audio reading pointer, or the subtitle reading pointer is updated, the data beginning pointer is updated so as to represent the same position as represented by a pointer representing the oldest data among the video reading pointer, the audio reading pointer, and the subtitle reading pointer.

Regarding the writing of data to the buffer 215A, the buffer control module 215 controls the writing of data in the buffer 215A so as to prevent the data writing pointer from passing the data beginning pointer.

In other words, as long as passing of the data beginning pointer by the data writing pointer does not occur, in the buffer control module 215, the data read from the disc 101 is written at a position in the buffer 215A which is represented by the data writing pointer, so that the data writing pointer is updated. In addition, when the passing of the data beginning pointer by the data writing pointer is about to occur, in the buffer control module 215, the content data supplying module 213 is requested to stop (interrupt) reading of data from the disc 101, and writing of data in the buffer 215A is stopped. This can prevent the buffer 215A from overflowing.

As described above, writing into the buffer 215A of data read from the disc 101 is controlled only by a positional relationship between the data beginning pointer and the data writing pointer.

In addition, regarding data reading from the buffer 215A, the buffer control module 215 controls data reading from the buffer 215A so that the video reading pointer, the audio reading pointer, and the subtitle reading pointer, moreover, the data beginning pointer are prevented from passing the data writing pointer.

In other words, as long as passing of the data writing pointer by the video reading pointer, the audio reading pointer, or the subtitle reading pointer does not occur, in the buffer control module 215, in response to a request from the video decoder control module 216, the audio decoder control module 217, or the subtitle decoder control module 218, data is read from a position in the buffer 215A which is represented by the video reading pointer, the audio reading pointer, or the subtitle reading pointer, and the video reading pointer, the audio reading pointer, or the subtitle reading pointer is updated. In addition, the data beginning pointer is updated, if necessary. In addition, when the passing of the data writing pointer by the video reading pointer, the audio reading pointer, or the subtitle reading pointer is about to occur, in the buffer control module 215, a request from the video decoder control module 216, the audio decoder control module 217, or the subtitle decoder control module 218 is, for example, freezed, and is kept waiting for enough data to be prepared. This can prevent the buffer 215A from overflowing.

Accordingly, in the buffer 215A, in a range (the shadowed portions in FIGS. 34 and 35) from the position represented by the data beginning pointer to the position represented by the data writing pointer, data to be supplied to the video decoder control module 216, the audio decoder control module 217, and the subtitle decoder control module 218 is stored. Furthermore, in the range, the video reading pointer, the audio reading pointer, and the subtitle reading pointer exit.

In the above case, the data beginning pointer is updated so as to represent the position of the oldest data among the positions represented by the video reading pointer, the audio reading pointer, and the subtitle reading pointer. In addition thereto, updating of the data beginning pointer can be performed so as to represent the position of data in the past for a predetermined time (e.g., one second) from the oldest data.

In other words, in general, it is estimated that, in many cases, among the video reading pointer, the audio reading pointer, and the subtitle reading pointer, the video reading pointer and the audio reading pointer represent the position of the oldest data.

Therefore, in the case of updating the data beginning pointer so as to represent the position of data in the past for, for example, one second, from the position of the oldest data which is represented by the video reading pointer or the audio reading pointer, as shown in FIG. 34, data in the one-second past from the position of the oldest data which is represented by the video reading pointer or the audio reading pointer can be left in the buffer 215A. Here, in FIG. 34, the audio reading pointer represents the position of the oldest data, and the data beginning pointer represents the position of the data in the past for one second from the oldest data position.

As described above, by updating the data beginning pointer so as to represent the position in the past for only one second, responsiveness of the disc device can be improved.

In other words, as shown in FIG. 35, in the case of updating the data beginning pointer so as to represent the position of the oldest data which is represented by the audio reading pointer, for example, when special playback to a reverse direction is requested, it is necessary to re-read, from the disc 101, data whose reading from the buffer 215A has finished. Thus, some time is required after requesting the special playback until the special playback becomes possible.

Differently therefrom, as shown in FIG. 34, in the case of updating the data beginning pointer so as to represent the position of data in the past for only one second from the position of the oldest data which is represented by the audio reading pointer, if, at the request of the special playback in the reverse direction, the data required for initiating the special playback is the data in the past for one second which is stored in the Buffer 215A, the special playback can be immediately initiated without re-reading data from the disc 101 as described above.

Even in the case of updating the data beginning pointer so as to represent the position of data in the past for one second from the position of the oldest data which is represented by the audio reading pointer, it is likely that the data required for initiating the special playback is not stored in the buffer 215A. In this case, the data required for initiating the special playback is re-read from the disc 101.

Next, details of reading of each of the video stream, audio stream, and subtitle stream from the buffer 215A are described.

As described in step S127 in FIG. 30, when playback of the clip stream file is initiated, in the buffer control module 215, the data beginning pointer, the data writing pointer, the video reading pointer, the audio reading pointer, and the subtitle reading pointer are all initialized so as to represent the same position in the buffer 215A.

When a program stream (MPEG2-System Program Stream), stored in the clip stream file, is read from the disc 101, and is supplied to the buffer control module 215, in the buffer control module 215, the program stream is stored at the position in the buffer 215A which is represented by the data writing pointer, and the data writing pointer is updated clockwise.

Furthermore, in the buffer control module 215 (FIG. 3, the video reading function unit 233 performs a syntax analysis of the program stream stored in the buffer 215A. In response to a request from the video decoder control module 216, it extracts (separates) and reads a video stream (video access unit) from the program stream stored in the buffer 215A, and supplies the video stream to the video decoder control module 216.

Similarly, also the audio reading function unit 234 performs a syntax analysis of the program stream stored in the buffer 215A. In response to a request from the audio decoder control module 217, it extracts and reads an audio stream (audio access unit) from the program stream stored in the buffer 215A, and supplies the audio stream to the audio decoder control module 217. Also the subtitle reading function unit 235 performs a syntax analysis of the program stream stored in the buffer 215A. In response to a request from the subtitle decoder control module 218, it extracts and reads a subtitle stream (subtitle access unit) from the program stream stored in the buffer 215A, and supplies the subtitle stream to the subtitle decoder control module 218.

"Reading of Video Stream"

Next, details of processing for reading the video stream from the buffer 215A by the video reading function unit 233 (FIG. 3) are described with reference to the flowchart in FIG. 36.

In step S211, at first, the video reading function unit 233 searches for and finds the PES_packet( ) of the private_stream_2 in the program stream stored in the buffer 215A. In other words, as described in FIG. 20, the stream_id of the PES_packet( ) in the private_stream_2 is 10111101B (=1xBF). Accordingly, the video reading function unit 233 searches for and finds a PES_packet( ) having a stream_id of 10111111B.

Here, for example, assuming that, as described above, elementary streams multiplexed in the program stream stored in clip stream file "00001.PS" are to be played back, when the program stream is read from the disc 101 and is stored in the buffer 215A, based on the information of the decode startable point described in the EP_map( ) (FIG. 27) in clip stream file "00001.PS" in step S122 in FIG. 30, sector 305 is determined as a playback start position, and, in addition, in step S128 in FIG. 30, sector 305 of the playback start position is designated and the operating system 201 is requested to read the program stream stored in clip stream file "00001.PS".

In addition, regarding the video stream, the information of the decode startable point described in the EP_map( ) represents the position of the PES_packet( ) in the private_stream_2.

Accordingly, just after the program stream stored in clip stream file "00001.PS" is stored in the buffer 215A after being read from the disc 101, the PES_packet( ) in the private_stream_2 is stored at a position in the buffer 215A which is represented by the data beginning pointer or the video reading pointer.

Proceeding to step S212 when finding the PES_packet( ) in the private_stream_2 in step S211, the video reading function unit 233 extracts the video_stream_id described in the private_stream2_PES_payload( ) (FIG. 23), which is the PES_packet_data_byte of the PES_packet( ) in the private_stream_2, and determines whether the video_stream_id coincides with the stream_id of the video stream to be played back which is stored in the stream_id register 242 (FIG. 3) in step S127 in FIG. 30.

If, in step S212, it is determined that the video_stream_id described in the private_stream2_PES_payload( ) does not coincide with the stream_id stored in the stream_id register 242, that is, if the PES_packet( ) in the private_stream_2 found in last step S211 is not one located at the decode start point in the video stream to be played back, the process returns to step S211, and searches for a PES_packet( ) in another private_stream_2 in the program stream stored in the buffer 215A. Subsequently, similar processing is repeatedly performed.

Alternatively, if, in step S212, it is determined that the video_stream_id described in the private_stream2_PES_payload( ) coincides with the stream_id stored in the stream_id register 242, that is, if the PES_packet( ) in the private_stream_2 found in last step S211 is one located at the decode start position in the video stream to be played back, the video reading function unit 233 proceeds to step S213, reads, from the buffer 215A, the au_information( ) described in the private_stream2_PES_payload( ) of the PES_packet( ) in the private_stream_2, and stores the au_information( ) in the buffer 215A before proceeding to step S214.

In step S214, the video reading function unit 233 updates the video reading pointer stored in the video reading pointer storing section 231 by the size of the PES_packet( ) (the PES_packet( ) in the private_stream_2 in which the video_stream_id (FIG. 23) coincides with the stream_id stored in the stream_id register 242 (FIG. 3)) in the private_stream_2 found in last step S211.

In other words, in the clip stream file, following the PES_packet( ) in the private_stream_2, the video stream (PES_packet( )) having a stream_id which coincides with its video_stream_id is located. Thus, in step S214, the video reading pointer is updated so as to represent the position of the actual decode startable point in the video stream.

After that, proceeding from step S215 to S215, the video reading function unit 233 determines whether data has been requested by the video decoder control module 216. If it is determined that the data has not been requested, the process returns to step S215 and repeatedly performs similar processing.

Alternatively, if, in step S215, it is determined that the data has been requested by the video decoder control module 216, the process proceeds to step S216. While performing a syntax analysis of the program stream from the position represented by the video reading pointer, the video reading function unit 233 reads, from the buffer 215A, data having the number of bytes described in the AU_length of the au_information( )

stored in the an_information( ) register 243, that is, in one video access unit, supplies the data to the video decoder control module 216, and updates the video reading pointer by the size of the one video access unit read from the buffer 215A.

In other words, as described in FIG. 24, in the au_information( ), the number_of_access_units is described which represents the number of video access units (pictures) included from the PES_packet( ) in the private_stream_2 including the au_information( ) to the PES_packet( ) in the next private_stream_2.

In addition, as described in FIG. 24, in the au_information( ), the pic_struct_copy, the au_ref_flag, and the AU_length, which are information concerning each of as many video access units as the number in the number_of_access_units, are described.

As described in FIG. 24, each of the AU_length items described in as many au_information( ) items as the number in the number_of_access_units represents the size of each of as many video access units as the number in the number_of_access_units which are included from the PES_packet( ) in the private_stream_2 including the au_information( ) to the PES_packet( ) in the next private_stream_2. Thus, by using the AU_length, the video reading function unit 233 can perform access unit clipping without performing a video stream syntax analysis.

In other words, conventionally, in the case of clipping an access unit in MPEG2-Video or MPEG4-AVC, a syntax analysis of a video stream needs to be performed after knowing syntax of the video stream. However, since the program stream stored in the clip stream file recorded on the disc 101 includes, immediately prior to each of one or more decode startable points in a video stream in a video access unit, the PES_packet( ) in the private_stream_2 in which the AU_length representing the size of the video access unit is described, the video reading function unit 233 performs, based on the AU_length described in the PES_packet( ) in the private_stream_2, reading video access units (unit video stream) from the buffer 215A without performing a video stream syntax analysis, and supplying the units to the video decoder control module 216.

When, in step S216, the video reading function unit 233 supplies the video decoder control module 216 with the video access units, the video reading function unit 233 supplies, as information concerning the video access unit, to the video decoder control module 216, also the pic_struct_copy, au_ref_flag, and AU_length described in the au_information( ), and the time stamps (PTS, DTS) added to the video access unit.

After, in step S216, one video access unit is supplied to the video decoder control module 216 after being read from the buffer 215A, the process proceeds to step S217, and the video reading function unit 233 determines whether to have as many processed access units as the number represented by the number_of_access_units of the au_information( ) stored in the an_information( ) register 243.

If, in step S217, it is determined that as many access units as the number represented by the number_of_access_units have not been processed yet, that is, if as many access units as the number represented by the number_of_access_units have not been supplied to the video decoder control module 216 after being read from the buffer 215A, the process returns to step S215 and similar processing is subsequently repeated.

Alternatively, if, in step S217, it is determined that as many access units as the number represented by the number_of_access_units have been processed, that is, if as many access units as the number represented by the number_of_access_units have been supplied to the video decoder control module 216 after being read from the buffer 215A, the process returns to step S211 and searches for the PES_packet( ) in the next private_stream_2. Subsequently, similar processing is repeated.

"Reading of Audio Stream"

Figure 37:
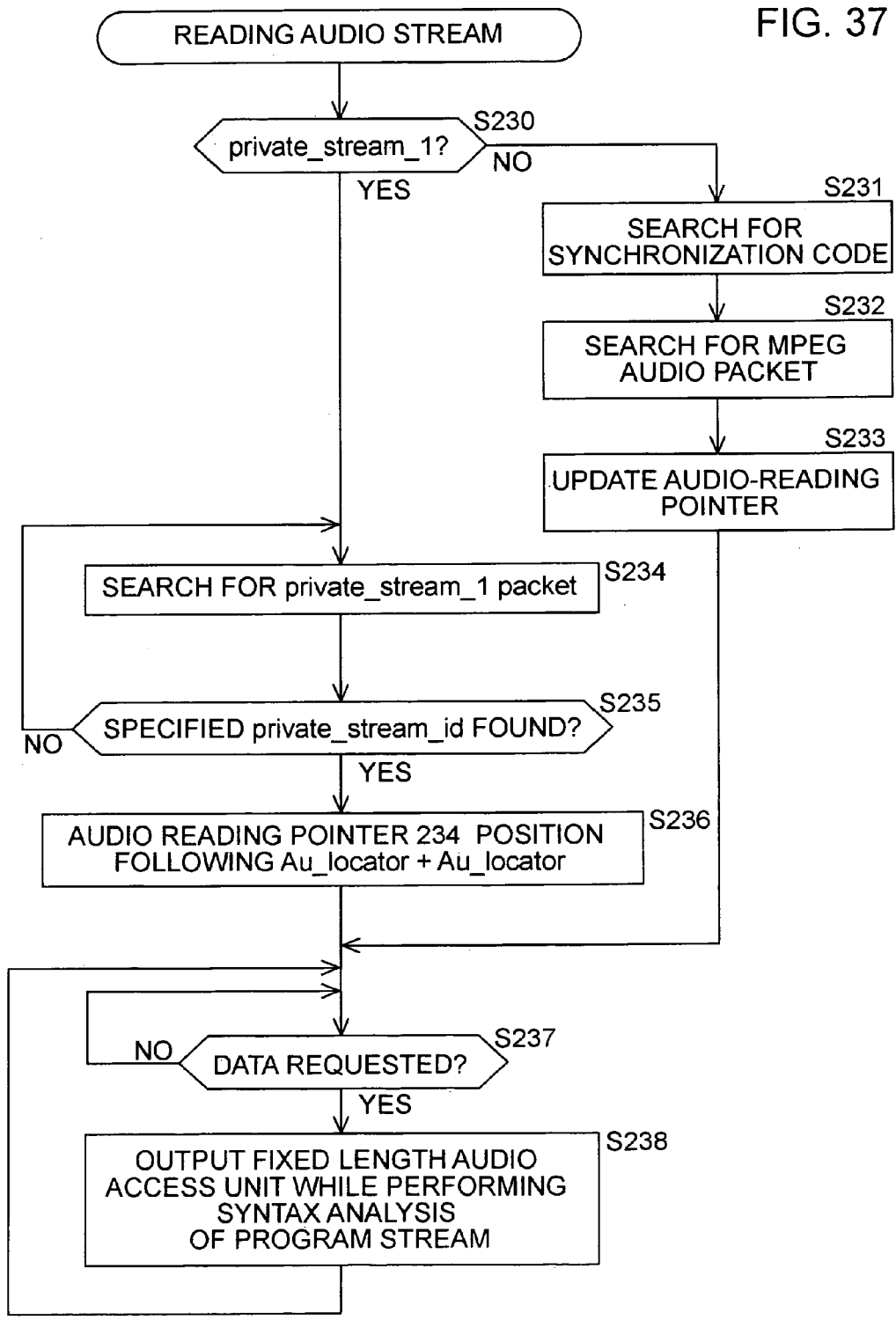
FIG. 37 is a flowchart illustrating an audio stream reading process.

Next, details of a process of the audio reading function unit 234 (FIG. 3) that reads an audio stream from the buffer 215A are described with reference to the flowchart in FIG. 37.

At first, in step S230, the audio reading function unit 234 determines whether the stream_id of the audio stream to be played back which is stored in the stream_id register 252 (FIG. 3) represents the PES_packet( ) in the private_stream_1.

If, in step S230, it is determined that the stream_id stored in the stream_id register 252 does not represent the PES_packet( ) in the private_stream_1, that is, if, as described in FIG. 20, the stream_id stored in the stream_id register 252 is 110xxxxxB that is assigned to an audio stream coded in accordance with the MPEG standard, the audio reading function unit 234 proceeds to step S231 and searches the program stream stored in the buffer 215A for a synchronization code which represents an audio frame beginning and which is defined in MPEG Audio. Since the position of the synchronization code is the audio frame beginning, the audio reading function unit 234 updates the audio reading pointer so as to represent the position of the audio frame beginning, and proceeds from step S231 to S232. In step S232, the audio reading function unit 234 searches for and finds, from the position represented by the audio reading pointer, a PES_packet( ), in the program stream stored in the buffer 215A, coinciding with the stream_id stored in the stream_id register 252, and proceeds to step S233.

In step S233, the audio reading function unit 234 updates the audio reading pointer stored in the audio reading pointer storing section 251 so as to represent the beginning of the PES_packet_data_byte (FIGS. 16 to 18) of the PES_packet( ) found in last step S232, and proceeds to step S237.

In step S237, the audio reading function unit 234 determines whether data has been requested by the audio decoder control module 217. If it has negatively determined, the process returns to step S237 and similar processing is repeated.

Alternatively, if, in step S237, it is determined that the data has been requested by the audio decoder control module 217, the process proceeds to step S238. While performing a syntax analysis of the program stream from the position represented by the audio reading pointer, the audio reading function unit 234 reads one audio access unit having a known fixed length from the buffer 215A, and supplies the audio access unit to the audio decoder control module 217 together with time stamps (PTS, DTS) added to the audio access unit.

The audio reading function unit 234 updates the audio reading pointer by the size of the one audio access unit read from the buffer 215A, and returns to step S237. Subsequently, similar processing is repeated.

Alternatively, if, in step S230, it is determined that the stream_id stored in the stream_id register 252 represents the PES_packet( ) in the private_stream_1, that is, if the stream_id stored in the stream_id register 252 is 10111101101B (=0xBD), and represents the PES_packet( ) in the private_stream_1, as described in FIG. 20, the process proceeds to step S234. The audio reading function unit 234 searches for and finds the PES_packet( ) in the private_stream_1 in the program stream stored in the buffer 215A. In other words, the audio reading function unit 234 searches for and finds a PES_packet( ) having a stream_id of 10111101B.

After finding the PES_packet( ) in the private_stream_1 in step S234, the audio reading function unit 234 proceeds to step S235. The audio reading function unit 234 extracts a private_stream_id described in the private_stream1_PES_payload( ) (FIG. 21) which is the PES_packet_data_byte of the PES_packet( ) in the private_stream_1, and determines whether the private_stream_id coincides with the private_stream_id of the audio stream to be played back which is stored in the private_stream_id register 253 (FIG. 3).

If, in step S235, it is determined that the private_stream_id described in the private_stream1_PES_payload( ) does not coincide with the private_stream_id stored in the private_stream_id register 253, that is, if the PES_packet( ) in the private_stream_1 found in last step S234 is not an audio stream to be played back, the process returns to step S234 and searches for the PES_packet( ) in another private_stream_1 in the program stream stored in the buffer 215A. Subsequently, similar processing is repeated.

Alternatively, if, in step S235, it is determined that the private_stream_id described in the private_stream1_PES_payload( ) coincides with the private_stream_id stored in the private_stream_id register 253, that is, if the PES_packet( ) in the private_stream_1 found in last step S234 is the audio stream to be played back, the process proceeds to step S236, and the audio reading function unit 234 performs reading, from the buffer 215A, the AU_locator described in the private_stream1_PES_payload( ) (FIG. 21) in the private_stream_1, and finding the beginning position of the audio access unit by adding the position following the AU_locator and a value represented by the AU_locator.

In other words, as described in FIG. 21, by using, as a reference, the position following the AU_locator, the AU_locator represents the beginning position of the audio access unit (or subtitle access unit) stored in the private_stream1_PES_payload( ). Thus, by adding, to the position following the AU_locator, the value represented by the AU_locator, the (absolute) beginning position of the audio access unit can be found.

Furthermore, in step S236, the audio reading function unit 234 updates the audio reading pointer stored in the audio reading pointer storing section 251 so as to represent the beginning position of the audio access unit found as described above, and proceeds to step S237.

In step S237, the audio reading function unit 234 determines whether data has been requested by the audio decoder control module 217. If it has negatively determined, the process returns to step S237 and similar processing is repeated.

Alternatively, if, in step S237, it is determined that the data has been requested by the audio decoder control module 217, the process proceeds to step S238. While performing a syntax analysis of the program stream from the position in the buffer 215A which is represented by the audio reading pointer, the audio reading function unit 234 reads one audio access unit having a known fixed length from the buffer 215A, and supplies the unit to the audio decoder control module 217 together with a time stamp added to the audio access unit.

The audio reading function unit 234 updates the audio reading pointer by the size of the one audio access unit read from the buffer 215A. The process returns to step S237 and similar processing is subsequently repeated.

"Reading of Subtitle Stream"

Figure 38:
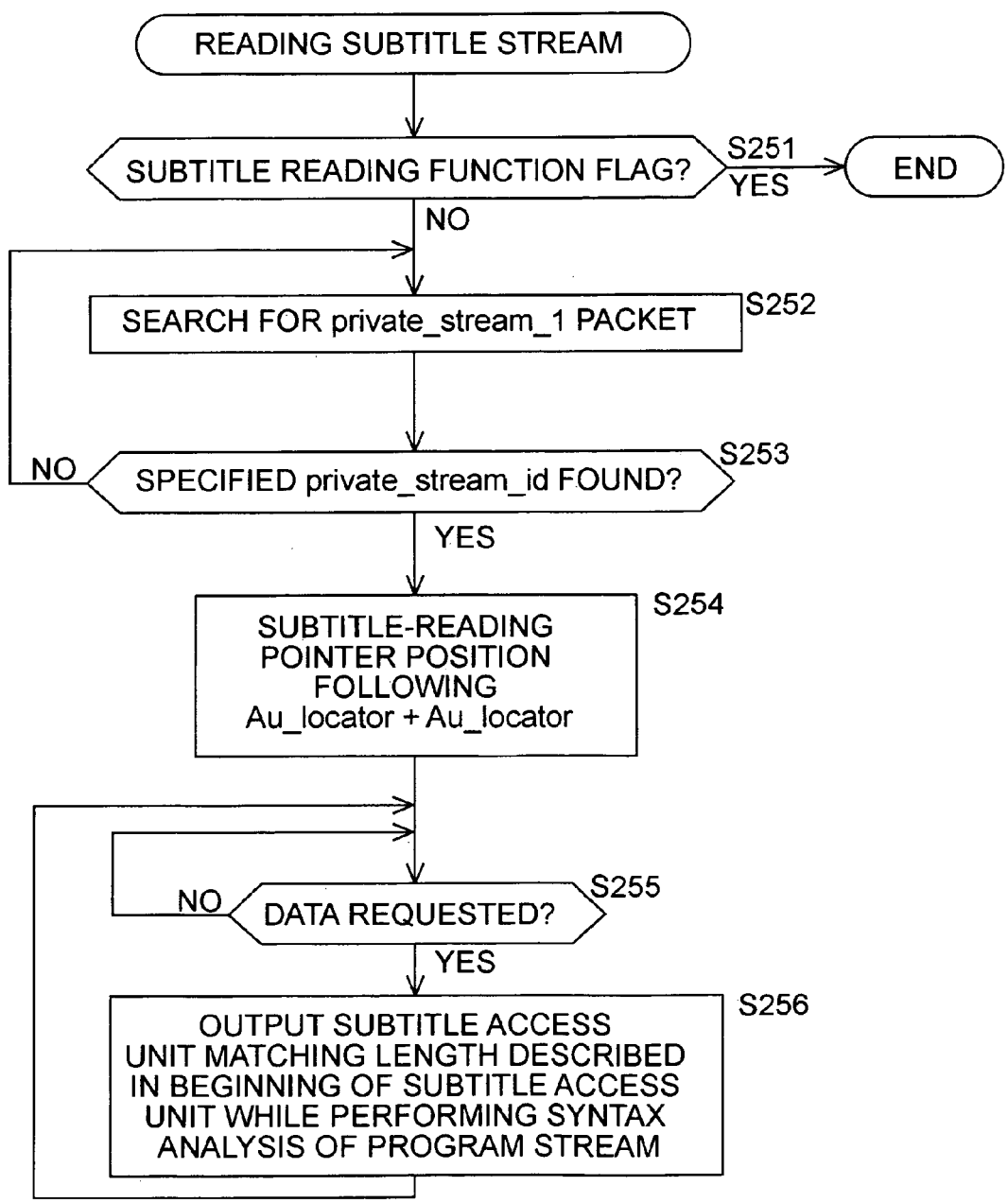
FIG. 38 is a flowchart illustrating a subtitle stream reading process.

Next, details of a process of the subtitle reading function unit 235 (FIG. 3) that reads the subtitle stream from the buffer 215A are described with reference to the flowchart in FIG. 38.

At first, in step S251, the subtitle reading function unit 235 identifies the subtitle reading function flag stored in the subtitle reading function section 261 in step S127 in FIG. 3. If, in step S251, it is determined that the still image file has 0, that is, for example, if no subtitle stream is included in the clip stream file in which the elementary streams to be played back are multiplexed, and 0 is set in the subtitle reading function section 261 in step S127 in FIG. 30, the subtitle reading function unit 235 does not particularly perform processing.

Alternatively, if, in step S251, it is determined that the subtitle reading function flag has 1, that is, for example, if, the subtitle stream is included in the clip stream file in which the elementary streams to be played back are multiplexed, and one is set in the subtitle reading function section 261 in step S127 in FIG. 30, the subtitle reading function unit 235 proceeds to step S252, and searches the program stream stored in the buffer 215A for a PES_packet( ) which coincides with the stream_id in the subtitle stream to be played back which is stored in the stream_id register 263 (FIG. 3).

As described in step S127 in FIG. 30, the stream_id of the subtitle stream to be played back is stored in the stream_id register 263 (FIG. 3). The stream_id of the subtitle stream is 10111101B (=0xBD) representing the PES_packet( ) in the private_stream_1, as described in FIG. 20.

Therefore, in step S252, the PES_packet( ) in the private_stream_1 in the program stream stored in the buffer 215A is searched for.

When finding the PES_packet( ) in the private_stream_1 after searching for the PES_packet( ) in the private_stream_1 in step S252, the subtitle reading function unit 235 proceeds to step S253, extracts a private_stream_id described in the private_stream1_PES_payload( ) (FIG. 21) that is the PES_packet_data_byte of the PES_packet( ) in the private_stream_1, and determines whether the private_stream_id coincides with the private_stream_id in the subtitle stream to be played back which is stored in the private_stream_id register 264 (FIG. 3) in step S127 in FIG. 30.

If, in step S253, it is determined that the private_stream_id described in the private_stream1_PES_payload( ) does not coincide with the private_stream_id stored in the private_stream_id register 264, that is, if the PES_packet( ) in the private_stream_1 which is found in last step S252 is not a subtitle stream to be played back, the process returns to step S252 and searches for the PES_packet( ) in another private_stream_1 in the program stream stored in the buffer 215A. Subsequently, similar processing is repeated.

Alternatively, if, in step S253, it is determined that the private_stream_id described in the private_stream1_PES_payloads coincides with the private_stream_id stored in the private_stream_id register 264, that is, if the PES_packet( ) in the private_stream_1 which is found in last step S252 is the subtitle stream to be played back, the subtitle reading function unit 235 proceeds to step S254, and performs reading, from the buffer 215A, the AU_locator described in the private_stream1_PES_payload( ) (FIG. 21) of the PES_packet( ) in the private_stream_1, and finding the beginning position of the subtitle access unit by adding the position following the AU_locator and the value represented by the AU_locator.

In other words, as described in FIG. 21, by using, as a reference, the position following the AU_locator, the AU_locator represents the beginning position of the subtitle access unit (or audio access unit) stored in the private_stream1_PES_payload( ). Thus, by adding, to the position following the AU_locator, the value represented by the AU_locator, the (absolute) beginning position of the subtitle access unit can be found.

Furthermore, in step S254, the subtitle reading function unit 235 updates the subtitle reading pointer stored in the subtitle reading pointer storing section 262 so as to represent the beginning position of the subtitle access unit found as described above, and proceeds to step S255.

In step S255, the subtitle reading function unit 235 determines whether data has been requested by the subtitle decoder control module 218. If it has negatively determined, the process returns to step S255 and similar processing is repeated.

Alternatively, if, in step S255, it is determined that the data has been requested by the subtitle decoder control module 218, the process proceeds to step S256. While performing a syntax analysis of the program stream from the position in the buffer 215A which is represented by the subtitle reading pointer, the subtitle reading function unit 235 reads, from the buffer 215A, one subtitle access unit by the size described in the beginning of the subtitle access unit, and supplies the unit to the subtitle decoder control module 218 together with a time stamp added to the subtitle access unit. In other words, as described in FIG. 2, at the beginning of the subtitle access unit, the size of the subtitle access unit is described. Accordingly, the subtitle reading function unit 235 reads the data by the size from the position in the buffer 215A which is represented by the subtitle reading pointer, and supplies the subtitle access unit as the read data to the subtitle decoder control module 218 together with time stamps added to the subtitle access unit.

In addition, the subtitle reading function unit 235 updates the subtitle reading pointer by the size of the one subtitle access unit read from the buffer 215A, and returns to step S255. Subsequently, similar processing is repeated.

"Re-Synchronization Process"

Next, synchronization control between video data and audio data by the decoding control module 214 in FIG. 2 is described.

As described in step S130 in FIG. 30, the decoding control module 214 orders the video decoder control module 216, the audio decoder control module 217, and the subtitle decoder control module 218 to initiate decoding by shifting timing, if necessary for establishing synchronization. For example, depending on the progress of subsequent decoding by the video decoder 116 and the audio decoder 117, output of video data, and output of the audio data as output data to be output in synchronization with the video data may be shifted from each other.

Accordingly, the decoding control module 214 performs the re-synchronization process for correcting the shift occurring between the output of the video data, and the output of the audio data as output data to be output in synchronization with the video data, and outputting the video data and the audio data in synchronization with each other.

Figure 39:
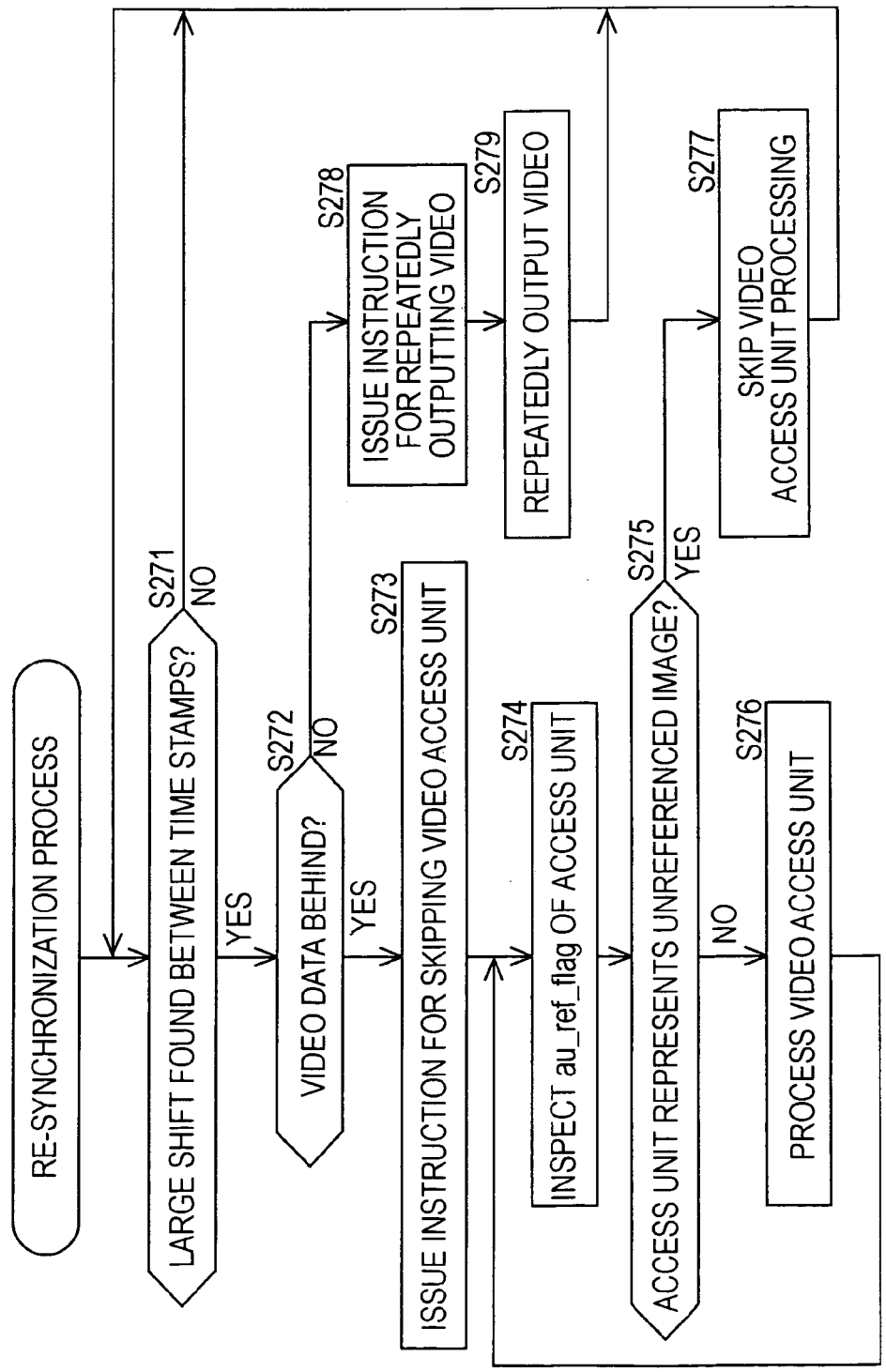
FIG. 39 is a flowchart illustrating a re-synchronization process.

The re-synchronization process is described with reference to the flowchart in FIG. 39.

In the re-synchronization process, at first, in step S271, the decoding control module 214 determines whether a large shift is found between the time stamp of the video access unit from the video decoder control module 216 and the time stamp of the audio access unit from the audio decoder control module 217.

In other words, as described in step S129 in FIG. 30, whenever the video decoder control module 216 obtains a video access unit from the buffer control module 215, it supplies the time stamp of the video access unit to the decoding control module 214. Similarly, whenever the audio decoder control module 217 obtains an audio access unit from the buffer control module 215, it supplies the time stamp of the audio access unit to the decoding control module 214.

In step S271, by comparing time stamps supplied with the same timing (within a certain time that can be regarded as the same timing) from the video decoder control module 216 and the audio decoder control module 217, the decoding control module 214 determines whether or not there is a large shift between these time stamps.

If, in step S271, it is determined that there is not the large shift between the time stamp of the video access unit from the video decoder control module 216 and the time stamp of the audio access unit from the audio decoder control module 217, that is, if the shift between the time stamp of the video access unit and the time stamp of the audio access unit is, for example, two video frames (approximately 66 milliseconds) or within a range that can be regarded as having predetermined synchronization, the process returns to step S271, and determination (monitoring) of two time stamps is continuously performed.

Alternatively, if, in step S271, it is determined that there is the large shift between the time stamp of the video access unit from the video decoder control module 216 and the time stamp of the audio access unit from the audio decoder control module 217, that is, if the shift between the time stamp of the video access unit and the time stamp of the audio access unit is out of the range that can be regarded as having predetermined synchronization, the process proceeds to step S272. The decoding control module 214 determines which is behind between the output of the video data and the output of the audio data by comparing the time stamp of the video access unit from the video decoder control module 216 and the time stamp of the audio access unit from the audio decoder control module 217.

If, in step S272, it is determined that the output of the video data is behind the output of the audio data, the process proceeds to step S273. In order to advance processing on the video access unit by one video access unit, the decoding control module 214 instructs the video decoder control module 216 not to perform decoding and output (display) of the video access unit, that is, the decoding control module 214 outputs an instruction to skip processing on the video access unit, and proceeds to step S274.

In step S274, the video decoder control module 216 receives the skip instruction from the decoding control module 214, and inspects the au_ref_flag (FIG. 24) supplied together with the video access unit from the buffer control module 215 in response to the skip instruction.

In other words, in the au_information( ) (FIG. 24) located in the private_stream2_PES_payload( ) of the PES_packet( ) in the private_stream_2, the au_ref_flag as information concerning the access unit is included. As described in step S129 in FIG. 30 and in step S216 in FIG. 36, the buffer control module 215 supplies the au_ref_flag of the video access unit to the video decoder control module 216 together with the video access unit.

In step S274, the au_ref_flag of the access unit supplied in the above manner is inspected.

Proceeding from step S274 to S275, based on the result of inspecting the au_ref_flag of the video access unit supplied from the buffer control module 215, the video decoder control module 216 determines whether the video access unit is an unreferenced image that is not referred to when another picture is decoded.

Here, as described in FIG. 24, the au_ref_flag of the video access unit indicates whether the access unit is a reference image. If the access unit is the reference image, it is set to 1. If the access unit is not the reference image, it is set to 0.

If, in step S275, it is determined that the video access unit supplied from the buffer control module 215 is not (the video access unit of) the unreferenced image, that is, if the video access unit supplied from the buffer control module 215 is the reference image, the process proceeds to step S276. The video decoder control module 216 controls the video decoder 116 to process the video access unit as normal, and waits for the next video access unit to be supplied from the buffer control module 215 before returning to step S274.

Alternatively, if, in step S275, it is determined that the video access unit supplied from the buffer control module 215 is the unreferenced image, the process proceeds to step S277. The video decoder control module 216 skips processing of the video decoder 116 on the video access unit, and waits for the next video access unit to be supplied from the buffer control module 215 before returning to step S271.

In such a manner, the processing on the video access unit is skipped, whereby the processing on the video access unit is advanced (processing time is shortened) by approximately one video access unit. This results in accelerating the output of the video data behind the output of the audio data.

Alternatively, if, in step S272, it is determined that the output of the video data is not behind the output of the audio data, that is, if the output of the audio data is behind the output of the video data, the process proceeds to step S278. In order for the processing on the video access unit to be kept waiting, the decoding control module 214 outputs, to the video decoder control module 216, a repeated output instruction to repeatedly output video data corresponding to a video access unit being presently decoded, and proceeds to step S279.

In step S279, the video decoder control module 216 receives the repeated output instruction from the decoding control module 214, repeatedly outputs, to the graphics processing module 219, the video data corresponding to the video access unit being decoded by the video decoder 116 in response to the repeated output instruction, and waits for the next video access unit to be supplied from the buffer control module 215 before returning to step S271.

As described above, the decoding control module 214 determines whether the output of the video data is behind the output of the audio data. If the output of the video data is behind the output of the audio data, the decoding control module 214 instructs the video decoder control module 216 to skip processing on one access unit. In addition, based on the au_ref_flag of the access unit instructed to be skipped, the video decoder control module 216 determines which of a reference image and an unreferenced image the access unit is. When the access unit is the unreferenced image, the video decoder control module 216 controls the video decoder 116 to skip processing the access unit instructed to be skipped. Therefore, the synchronization between the output of the video data and the output of the audio data can be easily established.

In other words, when an access unit whose processing is to be skipped is a reference image, it is required that video data corresponding to the access unit be decoded so as to be referred to when another access unit to be subsequently decoded is decoded. Therefore, in synchronization control for establishing synchronization between the output of the video data and the output of the audio data, skipping of processing on the access unit of a reference image makes it impossible to decode another access unit which refers to the reference image, so that, in display of the video data, the synchronization control appears as noise.

Accordingly, regarding skipping of processing, it is preferable to use an access unit that is not a reference image, that is, an access unit of an unreferenced image.

In addition, regarding elementary streams of the related art, in order to search for an access unit of an unreferenced image, it is required that a syntax analysis on the elementary streams be performed. Elementary streams, obtained by coding in accordance with MPEG4-AVC or the like, have very complex syntax. Thus, considerable cost is required for a syntax analysis.

Unlike that, in the program stream stored in the clip stream file recorded on the disc 101, separately from the PES_packet( ) (FIGS. 16 to 18) in which the video access unit is located in the PES_packet_data_byte, PES_packet( ) items in the private_stream_2 in which the private_stream2_PES_payload( ) (FIG. 23) obtained by extending the PES_packet_data_byte is located are multiplexed, and, in the au_information( ) (FIG. 24) of the private_stream2_PES_payload( ), for each video access unit, the au_ref_flag is described which indicates which of a reference image and an unreferenced image the video access unit is. In addition, the au_ref_flag is supplied from the buffer control module 215 to the video decoder control module 216 together with a corresponding video access unit. Therefore, by inspecting the au_ref_flag of the video access unit supplied together with the video access unit, the video decoder control module 216 can recognize that the video access unit is a reference image or an unreferenced image almost without requiring any cost.

"Mark Process"

Figure 40:
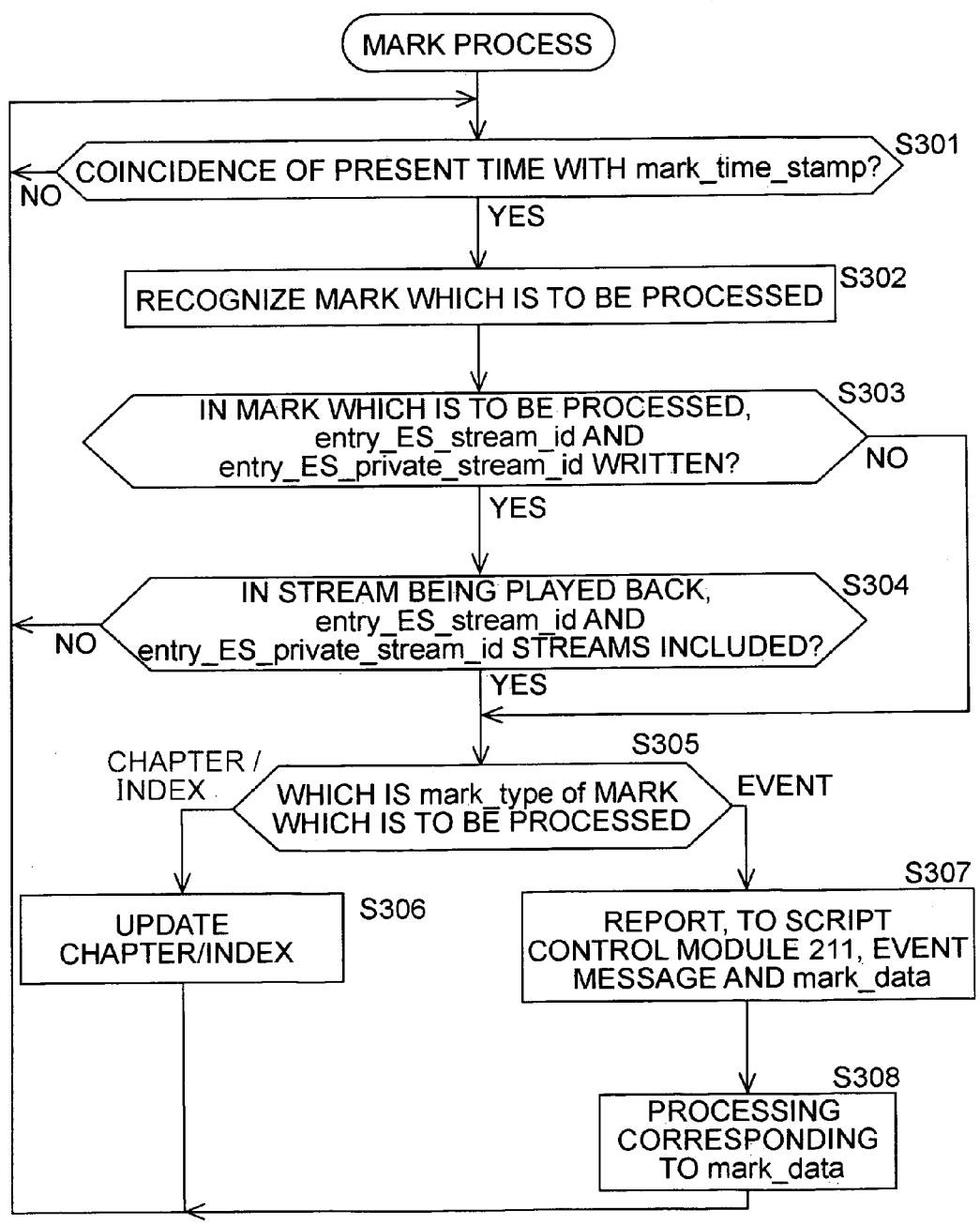
FIG. 40 is a flowchart illustrating a mark process.

Next, a mark process that is performed based on the Mark( ) described in PlayListMark( ) (FIG. 7) is described with reference to the flowchart in FIG. 40.

The decoding control module 214 constantly confirms the present time measured by the built-in timer unit 214A. In step S301, it determines whether the present time coincides with the mark_time_stamp of any Mark( ) described in PlayListMark( ) (FIG. 7).

In other words, as described in step S124 in FIG. 30, when playing back the first PlayItem #0 in the first PlayList #0 shown in FIG. 25, the player control module 212 recognizes that, among seven Mark( ) items included in the PlayListMark( ) shown on the upper side in FIG. 28, four Mark( ) items from the first to fourth ones belong to the first PlayItem #0, and the player control module 212 passes, to the decoding control module 214, {180,090}, {5,580,090}, {10,980,090}, and {16,380,090}, which are the mark_time_stamp of the four Mark( ) items, together with the fact that the attribute represented by the mark_time_stamp is "Mark Process".

In step S301, the decoding control module 214 determines whether the present time coincides with any of the times (mark_time_stamp) of the attribute of "Mark Process" which are supplied as described above from the player control module 212.

If, in step S301, it is determined that the present time does not coincides with any of the times of the attribute of "Mark Process", the process returns to step S301 and similar processing is repeated.

Alternatively, if, in step S301, it is determined that the present time coincides with any of the times of the attribute of "Mark Process", the decoding control module 214 supplies the player control module 212 with a message indicating that the present time is one of the times of the attribute of "Mark Process" and the time of the attribute of "Mark Process", which coincides with the present time, and proceeds to step S302.

In step S302, from the decoding control module 214, the player control module 212 receives the message indicating that the present time is one of the times of the attribute of "Mark Process" and the time of the attribute of "Mark Process", which coincides with the present time, and recognizes that Mark( ), in which the mark_time_stamp coincides with the present time, is Mark( ) (hereinafter referred to as a processing object mark, if necessary) that is subject to the mark process.

In other words, the player control module 212 recognizes the PlayItem( ) in the PlayList( ) being presently played back. Accordingly, the player control module 212 recognizes the processing object mark by referring to the PlayListMark( ) (FIG. 7) in the "PLAYLIST.DAT" file (FIG. 5) based on the PlayItem( ) of the PlayList( ) and the time of the attribute of "Mark Process", which coincides with the present time.

Specifically, for example, if the first PlayItem #0 in the first PlayList #0 shown in FIG. 25 is being played back, the fact causes the player control module 212 to recognize that the mark time is the mark_time_stamp of one of four Mark( ) items from the first to fourth ones among the seven Mark( ) items included in the PlayListMark( ) shown on the upper side in FIG. 28.

In addition, assuming that the mark time supplied from the decoding control module 214 to the player control module 212 is, for example, 16,380,090, the player control module 212 recognizes that, among the four Mark( ) items from the first to fourth ones included in the PlayListMark( ) shown on the upper side in FIG. 28, the fourth Mark( ), which coincides with a mark time of 16,380,090, is a processing object mark.

Proceeding from step S302 to S303 after recognizing the processing object mark, as described, the player control module 212 determines whether, in the processing object mark, the entry_ES_stream_id and entry_ES_private_stream_id (FIG. 7) for specifying elementary streams are described.

If, in step S303, it is determined that, in the processing object mark, the entry_ES_stream_id and entry_ES_private_stream_id (FIG. 7) for specifying elementary streams are not described, that is, if the entry_ES_stream_id and entry_ES_private_stream_id are both 0x00, the process skips step S304 and proceeds to step S305, and processing matching the processing object mark is subsequently performed.

Alternatively, if, in step S303, it is determined that the entry_ES_stream_id and entry_ES_private_stream_id (FIG. 7) for specifying elementary streams are described in the processing object mark, the player control module 212 proceeds to step S304 and determines whether, in elementary streams being played back, an elementary stream specified by the entry_ES_stream_id, and, in addition, the entry_ES_private_stream_id, if necessary, are included.

If, in step S304, it is determined that, in the elementary streams being played back, the elementary stream specified by the entry_ES_stream_id and entry_ES_private_stream_id of the processing object mark is not included, the process proceeds to step S301. In other words, when the elementary stream specified by the entry_ES_stream_id and entry_ES_private_stream_id of the processing object mark is not played back, the processing object mark is ignored.

Alternatively, if, in step S304, it is determined that, in the elementary stream being played back, the elementary stream specified by the entry_ES_stream_id and entry_ES_private_stream_id of the processing object mark is included, that is, if the elementary stream specified by the entry_ES_stream_id and entry_ES_private_stream_id of the processing object mark is played back, the processing object mark is regarded as valid, and the process proceeds to step S305. Subsequently, processing matching the processing object mark is performed.

In other words, in step S305, the player control module 212 identifies the processing object mark by referring to the mark_ type (FIG. 7) of the processing object mark.

If, in step S305, it is determined that the processing object mark is a chapter mark or an index mark, that is, when the mark_type of the processing object mark is 'Chapter' or 'Index', the player control module 212 proceeds to step S306 and orders the graphics processing module 219 to update a displayed number of the chapter or index into a chapter or index number represented by the chapter mark or index mark which is the processing object mark. The process returns to step S301.

If, in step S305, it is determined that the processing object mark is an event mark, that is, when the mark_type of the processing object mark is "Event", the player control module 212 proceeds to step S307 and reports (supplies), to the script control module 211, an event message representing the occurrence of the event and the mark_data of the processing object mark. The process proceeds to step S308.

In step S308, the script control module 211 receives the event message and the mark_data from the player control module 212, performs, by using the event message as an interruption request, consecutive processing described beforehand in the "SCRIPT.DAT" file while using the mark_ data as an argument, and returns to step S301.

In other words, in the script control module 211, processing matching the mark_data is performed.

Specifically, for example, in the PlayListMark( ) in the PlayList #1 shown on the lower side in FIG. 28, the second Mark( ) (Mark #1) and the third Mark( ) (Mark #2) each have a mark_type of "Event". However, they differ in that their mark_data items are 1 (Mark #1) and 2 (Mark #2), respectively.

In each of the case of receiving an event message corresponding to the second Mark( ) and the case of receiving an event message corresponding to third Mark( ) , the script control module 211 performs processing in response to the event message by using the same event handler (interruption handling routine). In the event handler, by inspecting the mark_data, which is supplied together with the event message, the script control module 211 performs different processing for each mark_data.

Specifically, for example, when the mark_data is 1, the script control module 211 controls the graphics processing module 219 to display a first type of icon. In addition, for example, when the mark_data is 2, the script control module 211 controls the graphics processing module 219 to display a second type of icon.

The mark_data is not limited to 1 and 2. In addition, the processing corresponding to the mark_data is not limited to simple display of an icon, as described above.

In other words, for example, when the mark_data is a value in the range of 3 to 18, the script control module 211 controls the graphics processing module 219 to display the first type of icon at brightness corresponding to a value (numerical value of 1 to 16) obtained by subtracting 2 from the mark_data. In addition, for example, when the mark_data is a value in the range of 19 to 34, the script control module 211 controls the graphics processing module 219 to display the second type of icon at brightness corresponding to a value (numerical value of 1 to 16) obtained by subtracting 18 from the mark_data.

Moreover, for example, in a case in which a controller that is operated by the user is connected to the input interface 115 (FIG. 1) and the controller has a built-in vibrating motor in which an eccentric weight is mounted on the shaft of a DC (Direct Current) motor and which generates vibration when the DC motor is actuated, when the mark_data is a value in the range of 35 to 42, the vibrating motor can be actuated during an operating time in accordance with a value (numerical value of 1 to 8) obtained by subtracting 34 from the mark_data.

The mark_data is a numerical value, and the usage and algorithm thereof can be described by the script program that is executed by the script control module 211. Therefore, the mark_data is used by rules determined beforehand, and, in addition, it can be used by rules that are independently set by the manufacturer of the disc 101, a content provider that provides data which is recorded on the disc 101, or the like.

As described above, in the mark process, when the present time coincides with the time of the attribute of the "Mark Process", the processing object mark is recognized from a mark time, which is the time of the attribute of the "Mark Process". Furthermore, when, in the processing object mark, the entry_ES_stream_id and entry_ES_private_stream_id for specifying elementary streams are not described, processing matching the mark_type of the processing object mark. In addition, even if, in the processing object mark, the entry_ES_stream_id and entry_ES_private_stream_id for specifying elementary streams are described, if an elementary stream specified by the entry_ES_stream_id and entry_ES_private_stream_id is being played back, processing matching the mark_type is performed.

Therefore, for example, assuming that the second PlayList #1 shown in FIG. 25 is being played back, the following mark process is performed.

In other words, in the PlayListMark( ) in the second PlayList #1, as shown on the lower side in FIG. 28, the first Mark( ) (Mark #0), the second Mark( ) (Mark 41), and the third Mark( ) (Mark #2), whose mark_time_stamp items are respectively designated as 90,000, 27,090,000, and 27,540,000, are described.

Furthermore, since, in the PlayListMark( ) on the lower side in FIG. 28, 0xE0 and 0xE1 are respectively described in the entry_ES_stream_id items of the second Mark( ) and the third Mark( ), elementary streams respectively specified by 0xE0 and 0xE1 are associated with the second Mark() and the third Mark( ), respectively.

Here, as described in FIG. 25, in the second PlayList #1, only one PlayItem( ) (PlayItem #0) is described, and, according to the PlayItem #0, clip stream file "00003.PS" is played back. In clip stream file "00003.PS", as described concerning the clip information file "00003.CLP" in FIG. 26 which corresponds to the clip stream file "00003.PS", three elementary streams, that is, video stream, stream #0, specified by a stream_id of 0xE0, video stream, stream #1, specified by a stream_id of 0xE1, and audio stream, stream #2, specified by a stream_id of 0xBD and a private_stream_id of 0x00, are multiplexed.

Accordingly, video stream, stream #0, which has a stream_id of 0xE0 and which is multiplexed in clip stream file "00003.PS", is associated with the second Mark( ) in the PlayListMark( ) on the lower side in FIG. 28, and video stream, stream #1, which has a stream_id of 0xE1 and which is multiplexed in clip stream file "00003.PS", is associated with the third Mark( ).

When playback of PlayItem #0 in the second PlayList #1 is initiated, as described in step S124 in FIG. 30, the player control module 212 recognizes that the three Mark( ) items included in the PlayListMark( ) shown on the lower side in FIG. 28 belong to PlayItem #0 in PlayList #1, and passes, to the decoding control module 214, the mark_time_stamp items of {90,000}, {27,090,000}, and {27,540,000} of the three Mark( ) items together with the fact that the attribute of the times represented by them are "Mark Process".

In the mark process, while PlayItem #0 in PlayList #1 is being played back, the decoding control module 214 constantly confirms whether the present time measured by the timer unit 214A coincides with one of the times {90,000}, {27,090,000}, and {27,540,000}, whose attributes are "Mark Process" (step S301). When the present time coincides with one time whose attribute is "Mark Process", the decoding control module 214 supplies the player control module 212 with a mark time, which is a time having the attribute "Mark Process" and a message indicating that the present time is the time having the attribute "Mark Process".

In other words, for example, if the present time coincides with 27,090,000 among the times {90,000}, {27,090,000}, and {27,540,000}, which have the "Mark Process" attribute, the decoding control module 214 supplies the player control module 212 with mark time 27,090,000, which is a time having the "Mark Process" attribute, and a message indicating that the present time is the time having the "Mark Process" attribute.

The player control module 212 recognizes that PlayItem #0 in PlayList #1 is being presently played back. Accordingly, by comparing each of {90,000}, {27,090,000}, and {27,540,000}, which are the mark_time_stamp items of the three Mark( ) items belonging to PlayItem #0 among the Mark( ) items described in the PlayListMark( ) of PlayList #1 shown on the lower side in FIG. 28, and the mark time 27,090,000 from the decoding control module 214, the player control module 212 recognizes that Mark( ) in which the mark_time_stamp coincides with the mark time 27,090,000, that is, the second Mark( ) (Mark #1) described in PlayListMark( ) on the lower side in FIG. 28, is a processing object mark (step S302).

In the second Mark( ), described in the PlayListMark( ) on the lower side in FIG. 28, which is the processing object mark, 0xE0 is set as the entry_ES_stream_id. As described above, the entry_ES_stream_id of 0xE0 represents video stream, stream #0 (FIG. 26), which has a stream_id of 0xE0 and which is multiplexed in clip stream file "00003.PS". Accordingly, the player control module 212 determines whether, in the elementary stream being played back, the video stream, stream #0, is included (steps S303, S304).

In addition, if, in the elementary stream being played back, the video stream, stream #0, is not included, the processing object mark is ignored (step S304).

Alternatively, if, in the elementary stream being played back, the video stream, stream #0, is included, the processing object mark is regarded as valid, and processing matching the processing object mark is performed (steps S305 to S308).

In other words, in this case, the second Mark( ) described in the PlayListMark( ) on the lower side in FIG. 28 is an event mark since the mark_type is 'Event'. Accordingly, the player control module 212 supplies the script control module 211 with an event message representing the occurrence of the event and the mark_data of the processing object mark (steps S305, S307). By using, as an interruption request, the event message from the player control module 212, the script control module 211 performs consecutive processing described beforehand in the "SCRIPT.DAT" file while using, as an argument, the mark_data supplied together with the even message (step S308).

As described above, according to the mark process, it is determined whether or not the present time, which is a playback time of a clip stream file that is played back in accordance with the PlayList( ) (FIG. 5) including PlayListMark( ) (FIG. 7) having zero or more Mark( ) items including a mark_time_stamp representing one playback time on a time base of PlayList( ), a mark_type representing the type of Mark( ), and a mark_data which serves as an argument of an event mark, coincides with the mark_time_stamp. When the present time coincides with the mark_time_stamp, Mark( ) that has a mark_time_stamp equal to the mark time as the present time which coincides with the mark_time_stamp is recognized as a processing object mark. In addition, when the mark_type of the processing object mark represents a type of generating an event, that is, when the processing object mark is an event mark, the mark_data of the processing object mark and an event message are reported, and processing matching the mark_data is executed. Therefore, in accordance with a playback time of a clip stream file, processing matching the mark_data can be executed.

"Output Attribute Control Process"

Next, details of an output attribute control process, which is performed in step S126, etc., are described with reference to the flowchart in FIG. 41.

As described in step S126 in FIG. 30, at first, regarding one or more elementary streams to be played back, that is, each of one or more elementary streams determined in step S125 in FIG. 30 to be played back, the player control module 212 checks the number_of_DynamicInfo (FIG. 10) representing the number of DynamicInfo( ) items (FIG. 13) in which an output attribute is described.

When, regarding all the one or more elementary streams to be played back, the number_of_DynamicInfo has 0, the player control module 212 does not particularly perform processing.

Figure 41:
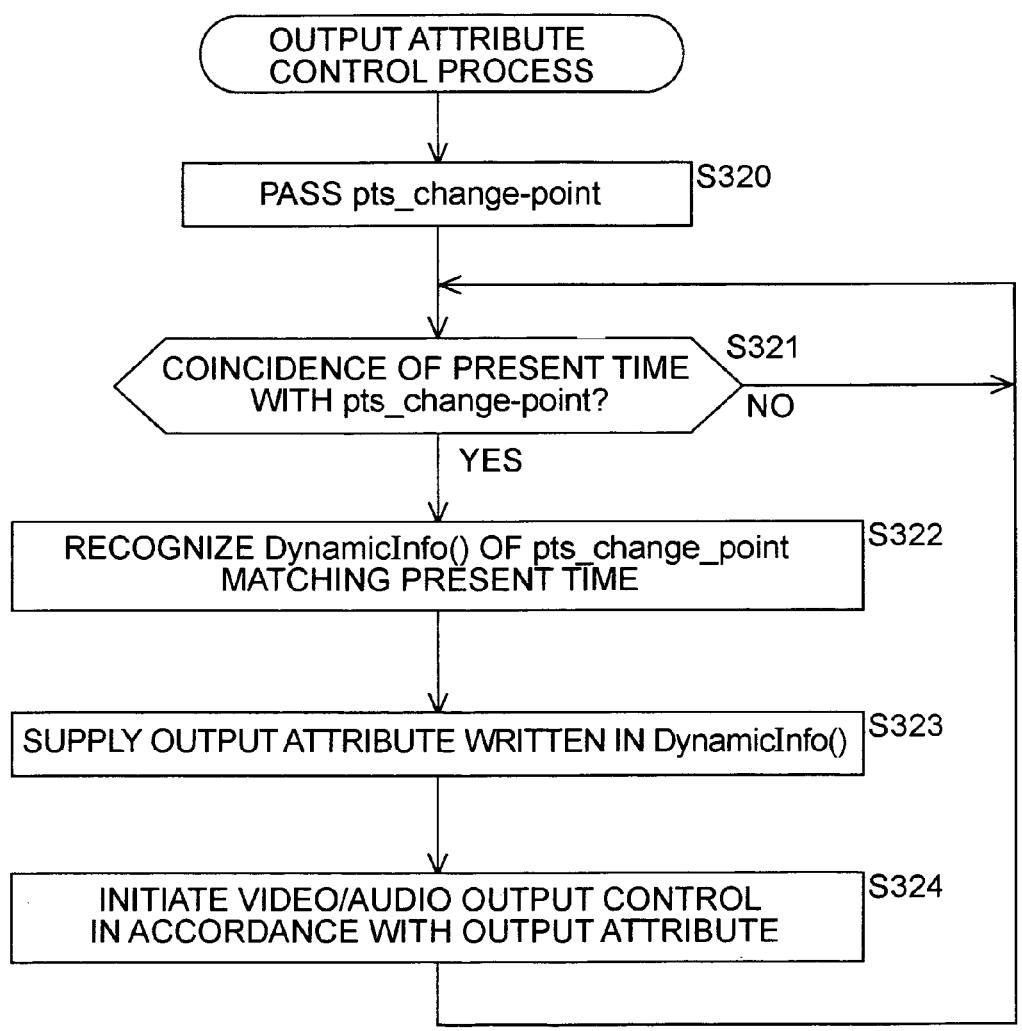
FIG. 41 is a flowchart illustrating an output attribute control process.

Alternatively, when, regarding the elementary streams to be played back, the number_of_DynamicInfo does not have 0, the player control module 212 performs an output attribute control process in accordance with the flowchart in FIG. 41.

Accordingly, in a case in which the three clip information files "00001.CLP", "00002.CLP", and "00003.CLP" recorded on the disc 101 are, for example, as shown in FIG. 26, when (the first item PlayItem #0 in the first list PlayList #0 for playing back) clip stream file "00001.PS" corresponding to clip information file "00001.CLP" is played back, in clip information file "00001.CLP" (FIG. 26), regarding all the four elementary streams, stream #0 to stream #3 multiplexed in clip stream file "00001.PS", the number_of DynamicInfo has 0, so that the output attribute control process is not performed.

Similarly, also in the case of playing back (the second item PlayItem #1 in the first list PlayList #0 for playing back) clip stream file "00002.PS" corresponding to clip information file "00002.CLP", in clip information file "00002.CLP" (FIG. 26), regarding all the four elementary streams stream #0 to stream #3 multiplexed in clip stream file "00002.PS", the number_of_DynamicInfo has 0, so that the output attribute control process is not performed.

In addition, in the case of playing back (PlayItem #0 in the second list PlayList #1 for playing back) clip stream file "00003.PS" corresponding to clip information file "00003.CLP", in clip information file "00003.CLP" (FIG. 26), among the three elementary streams stream #0 to stream #2 multiplexed in clip stream file "00003.PS", regarding video stream, stream #0, as the first elementary stream, and audio stream, stream #2, as the third elementary stream, their number_of_DynamicInfo items are respectively 2 and 3, so that the output attribute control process is performed.

In other words, in the output attribute control process, at first, in step S320, the player control module 212 passes, to the decoding control module 214, the pts_change_point described in clip information file Clip( ) corresponding to a clip stream file to be played back, together with the fact that the pts_change_point is a time having an attribute of "DynamicInfo( ) Process". The decoding control module 214 receives, from the player control module 212, the pts_change_ point as the time having an attribute of "DynamicInfo( ) Process", and proceeds to step S321.

In step S321, the decoding control module 214 determines whether the present time measured by the timer unit 214A coincides with the (one) pts_change_point as the time having the attribute of "DynamicInfo( ) Process". If it is determined that the present time does not coincide with the pts_change_point, the process returns to step S321.

Alternatively, if, in step S321, it is determined that the present time coincides with the (one) time having the attribute of "DynamicInfo( ) Process", the decoding control module 214 supplies the player control module 212 with a message indicating that the present time is the time having the attribute of "DynamicInfo( ) Process" and the time, having the attribute of "DynamicInfo( ) Process" coinciding with the present time, and proceeds to step S322.

In step S332, the player control module 212 receives, from the decoding control module 214, the message indicating that the present time is the time having the attribute of "DynamicInfo( ) Process" and the DynamicInfo time, and recognizes, as processing object DynamicInfo( ) which is subject to processing, DynamicInfo( ) which forms a set with the pts_change_point (FIG. 10) that coincides with the DynamicInfo time. The process proceeds to step S323.

In step S323, the player control module 212 supplies the graphics processing module 219 or the audio output module 221 with the output attribute described in the DynamicInfo( ) (FIG. 13), which is treated as the processing object DynamicInfo( ), and proceeds to step S234.

In step S324, in accordance with the output attribute supplied from the player control module 212 in last step S323, the graphics processing module 219 or the audio output module 221 initiates control of outputting video data or audio data, and returns to step S321.

This outputs the video data in accordance with, for example, an aspect ratio, which is described as the output attribute (display form). Alternatively, this outputs the audio data in accordance with, for example, a stereo or dual (bilingual) mode, which is described as the output attribute.

Next, details of the output attribute control process are further described with reference to FIG. 42.

In other words, FIG. 42 shows sets (FIG. 10) of the pts_change_point and DynamicInfo( ) items described in clip information file "00003.CLP".

Here, as described above, among the three elementary streams stream #0 to stream #2 multiplexed in clip stream file "00003.PS", regarding video stream, stream #0, as the first elementary stream, and audio stream, stream #2, as the third elementary stream, in the clip information file "00003.CLP" in FIG. 26, the number_of_DynamicInfo items have 2 and 3, respectively. Therefore, in clip information file "00003.CLP", regarding the first video stream, stream #0, in clip stream file "00003.PS", two sets of pts_change_point and DynamicInfo( ) items are described, and, regarding the third audio stream, stream #2, three sets of pts_change_point and DynamicInfo( ) items are described.

The upper side in FIG. 42 shows two sets of pts_change_point and DynamicInfo( ) items described concerning the first video stream, stream #0, in clip stream file "00003.PS", and the lower side in FIG. 42 shows three sets of pts_change_point and DynamicInfo( ) items described concerning third audio stream, stream #2, in clip stream file "00003.PS".

On the upper side in FIG. 42, in addition to the two sets of pts_change_point and DynamicInfo( ) items described concerning the first video stream, stream #0, the stream_id (=xE0), private_stream_id (=0x00), and number_of_DynamicInfo (=2), described in the clip information file "00003.CLP", concerning the video stream, stream #0, are also shown. Similarly, also on the lower side in FIG. 42, in addition to the three sets of pts_change_point and DynamicInfo( ) items described concerning the third audio stream, stream #2, the stream_id (=0xBD), private_stream_id (=0x00), and number_of_DynamicInfo (=3), described in the clip information file "00003.CLP" in FIG. 26, concerning the audio stream, stream #2, are also shown.

On the upper side in FIG. 42, in the first set of the two sets of pts_change_point and DynamicInfo( ) items described concerning the video stream, stream #0, the pts_change_point is 90,000 and the display_aspect_ratio (FIG. 13) in the DynamicInfo( ) is '4:3'. In addition, in the second set, the pts_change_point is 54,090,000, the display_aspect_ratio in the DynamicInfo( ) is '16:9'.

In addition, on the lower side in FIG. 42, among the three sets of pts_change_point and DynamicInfo( ) items described concerning the audio stream, stream #2, in the first set, the pts_change_point is 90,000, and the channel_assignment (FIG. 13) in the DynamicInfo( ) is 'Dual'.

In the second set, the pts_change_point is 27,090,000, and the channel_assignment in the DynamicInfo( ) is 'Stereo'. In the third set, the pts_change_point is 32,490,000, and the channel_assignment in the DynamicInfo( ) is 'Dual'.

For example, it is assumed that, in step S125 in FIG. 30, in clip stream file "00003.PS", the first video stream, stream #0, which is specified by a stream_id of 0xE0, and the third audio stream, stream #2, specified by a stream_id of 0xBD and a private_stream_id of 0x00, are determined as streams to be played back.

In this case, the player control module 212 checks the two sets, on the upper side in FIG. 42, of pts_change_point and DynamicInfo( ) items described concerning the video stream, stream #0, specified by the stream_id of 0xE0, the three sets, on the lower side in FIG. 42, of pts_change_point and DynamicInfo( ) items described concerning the video stream, stream #2, specified by the stream_id of 0xBD and the private_stream_id of 0x00, and the pts_change_point in the DynamicInfo( ), and recognizes initial values.

In other words, in the first set of the two sets, on the upper side in FIG. 42, of pts_change_point and DynamicInfo( ) items described concerning the video stream, stream #0, specified by the stream_id of 0xE0, the pts_change_point has 90,000. This time of 90,000 coincides with the time 90,000 described in the presentation_start_time representing the beginning time in clip stream file "00003.PS" in the clip information file "00003.CLP" in FIG. 26, which corresponds to clip stream file "00003.PS" in which video stream, stream #0, is multiplexed.

Similarly, among the three sets, on the lower side in FIG. 42, of pts_change_point and DynamicInfo( ) items described concerning the video stream, stream #2, specified by the stream_id of 0xBD and the private_stream_id of 0x00, in the first set, the pts_change_point is 90,000. This time of 90,000 coincides with the time 90,000 described in the presentation_start_time representing the beginning time in clip stream file "00003.PS" in the clip information file "00003.CLP" corresponding to clip stream file "00003.PS" in which audio stream, stream #2, is multiplexed.

The player control module 212 recognizes, as an initial value, a pts_change_point that coincides with the time 90,000 described in the presentation_start_time representing the beginning time in clip stream file "00003.PS". Accordingly, the pts_change_point in the first set of the two sets, on the upper side in FIG. 42, of pts_change_point and DynamicInfo( ) items, and the pts_change_point in the first set among the three sets, on the lower side in FIG. 42, of pts_change_point and DynamicInfo( ) items are recognized as initial values.

Before (in step S126 in FIG. 30) playback of clip stream file "00003.PS" is initiated, in accordance with the DynamicInfo( ), which forms a set with the pts_change_point recognized as the initial value, the player control module 212 specifies the output attribute of a corresponding elementary stream.

In other words, regarding the video stream, stream #0, specified by the stream_id of 0xE0, in the DynamicInfo( ) which forms a set with the pts_change_point of 90,000 as the initial value, the display_aspect_ratio is '4:3'. In this case, the player control module 212 controls the graphics processing module 219 by using the fact that the display_aspect_ratio is '4:3', that is, output attribute information indicating that video stream, stream #0, is video data having an aspect ratio of 4:3.

In addition, regarding the audio stream, stream #2, specified by the stream_id of 0xBD and the private_stream_id of 0x00, in the DynamicInfo( ) which forms a set with the pts_change_point of 90,000 as the initial value, the channel_assignment is 'Dual'. In this case, the player control module 212 supplies the audio output module 221 with the fact that the channel_assignment is 'Dual', that is, output attribute information indicating that the audio stream, stream #2, is dual audio data.

Here, in step S126 in FIG. 30, output attribute controlling for the pts_change_point as an initial value as described above is performed.

After that, the player control module 212 passes, to the decoding control module 214, the two pts_change_point items 90,000 and 54,090,000, on the upper side in FIG. 42, concerning video stream, stream #0, and, among the three pts_change_point items 90,000, 27,090,000, and 32,490,000, on the lower side in FIG. 42, concerning audio stream, stream #2, the times {27,090,000}, {32,490,000}, and {54,090,000} other the initial value 90,000, together with the time having the attribute "DynamicInfo( ) Processing".

After the decoding control module 214 receives the times {27,090,000}, {32,490,000}, and {54,090,000} having the "DynamicInfo( ) Processing" from the player control module 212, and initiates playing back (playing back PlayItem #0 in the second list PlayList #1 for playing back clip stream file "00003.PS") video stream, stream #0, and audio data, stream #2, the decoding control module 214 initiates monitoring the present time measured by the timer unit 214A.

In addition, when the present time coincides with one of the times {27,090,000}, {32,490,000}, and {54,090,000} having the "DynamicInfo( ) Processing", the decoding control module 214 supplies the player control module 212 with the DynamicInfo time as a time which has the "DynamicInfo( ) Processing" attribute and which coincides with the present time (step S321).

In other words, for example, if the present time is 27,090,000, the decoding control module 214 supplies, to the player control module 212, as the DynamicInfo time, that coincides with the present time among the times having the "DynamicInfo( ) Processing" attribute.

The player control module 212 receives 27,090,000 as the DynamicInfo time from the decoding control module 214, checks the pts_change_point that coincides with the DynamicInfo time 27,090,000 from among the two pts_change_point items, on the upper side in FIG. 42, concerning video stream, stream #0, and the three pts_change_point items, on the lower side, concerning audio stream, stream #2, and recognizes, as processing object DynamicInfo( ), DynamicInfo( ) that forms a set with the pts_change_point which coincides with 27,090,000, that is, the second DynamicInfo( ), on the lower side in FIG. 42, concerning audio stream, stream #2 (step S322).

When the processing object DynamicInfo( ) is about video stream, the player control module 212 supplies the graphics processing module 219 with the output attribute described in the processing object DynamicInfo( ) (step S323). In addition, when the processing object DynamicInfo( ) is about audio stream, the player control module 212 supplies the audio output module 221 with the output attribute described in the processing object DynamicInfo( ) (step S323).

When being supplied with the output attribute from the player control module 212, the graphics processing module 219 initiates controlling video data output in accordance with the supplied output attribute (step S324).

In other words, based on, for example, a video data aspect ratio instruction (the display_aspect_ratio (FIG. 13)) represented by the output attribute from the player control module 212, and the aspect ratio of the video output device connected to the video output terminal 120 in FIG. 1, the graphics processing module 219 converts the aspect ratio of the video data that is output to the video output module 220.

Specifically, for example, when the aspect ratio of the video output device is 16:9, if an instruction of the video data aspect ratio as the output attribute represents an aspect ratio of 4:3, by performing horizontal squeezing on video data that is output to the video output module 220, the graphics processing module 219 outputs processed video data in which right and left portions are darkened. In addition, for example, when the aspect ratio of the video output device is 4:3, if the instruction of the video data aspect ratio as the output attribute represents an aspect ratio of 16:9, by performing vertical squeezing on video data that is output to the video output module 220, the graphics processing module 219 outputs processed video data in which top and bottom portions are darkened. Furthermore, for example, when the aspect ratio of the video output device and the aspect ratio represented by the instruction of the aspect ratio of video data as the output attribute have the same value of 4:3 or 16:9, the graphics processing module 219 directly outputs the video data that is output to the video output module 220 without performing squeezing.

Here, according to the two sets of pts_change_point and DynamicInfo( ) items described concerning the video stream, stream #0, which is specified by the stream_id of 0xE0, from the time 90,000 as the playback start time of video stream, stream #0, until immediately prior to the time 54,090,000, video data having an aspect ratio of 4:3 is obtained from the video stream, stream #0. After the time 54,090,000, video data having an aspect ratio of 16:9 is obtained from the video stream, stream #0.

Therefore, for example, if the aspect ratio of the video output device connected to the video output terminal in FIG. 1 is 4:3, from the time 90,000 until immediately prior to the time 54,090,000, the graphics processing module 219 directly supplies, to the video output device having the aspect ratio of 4:3, the video data, having the aspect ratio of 4:3, obtained from the video stream, stream #0.

In addition, after the time 54,090,000, the video data, which has the aspect ratio of 16:9, and which is obtained from the video stream, stream #0, is vertically squeezed, and is converted into a video signal which has an aspect ratio of 4:3 and in which top and bottom portions are darkened. The video signal is supplied and displayed on the video output device having the aspect ratio of 4:3.

When being supplied with the output attribute from the player control module 212, the audio output module 221 initiates controlling output of the audio data in accordance with the output attribute (step S324).

In other words, based on, for example, an audio data channel assignment instruction (the channel_assignment (FIG. 13)) represented by the output attribute from the player control module 212, and the audio output mode supplied from the player control module 212 through the input interface 115 (FIG. 1) by the user operating the remote controller, the audio output module 221 processes the audio data from the audio decoder control module 217 and outputs the processed data to the audio output terminal 121 (FIG. 1).

Specifically, for example, when the audio data channel assignment instruction represented by the output attribute represents the dual (bilingual) mode in which the left channel corresponds to audio data of "main audio" and the right channel corresponds to audio data of "sub-audio", in accordance with the audio output mode supplied from the player control module 212 the audio output module 221 processes the audio data from the audio decoder control module 217, and outputs the processed data to the audio output terminal 121.

In other words, when, for example, the "main audio" is specified as the audio output mode, the audio output module 221 copies, as right channel audio data, left channel audio data in the audio data from the audio decoder control module 217, and outputs the left channel and right channel audio (audio data of "main audio") data to the audio output terminal 121. In addition, when the "sub-audio" is specified as the audio output mode, the audio output module 221 copies, as left channel audio data, right channel audio data in the audio data from the audio decoder control module 217, and outputs the left channel and right channel audio data (audio data of "sub-audio") to the audio output terminal 121. When the "main and sub-audio" is specified as the audio output mode, the audio output module 221 directly outputs the audio data from the audio decoder control module 217 to the audio output terminal 121.

In addition, for example when the audio data channel assignment instruction represents the stereo mode, the audio output module 221 directly outputs the audio data from the audio decoder control module 217 to the audio output terminal 121 regardless of the audio output mode supplied from the player control module 212.

Here, according to the three sets, on the lower side in FIG. 42, of pts_change_point and DynamicInfo( ) items described concerning the video stream, stream #2, specified by the stream_id of 0xBD and the private_stream_id of 0x00, from the 90,000 as the playback start time of the audio stream, stream #2, until immediately prior to the time 27,090,000, dual audio data is obtained from audio stream, stream #2. In addition, from the time 27,090,000 until immediately prior to the time 32,490,000, stereo audio data is obtained from audio stream, stream #2. After the time 32,490,000, dual audio data is obtained from audio stream, stream #2.

Therefore, for example, if the "main audio" is specified as the audio output mode, from the time 90,000 until immediately prior to the time 27,090,000, the audio output module 221 copies, as right channel audio data, left channel audio data in the dual audio data obtained from audio stream, stream #2, and outputs the left channel and right channel audio data to the audio output terminal 121.

In addition, from the time 27,090,000 until immediately prior to the time 32,490,000, the stereo audio data obtained from audio stream, stream #2, is directly output to the audio output terminal 121.

After the time 32,490,000, the left channel audio data in the dual audio data obtained from audio stream, stream #2, is copied as the right channel audio data, and the left channel and right channel audio data is output to the audio output terminal 121.

As described above, in the output attribute control process, for each of elementary streams multiplexed in a clip stream file, based on clip information file, Clip( ) (FIG. 10), including zero or more sets of pts_change_point items representing the playback times of the elementary streams, and DynamicInfo( ) items including the output attributes of the elementary streams, it is determined whether or not the playback time of one elementary stream being played back coincides with the pts_change_point. If the playback time of the elementarystream being played back coincides with the pts_change_ point, DynamicInfo( ) which forms a set with the pts_change_ point is recognized, and output of the elementary stream being played back is controlled in accordance with an output attribute included in the recognized DynamicInfo( ). Therefore, output of an elementary stream being played back can be controlled in accordance with the playback time and output attribute of the elementary stream.

Subtitle Display Control Process

Next, a subtitle display control process that controls display of subtitle data corresponding to a subtitle stream is described with reference to the flowchart in FIG. 43.

When playback of (PlayItem( ) in) PlayList( ) (FIG. 5) is initiated, in step S341, the player control module 212 initializes a subtitle data display-form instruction to the graphics processing module 219. In other words, the player control module 212 controls the graphics processing module 219 so that the subtitle data display form is set by default. The initialization of the display form performed in step S341 corresponds to the initialization of the display form instruction described in step S127 in FIG. 30.

Proceeding to step S342 after processing in step S341, the player control module 212 determines whether to have received a new display form instruction concerning subtitle data display which is sent from the input interface 115 by the user operating the remote controller.

If, in step S342, it is determined that the new display form instruction has been received, the player control module 212 proceeds to step S343 and determines whether (subtitle data corresponding to) the subtitle stream is being presently played back.

If, in step S343, it is determined the subtitle stream is being not played back, the player control module 212 returns to step S342.

Alternatively, if, in step S343, it is determined that the subtitle stream is being played back, the player control module 212 proceeds to step S345 and determines whether the new display form instruction is a default display form instruction. If, in step S343, it is determined that the new display form instruction is the default display form instruction, the player control module 212 returns to step S341, and controls the graphics processing module 219 so that the subtitle data display form is set by default, as described above.

If, in step S345, it is determined that the new display form instruction is not the default display form instruction, that is, when the new display form instruction is a nondefault display form instruction such as displaying subtitle data in enlarged or reduced form, or changing brightness for clear view, the process proceeds to step S346. The player control module 212 obtains, among StaticInfo( ) items (FIG. 12) in clip information file Clip( ) (FIG. 10) corresponding to a clip stream file in which the subtitle stream being presently played back is multiplexed, StaticInfo( ) for the subtitle stream being presently played back, and proceeds to step S347.

In step S347, the player control module 212 identifies the configurable_flag of the StaticInfo( ) obtained in step S346.

If, in step S347, it is determined that the configurable_flag has 0, which indicates that the change of the subtitle data display form is not permitted, the player control module 212 proceeds to step S348 and controls the graphics processing module 219, whereby an error message indicating that the subtitle data display form cannot be changed is overlaid on output video data. The process returns to step S342. This displays the error message.

Alternatively, if, in step S347, it is determined that the configurable_flag has 1, which indicates that the change of the subtitle data display form is permitted, the player control module 212 proceeds to step S349, and supplies the graphics processing module 219 with the new display form instruction which is supplied from the input interface 115 by the user operating the remote controller. The process proceeds to step S350.

In step S350, the graphics processing module 219 initiates processing in which, in accordance with the display form instruction supplied from the player control module 212 in last step S349, the subtitle data supplied from the subtitle decoder control module 218 is enlarged or reduced, its brightness is changed, or the like, and returns to step S342. This displays the subtitle data in display size, display position, display color, etc., in accordance with the display form specified by the user operating the remote controller.

Figure 31:
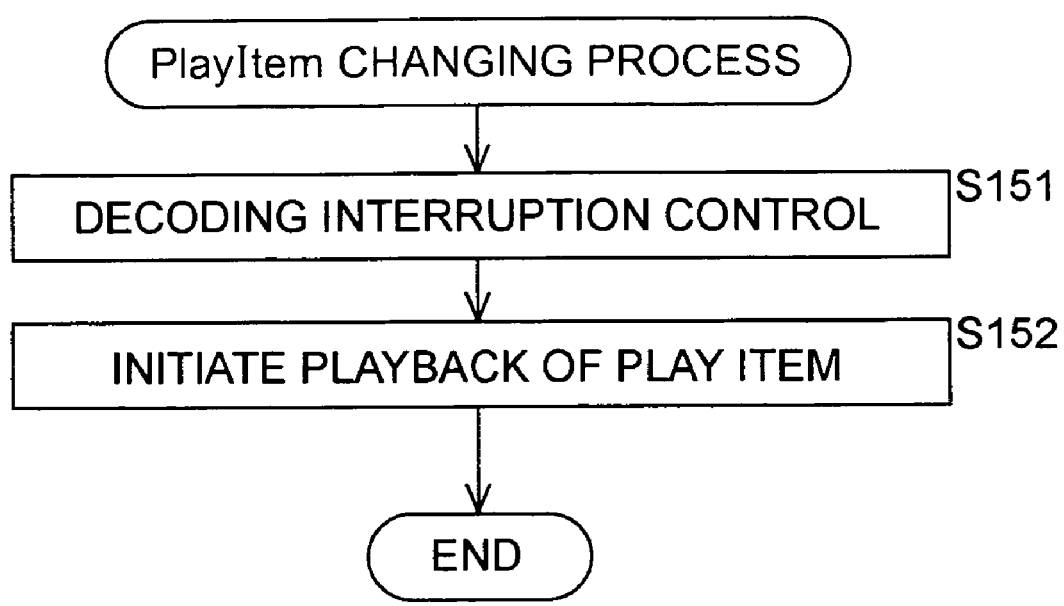
FIG. 31 is a flowchart illustrating a PlayItem changing process.

Alternatively, if, in step S342, it is determined that the new display form instruction has not been received, the player control module 212 proceeds to step S351 and determines whether the PlayItem( ) changing described in FIG. 31 has been performed. If it is determined that the PlayItem( ) changing has not been performed, the process returns to step S342.

In addition, if, in step S351, it is determined that the PlayItem( ) changing has been performed, the player control module 212 returns to step S341, and controls the graphics processing module 219 so that the subtitle data display form is set by default, as described above. In other words, in this case, if the PlayItem( ) changing has been performed, the subtitle data display form is returned to a default display form.

As described above, in the subtitle display control process, only in a case in which the configurable_flag in a subtitle stream has 1, which indicates that the change of the display form is permitted, the display form for subtitle data corresponding to the subtitle stream is changed in response to, for example, a display form instruction input by the user operating the remote controller.

Accordingly, according to, for example, the clip information file "00001.CLP" shown in FIG. 26, among the four elementary streams multiplexed in corresponding clip stream file "00001.PS", regarding subtitle stream, stream #2, which is the third elementary stream, the configurable_flag has 0, which indicates that the change of the display form is not permitted. Thus, even if, when the subtitle stream, stream #2, is displayed, the user operates the remote controller to change subtitles, their display is not changed.

For example, among the four elementary streams multiplexed in corresponding clip stream file "00001.PS", regarding subtitle stream, stream #3, which is the fourth elementary stream, the configurable_flag has 1, which indicates that the change of the display form is permitted. Thus, when the user operates the remote controller to change a subtitle display while the subtitle stream, stream #3, is being displayed, subtitle display size, etc., are changed in response to the operation.

In other words, for example, it is assumed that, in accordance with the first PlayItem #0 in the first PlayList #0 in FIG.

25, clip stream file "00001.PS" is being played back. In addition, as described concerning the clip information file "00001.CLP" in FIG. 26, among the four elementary streams multiplexed in corresponding clip stream file "00001.PS", the third and fourth ones are subtitle streams. It is assumed that, between the third subtitle stream, stream #2, and the fourth subtitle stream, stream #3, for example, the third subtitle stream, stream #2, is being presently played back.

By operating the remote controller by the user to input a subtitle display form instruction (step S342), the display form instruction is supplied from the input interface 115 (FIG. 1) to the player control module 212. When being supplied with the display form instruction, the player control module 212 searches the clip information file for StaticInfo( ) (FIG. 10) corresponding to the subtitle stream being presently played back (step S346).

In other words, in this case, the subtitle stream being presently played back is the third subtitle stream, stream #2, which is multiplexed in clip stream file "00001.PS". Accordingly, the player control module 212 searches corresponding clip information file "00001.CLP" for StaticInfo( ) concerning the third subtitle stream, stream #2.

Furthermore, the player control module 212 identifies the configurable_flag, which has 0, and which is described in StaticInfo( ) concerning the third subtitle stream, stream #2, in FIG. 26 (step S347), whereby it is recognized that, regarding the third subtitle stream, stream #2, the change of the display form is not permitted.

In this case, by determining that (subtitle data corresponding to) the subtitle stream being presently played back is not adapted for enlargement, reduction, etc., and controlling the graphics processing module 219, the player control module 212 generates an error message representing the determination (step S348) and outputs the message in a form overlaid on video data.

In addition, in a case in which, among the four elementary streams multiplexed in corresponding clip stream file "00001.PS", between the third subtitle stream, stream #2, and the fourth subtitle stream, stream #3, not the third subtitle stream, stream #2, but the fourth subtitle stream, stream #3, is presently played back, the player control module 212, which is supplied with the display form instruction in response to the user's operation of the remote controller, searches corresponding clip information file "00001.CLP" for StaticInfo( ) concerning the fourth subtitle stream, stream #3.

Furthermore, the player control module 212 identifies the configurable_flag, which has 1, and which is described in StaticInfo( ) concerning the fourth subtitle stream, stream #3, in FIG. 26 (step S347), whereby it is recognized that, concerning the fourth subtitle stream, stream #3, the change of the display form is permitted.

In this case, by determining that (the subtitle data corresponding to) the subtitle stream being presently played back is adapted for enlargement, reduction, etc., the player control module 212 supplies the graphics processing module 219 with the display form instruction supplied by the user operating the remote controller (step S349).

Accordingly, after that, in response to the display form instruction from the player control module 212, the graphics processing module 219 performs enlargement, reduction, or the like, on the subtitle data from the subtitle decoder control module 218, and outputs the obtained data in a form overlaid on the video data from the video decoder control module 216.

At the start of playback of the first PlayItem( ) in PlayList( ), the player control module 212 initializes a subtitle data display form instruction to the graphics processing module 219 (step S341). In other words, the player control module 212 controls the graphics processing module 219 so that the subtitle data display form is set by default.

Furthermore, also at the PlayItem( ) changing time, the player control module 212 initializes a subtitle data display form instruction to the graphics processing module 219 (steps S341, S351).

However, at the PlayItem( ) changing time, the configurable_flag concerning a new subtitle stream played back in accordance with new PlayItem( ) subsequently played back is checked. When the configurable_flag has 0, the subtitle data display form instruction to the graphics processing module 219 can be initialized. When the configurable_flag has 1, the subtitle data display form instruction to the graphics processing module 219 can be maintained as it is before the PlayItem( ) changing.

Figure 43:
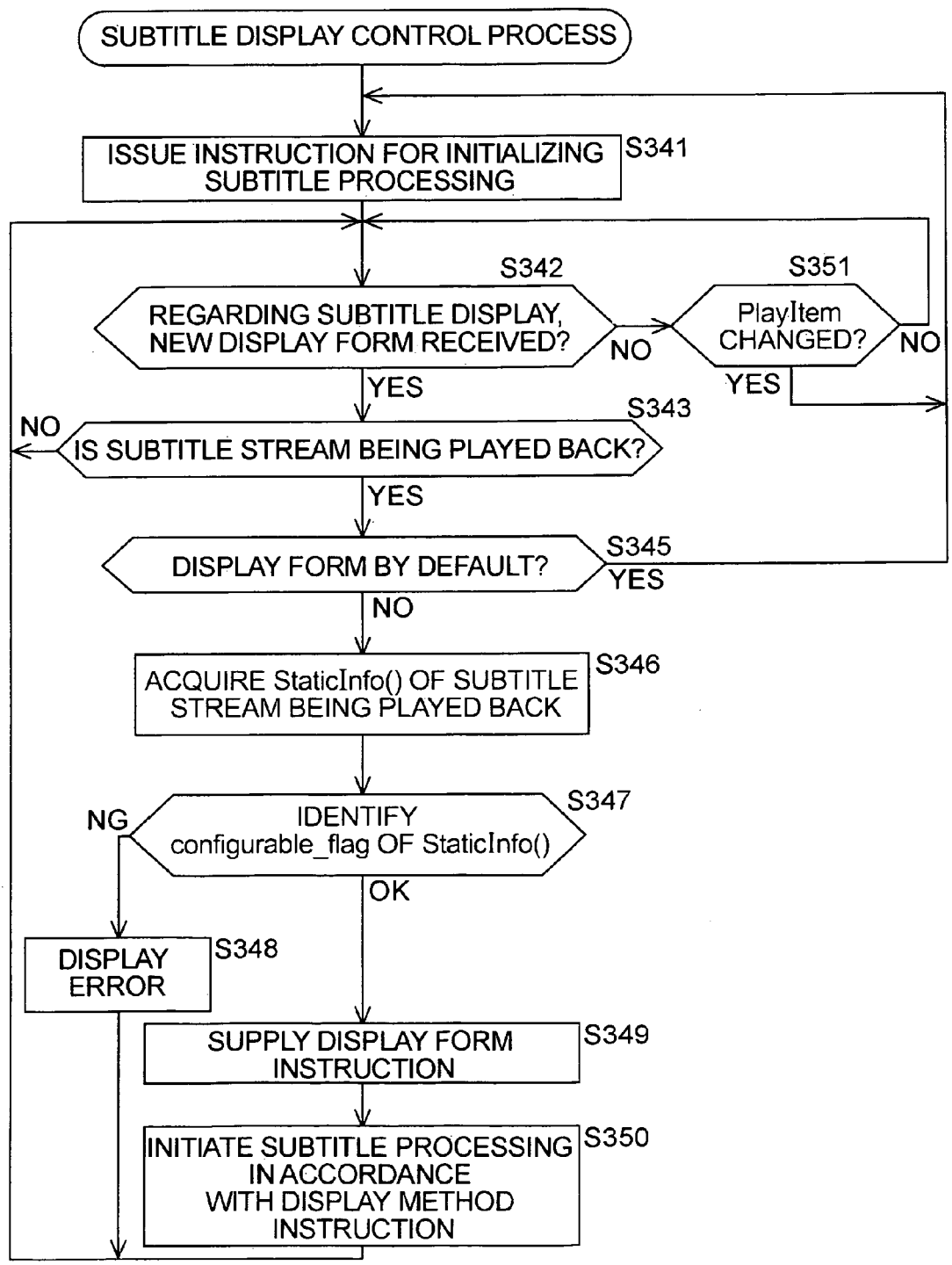
FIG. 43 is a flowchart illustrating a subtitle display control process.

In the subtitle display control process in FIG. 43, when a new display form instruction is input by the user operating the remote controller, the new display form instruction is supplied to the graphics processing module 219 (step S349). However, the display form instruction can be stored in, for example, a nonvolatile memory forming the memory 113 (FIG. 1), and the display form instruction stored in the nonvolatile memory can be supplied to the graphics processing module 219.

In other words, in initial setting for the disc device in FIG. 1, by storing a user-set display form instruction in the nonvolatile memory, when a new display form instruction is input by the user operating the remote controller, the display form instruction stored in the nonvolatile memory is updated. In addition, the display form instruction stored in the nonvolatile memory can be supplied to the graphics processing module 219. In this case, a display form instruction at the last playback finishing time is stored in the nonvolatile memory. Thus, by operating the remote controller by the user at the next PlayList( ) playback time, display of subtitle data is initiated in the display form without inputting the display form instruction at the last playback finishing time.

In this case, the display form instruction stored in the nonvolatile memory includes, for example, an enlargement ratio or a reduction ratio for use in enlarging or reducing the subtitle data.

As described above, according to the subtitle display control process, for an elementary stream included in clip information file Clip( ) (FIG. 10), the StaticInfo( ) of subtitle data, among StaticInfo( ) items that do not change during playback of the elementary stream, is acquired, and, based on the configurable_flag which is included in the StaticInfo( ) and which indicates whether to permit change of the subtitle data display from the default display form, it is determined whether or not the change of the subtitle data display from the default display form is permitted. In addition, if the change of the subtitle data display from the default display form is permitted, in accordance with the instruction to change the subtitle data display form, the subtitle data display process, that is, for example, display processing by enlarging or reducing the subtitle data or changing display color is performed. Therefore, the change of the subtitle data display form can be controlled.

Capturing Control Process

Next, a capturing control process that controls capturing of video data corresponding to a video stream is described with reference to the flowchart in FIG. 44. In addition to the flowchart illustrating the capturing control process, FIG. 44 also includes a flowchart illustrating background/screen saver processing as an example of processing that performs secondary use of video data captured by the capturing control process.

The capturing control process is started such that, for example, by operating the remote controller by the user, a capturing instruction as a video data capturing instruction is supplied to the player control module 212 through the input interface 115 (FIG. 1).

In other words, in the capturing control process, at first, in step S371, it is determined whether the player control module 212 is playing back a video stream. If it is determined that the player control module 212 is not playing back the video stream, the capturing control process finishes.

Alternatively, in step S371, if it is determined that the player control module 212 is playing back the video stream, the player control module 212 proceeds to step S372, acquires a capture_enable_flag_PlayList from PlayList( ) (FIG. 5) corresponding to the video stream being played back, and acquires a capture_enable_flag_Clip from clip information file Clip( ) (FIG. 10) corresponding to the video stream being played back.

As described in FIG. 5, the capture_enable_flag_PlayList in PlayList( ) indicates whether or not to permit secondary use of video data (video data belonging to PlayList( )) corresponding to a video stream which is played back based on the PlayList( ). In addition, as described in FIG. 10, the capture_enable_flag_Clip in clip information file Clip( ) indicates whether or not to permit secondary use of video data corresponding to a video stream stored in a clip stream file corresponding to the clip information file Clip( ).

Proceeding to step S373 after processing in step S372, based on the capture_enable_flag_PlayList and capture_enable_flag_Clip acquired in last step S373, the player control module 212 determines whether or not capturing of a picture of video data played back when a capturing instruction is input from the input interface 115 (FIG. 1) can be performed.

If, in step S373, it is determined that the capturing of the picture of video data played back when the capturing instruction is input from the input interface 115 cannot be performed, that is, when at least one of the capture_enable_flag_PlayList and capture_enable_flag_Clip acquired in last step S373 has 0, which indicates that secondary use of video data is not permitted, the process proceeds to step S374. By controlling the graphics processing module 219, the player control module 212 overlays an error message indicating that the video data capturing cannot be performed, and the capturing control process ends. This displays the error message.

Alternatively, if, in step S373, it is determined that the capturing of the picture of video data played back when the capturing instruction is input from the input interface 115 can be performed, that is, when both the capture_enable_flag_PlayList and capture_enable_flag_Clip acquired in last step S373 has 1, which indicates that secondary use of video data is permitted, the process proceeds to step S375. The player control module 212 supplies the graphics processing module 219 with an instruction to capture the picture of the video data played back when the capturing instruction is input from the input interface 115, and proceeds to step S376.

In step S376, in accordance with the capturing instruction from the player control module 212, in the graphics processing module 219, the picture of the video data from the video decoder control module 216 is captured and stored in the memory 113 (FIG. 1). The capturing control process ends. The capture_enable_flag consists of a plurality of bits, so that, when use conditions are restricted, a response is performed at this time. In other words, when the size of the captured image has limitation, an image reduced at this time is captured. In addition, when an application in use has restriction, a flag reporting the restriction is simultaneously recorded.

As described above, the capturing control process finds the logical product of the capture_enable_flag_PlayList and capture_enable_flag_Clip in each of the PlayList( ) (FIG. 5) and clip information file Clip( ) (FIG. 10) corresponding to the video stream playback data when the capturing instruction. When the logical product has 1, that is, only when both the capture_enable_flag_PlayList and capture_enable_flag_Clip are ones, which permits secondary use, does the process determine that secondary use of the video data can be performed, so that the capturing is performed.

Therefore, for example, when video stream playback in accordance with the first PlayItem #0 in the first PlayList( ) #0 in FIG. 25, that is, playback of a video stream multiplexed in clip stream file "00001.PS", is performed, if the capturing instruction from the user is received, the capture_enable_flag_PlayList in the first PlayList #0 has 1, and the capture_enable_flag_Clip in the clip information file "00001.CLP" corresponding to clip stream file "00001.PS" played back based on the first PlayItem #0 has 1. Thus, it is determined that secondary use of the video data (video data corresponding to the video stream multiplexed in clip stream file "00001.PS") being played back can be performed, so that the capturing is performed.

In addition, for example, when video stream playback in accordance with the second PlayItem #1 in the first PlayList #0 in FIG. 25, that is, playback of a video stream multiplexed in clip stream file "00002.PS", is performed, if the capturing instruction from the user is received, the capture_enable_flag_PlayList in the first PlayList( ) #0 has 1, and the capture_enable_flag_Clip in the clip information file "00002.CLP" in FIG. 26 corresponding to clip stream file "00002.PS" played back based on the second PlayItem #1 has 0. Thus, it is determined that the secondary use of the video data (video data corresponding to the video stream multiplexed in clip stream file "00002.PS") being playback data cannot be performed, so that no capturing is performed.

Furthermore, for example, when video stream playback in accordance with PlayItem #0 in the second PlayList #1 in FIG. 25, that is, playback of a video stream multiplexed in clip stream file "00003.PS", is performed, if the capturing instruction from the user is received, the capture_enable_flag_PlayList in the second PlayList #1 has 0, the capture_enable_flag_PlayList in the clip information file "00003.CLP" in FIG. 25 corresponding to clip stream file "00003.PS" played back based on PlayItem #0 in the second PlayList #1 has 1. Thus, it is determined that the secondary use of the video data (video data corresponding to the video stream multiplexed in clip stream file "00003.PS") being playback data cannot be performed, so that no capturing is performed.

In this case, at the time the capture_enable_flag_PlayList in the second PlayList #1 is confirmed as 0, it can be determined that the secondary use of video data cannot be performed. Thus, confirmation of the capture_enable_flag_Clip in the clip information file "00003.CLP" in FIG. 26 corresponding to clip stream file "00003.PS" played back based on PlayItem #0 in the second PlayList 41 can be omitted.

The picture that is stored in the memory 113 after being captured in the capturing control process can secondarily used in the background/screen saver processing.

The background/screen saver processing is performed in, for example, a state in which, although the player control module 212 operates, elementary stream playback is not performed, that is, in a state in which the disc 101 is not loaded in the disc drive 102 (FIG. 1), or a state in which elementary stream playback has finished.

In other words, in the background/screen saver processing, in step S381, the player control module 212 controls the graphics processing module 219 to display the picture stored in the memory 113 in the capturing control process. Under the control of the player control module 212, the graphics processing module 219 displays the picture stored in the memory 113 in the capturing control process.

Here, in the graphics processing module 219, if the picture stored in the memory 113 is displayed as a still picture, so-called wallpaper (background) is realized, and, if it is displayed while being enlarged, reduced, and moved at a constant frequency, a screen saver is realized. In addition, the background/screen saver processing, which displays the picture stored in the memory 113 by the capturing control process, can be performed not by the player control module 212 but by another independent application.

When, at this time, a flag representing use restriction is added to the picture stored in the memory 113, the picture obeys the restriction.

As described above, the capture_enable_flag_PlayList and capture_enable_flag_PlayList for video data being played back, in a unit greater than a video access unit, which each indicate that, for example, secondary use of video data corresponding to PlayList( ) or PlayItem( ) is permitted, are acquired, and, based on the capture_enable_flag_PlayList and capture_enable_flag_PlayList, it is determined whether or not the secondary use of the video data being played back is permitted. If it is determined that the secondary use of the video data being played back is permitted, the video data being played back is captured, and the background/screen saver processing, which uses the captured video data, is executed. Accordingly, control of the secondary use of the video data becomes possible.

Figure 44:
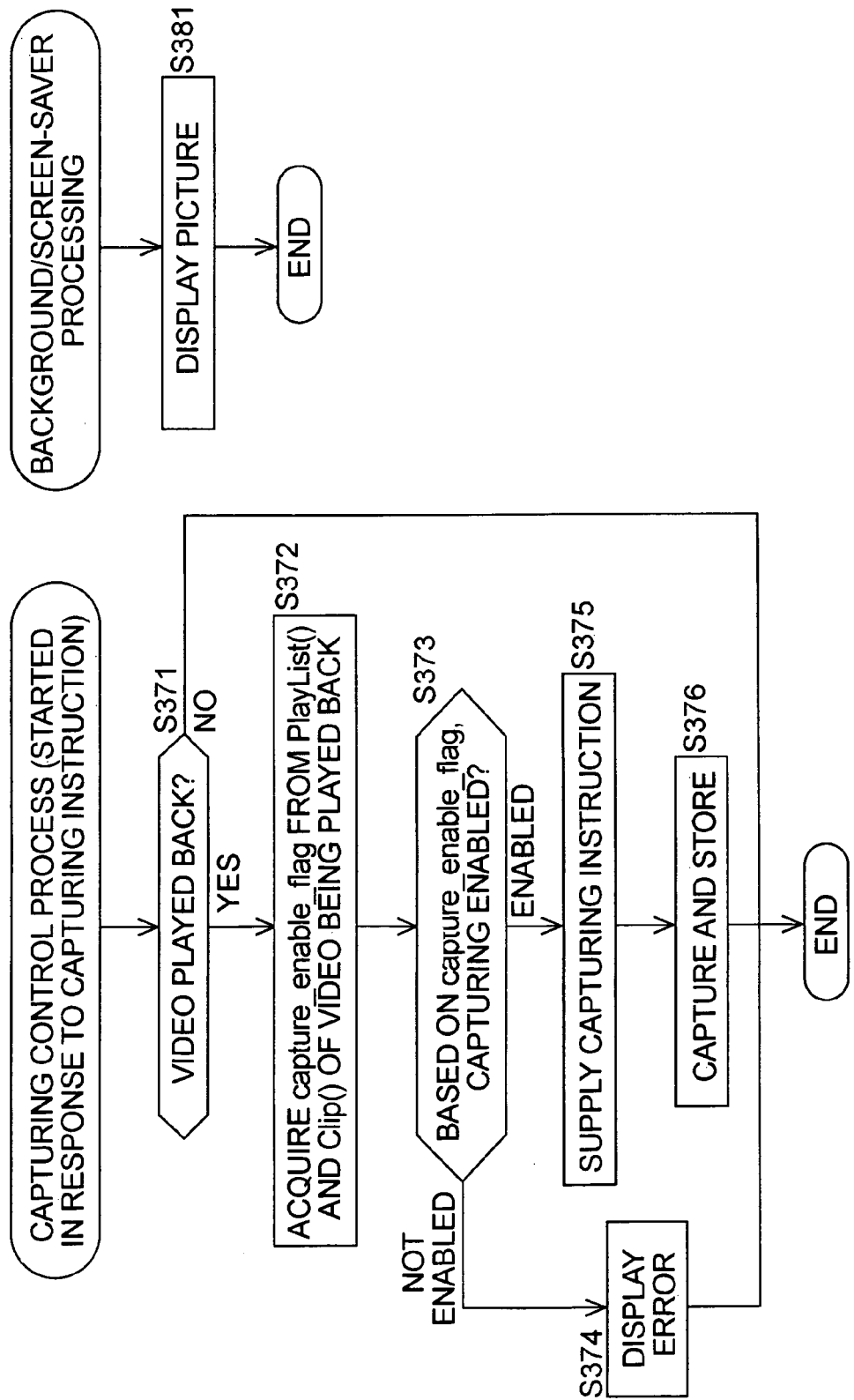
FIG. 44 consists of flowcharts illustrating a capturing control process and background/screen saver processing, respectively.

In the capturing control process in FIG. 44, by providing the capture_enable_flag_PlayList in the PlayList (FIG. 5), providing the capture_enable_flag_Clip in clip information file Clip( ) (FIG. 10) corresponding to a clip stream file played back based on PlayItem( ), and using both the capture_enable_flag_PlayList and the capture_enable_flag_Clip, it is determined whether or not to permit secondary use. However, by only providing only the capture_enable_flag_PlayList in the PlayList( ) (FIG. 5), or only providing the capture_enable_flag_Clip in clip information file Clip( ) (FIG. 10) corresponding to the clip stream file played back based on PlayItem( ), and using either one, it can be determined whether or not to permit the secondary use.

In addition, in the capturing control process in FIG. 44, in step S376, in accordance with the capturing instruction from the player control module 212, the graphics processing module 219 captures a picture of video data from the video decoder control module 216, that is, only one picture. However, in addition thereto, a plurality of pictures can be captured. In other words, a plurality of time-series pictures (sequence of plural pictures as a moving picture) output by the video decoder control module can be captured. In this case, the number of pictures that are captured at a time can be, for example, determined beforehand. Alternatively, by extending the bits of the capture_enable_flag_PlayList and the capture_enable_flag_Clip, information of the number of captures that can be captured at a time may be included in the capture_enable_flag_PlayList and the capture_enable_flag_Clip.

Furthermore, in the above case, use-permission information (capture_enable_flag_PlayList, capture_enable_flag_Clip) indicating whether or not to permit secondary use of video data is described in PlayList( ) and clip information file Clip( ), and, based on the use-permission information, it is determined whether or not to permit secondary use of the entirety of video data that is played back based on PlayList( ) and of the entirety of video data corresponding to a video stream multiplexed in a clip stream file corresponding to clip information file Clip( ). The use-permission information can describe other video data in arbitrary units, and, based on this use-permission information, it can be determined whether or not to permit secondary use of the video data in arbitrary units.

In other words, FIG. 45 shows syntax of the private_stream2_PES_payload( ), and FIG. 46 shows syntax of an au_information( ) in which the use-permission information is located.

The private_stream2_PES_payload( ) in FIG. 45 is similar in configuration to that in the case of FIG. 23, except that a capture_enable_flag_ps2 as the use-permission information is located immediately prior to the video_stream_id. Also the au_information( ) in FIG. 46 is similar in configuration to that in the case of FIG. 24, except that a capture_enable_flag_AU as the use-permission information is located immediately prior to the pic_struct_copy.

The capture_enable_flag_ps2 located in the private_stream2_PES_payload( ) in FIG. 45 indicates whether or not to permit secondary use of video data corresponding to a video stream located from the PES_packet( ) of the private_stream_2 including the private_stream2_PES_payload( ) to a position immediately prior to the PES_packet( ) of the next private_stream_2. Therefore, according to the capture_enable_flag_ps2 located in the private_stream2_PES_payload( ) in FIG. 45, it can be determined whether or not to permit secondary use of video data from a decode startable point to the next decode startable point.

The capture_enable_flag_AU located in the au_information( ) in FIG. 46 indicates whether or not to permit secondary use of video data in a video access unit corresponding to the capture_enable_flag_AU. Therefore, according to the capture_enable_flag_AU located in the au_information( ) in FIG. 46, it can be determined whether or not to permit secondary use of video data in a video access unit or a picture unit.

Here, regarding the capture_enable_flag_PlayList as use-permission information in PlayList( ) (FIG. 5), the capture_enable_flag_Clip as use-permission information in clip information file Clip( ) (FIG. 10), the capture_enable_flag_ps2 as use-permission information in the private_stream2_PES_payload( ), and the capture_enable_flag_AU as use-permission information in the au_information( ) (FIG. 46), among them, two or more items can be redundantly employed. In this case, based on the logical product, or the like, of two or more pieces of use-permission information which are redundantly employed, it can be determined whether or not to permit secondary use of certain video data.

Figure 36:
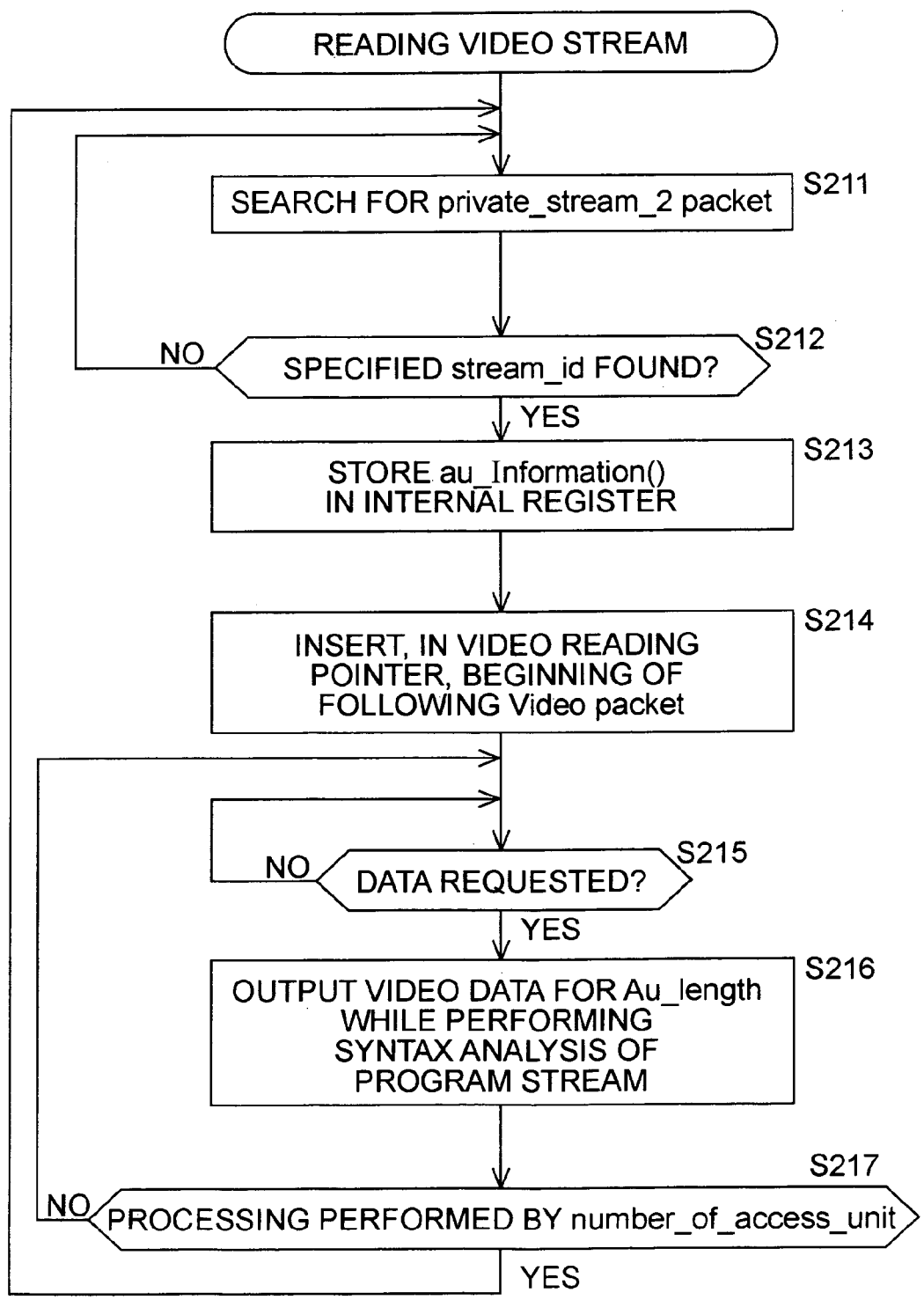
FIG. 36 is a flowchart illustrating a video stream reading process.

In addition, regarding the PES_packet( ) of the private_stream_2 including the private_stream2_PES_payload( ) in FIG. 23 or FIG. 45 in which the au_information( ) is located, as described in step S211 in FIG. 36, the video reading function unit 233 in the buffer control module 215 (FIG. 3) searches for the packet from the program stream stored in the buffer 215A. Therefore, in the case of employing the private_stream2_PES_payload( ) in FIG. 45 in which the capture_enable_flag_ps2 is located, and the au_information( ) in FIG. 46 in which the capture_enable_flag_AU is located, in determining whether or not to permit secondary use of video data, the player control module 212 needs to inquire the video reading function unit 233 about the capture_enable_flag_ps2 and the capture_enable_flag_AU.

Although, in this embodiment, the above-described consecutive processing is performed by software, the above-described consecutive processing can be performed by dedicated hardware.

In addition, although, in this embodiment, a hardware decoder is employed as the video decoder 116 (FIG. 1), a software decoder can be employed as the video decoder 116. This also applies to the audio decoder 117 (FIG. 1).

Moreover, although, in this embodiment, a software decoder is employed as the subtitle decoder, a hardware decoder can be employed as the subtitle decoder.

The invention claimed is:

1. A data processing apparatus for processing coded data, wherein:
the coded data includes:
coded video data, in access units, obtained by coding video data in predetermined units; and
utilization information immediately prior to each of one or more decode startable points in the coded video data in the access units, the utilization information being used in decoding the coded video data, wherein
said utilization information includes number information representing the number of the access units, size information representing the size of each of the access units the access units being located between said utilization information and the next utilization information; and
the data processing apparatus comprises a processor configured to:
search for said utilization information from the coded data;
read, on the basis of the size information included in said utilization information, the coded video data in the access units from the coded data, and supply the read data to a video decoder; and
repeat, for as many times as the number represented by the number information included in said utilization information, reading of the coded video data in the access units from the coded data based on the size information included in said utilization information and supplying the read data to the video decoder.

2. The data processing apparatus according to claim 1, wherein the coded video data, in the access units, obtained by coding the video data in predetermined units, is variable length data.

3. A data processing method for processing coded data, wherein:
the coded data includes:
coded video data, in access units, obtained by coding video data in predetermined units; and
utilization information immediately prior to each of one or more decode startable points in the coded video data in the access units, the utilization information being used in decoding the coded video data, wherein
said utilization information includes number information representing the number of the access units, size information representing the size of each of the access units, the access units being located between said utilization information and the next utilization information; and
the data processing method includes:
searching for said utilization information from the coded data;
reading, on the basis of the size information included in said utilization information, the coded video data in the access units from the coded data, and supplying the read data to a video decoder; and
repeating, for as many times as the number represented by the number information included in said utilization information, reading of the coded video data in the access units from the coded data based on the size information included in said utilization information and supplying the read data to the video decoder.

4. A non-transitory program recording medium with a program recorded thereon, the program allowing a computer to perform data processing for processing coded data, wherein:
the coded data includes:
coded video data, in access units, obtained by coding video data in predetermined units; and
utilization information immediately prior to each of one or more decode startable points in the coded video data in the access units, the utilization information being used in decoding the coded video data, wherein
said utilization information includes number information representing the number of the access units, size information representing the size of each of the access units, the access units being located between said utilization information and the next utilization information; and
the data processing including:
searching for said utilization information from the coded data;
reading, on the basis of the size information included in said utilization information, the coded video data in the access units from the coded data, and supplying the read data to a video decoder; and
repeating, for as many times as the number represented by the number information included in said utilization information, reading of the coded video data in the access units from the coded data based on the size information included in said utilization information and supplying the read data to the video decoder.

5. A non-transitory data recording medium with coded data recorded thereon, wherein:
the coded data includes:
coded video data, in access units, obtained by coding video data in predetermined units; and
utilization information immediately prior to each of one or more decode startable points in the coded video data in the access units, the utilization information being used in decoding the coded video data; and
said utilization information includes number information representing the number of access units, size information representing the size of each of the access units, the access units being located between said utilization information and the next utilization information.

* * * * *